(12) United States Patent
Ozone et al.

(10) Patent No.: US 11,716,537 B2
(45) Date of Patent: Aug. 1, 2023

(54) IMAGE PROCESSING DEVICE, IMAGE PROCESSING METHOD, AND PROGRAM

(71) Applicant: Sony Group Corporation, Tokyo (JP)

(72) Inventors: Takayoshi Ozone, Kanagawa (JP); Ryuichi Tadano, Kanagawa (JP); Hiroshi Yamamoto, Chiba (JP)

(73) Assignee: Sony Group Corporation, Tokyo (JP)

( * ) Notice: Subject to any disclaimer, the term of this patent is extended or adjusted under 35 U.S.C. 154(b) by 30 days.

(21) Appl. No.: 17/434,196

(22) PCT Filed: Feb. 7, 2020

(86) PCT No.: PCT/JP2020/004841
§ 371 (c)(1),
(2) Date: Aug. 26, 2021

(87) PCT Pub. No.: WO2020/195232
PCT Pub. Date: Oct. 1, 2020

(65) Prior Publication Data
US 2022/0174216 A1    Jun. 2, 2022

(30) Foreign Application Priority Data
Mar. 28, 2019   (JP) .............................. JP2019-063480

(51) Int. Cl.
*H04N 23/68*   (2023.01)
*H04N 23/62*   (2023.01)

(52) U.S. Cl.
CPC ....... *H04N 23/683* (2023.01); *H04N 23/6812* (2023.01); *H04N 23/62* (2023.01)

(58) Field of Classification Search
CPC .......... H04N 5/23258; H04N 5/23267; H04N 5/23216; H04N 5/232945; H04N 5/23229;
(Continued)

(56) References Cited

U.S. PATENT DOCUMENTS 9,036,057 B2 *   5/2015   Okamura ............... H04N 5/262
                                                            348/241
9,225,900 B2 *  12/2015   Miyasako ............ H04N 23/683
(Continued)

FOREIGN PATENT DOCUMENTS

JP   H06-003726 A   1/1994
JP   2013-145519 A   7/2013
(Continued)

OTHER PUBLICATIONS

International Search Report (PCT/ISA/210), International Application No. PCT/JP2020/004841, dated Mar. 17, 2020.
(Continued)

*Primary Examiner* — Pritham D Prabhakher
(74) *Attorney, Agent, or Firm* — Michael Best & Friedrich LLP

(57) ABSTRACT

An image processing device performs shake information adjustment processing for adjusting shake information at the time of imaging when input image data constituting a moving image is captured and generating adjusted shake information, shake modification processing for changing a state of shake of the input image data using the adjusted shake information to obtain shake-modified image data, and association processing for associating at least one of the input image data and the shake-modified image data, the shake information at the time of imaging, and shake modification information capable of specifying a processing amount of the shake modification processing with each other.

22 Claims, 30 Drawing Sheets

(58) Field of Classification Search
CPC .. H04N 5/232933; H04N 5/232; H04N 19/00; G06F 1/1686; G06F 1/1694; G06F 3/0346; G06F 3/0484; G06F 3/04847
USPC ........................................................ 348/208.2
See application file for complete search history.

(56) References Cited

U.S. PATENT DOCUMENTS

| | | | | |
|---|---|---|---|---|
| 10,043,245 | B2* | 8/2018 | Tsubaki | H04N 23/6811 |
| 2010/0295956 | A1* | 11/2010 | Goto | H04N 23/68 348/208.6 |
| 2012/0320227 | A1* | 12/2012 | Tsuchida | H04N 23/6812 348/208.99 |
| 2013/0004151 | A1* | 1/2013 | Wakamatsu | G03B 5/02 396/55 |
| 2013/0169833 | A1* | 7/2013 | Omori | H04N 23/683 348/208.6 |
| 2013/0188076 | A1* | 7/2013 | Okamura | H04N 9/74 348/239 |
| 2014/0111659 | A1* | 4/2014 | Miyasako | H04N 23/6812 348/208.1 |
| 2015/0036010 | A1* | 2/2015 | Wu | H04N 23/683 348/208.6 |
| 2015/0123990 | A1* | 5/2015 | Satoh | H04N 23/6811 345/625 |
| 2015/0326785 | A1 | 11/2015 | Tsubaki | |
| 2015/0365593 | A1* | 12/2015 | Shinozaki | H04N 23/63 348/207.1 |
| 2019/0007617 | A1* | 1/2019 | Kitagawa | G03B 5/00 |

FOREIGN PATENT DOCUMENTS

| | | |
|---|---|---|
| JP | 2015-216510 A | 12/2015 |
| JP | 2018-195864 A | 12/2018 |
| WO | 2016/002322 A1 | 1/2016 |

OTHER PUBLICATIONS

Notification of Transmittal of the International Search Report and the Written Opinion of the International Searching Authority, or the Declaration (PCT/ISA/220), International Application No. PCT/JP2020/004841, dated Mar. 31, 2020.

Written Opinion of the International Search Authority (PCT/ISA/237), International Application No. PCT/JP2020/004841, dated Mar. 31, 2020.

* cited by examiner

Fig. 1
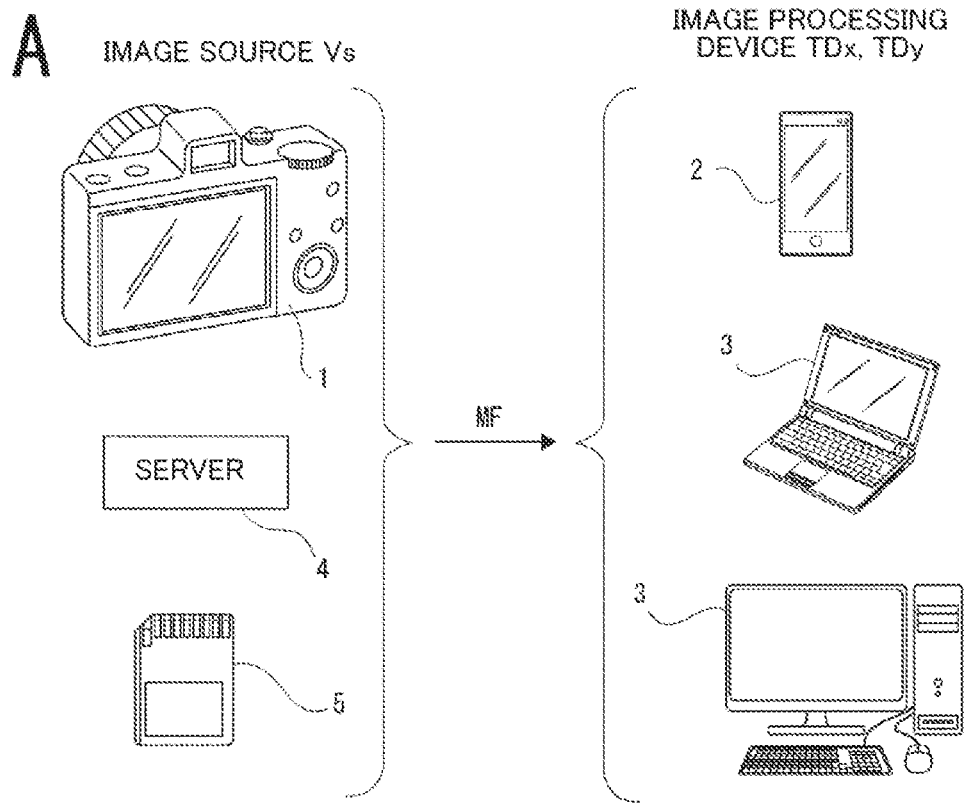
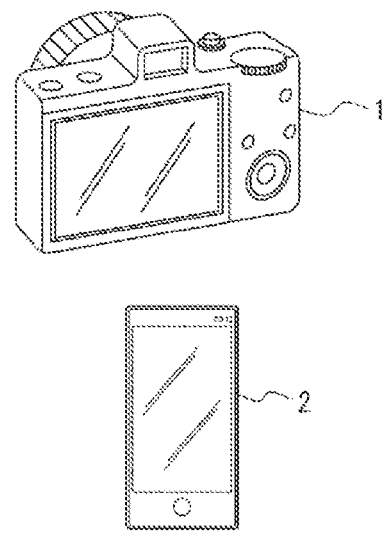

Fig. 8

A
- Header
- Sound
- Movie
  - frame#1
  - frame#2
  - frame#3
  - ...
- Meta data
  - frame#1
  - frame#2
  - frame#3
  - ...

MF

B

| IMU data | gyro |
| | accel |
| | SAMPLING RATE |
| DISTORTION CORRECTION PARAMETER | LENS DISTORTION CORRECTION |
| | TRAPEZOIDAL DISTORTION CORRECTION |
| | FOCAL PLANE DISTORTION CORRECTION |
| COORDINATE TRANSFORMATION PARAMETER (HP) | ELECTRONIC IMAGE STABILIZATION (yaw/pitch/roll) |
| | OPTICAL IMAGE STABILIZATION (yaw/pitch/roll) |
| TIMING INFORMATION (TM) | EXPOSURE TIME (shutter speed) |
| | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

C
- gyro sample #1
- gyro sample #2
- ...
- gyro sample #n
- accel sample #1
- accel sample #2
- ...
- accel sample #m Fig. 9
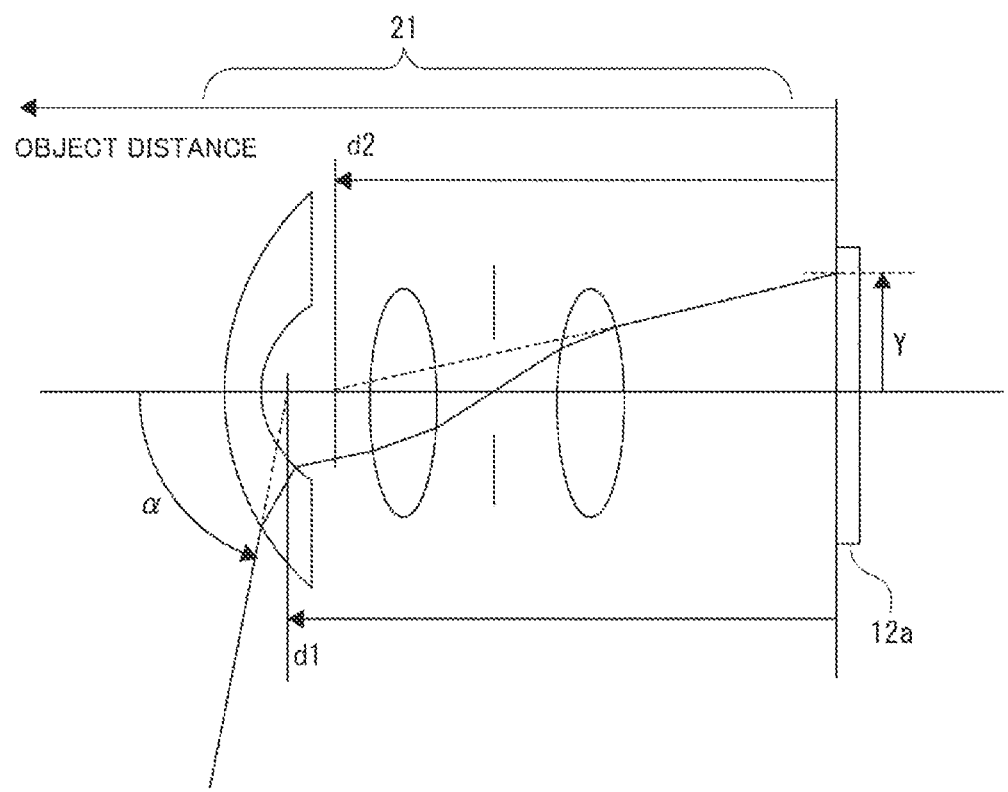
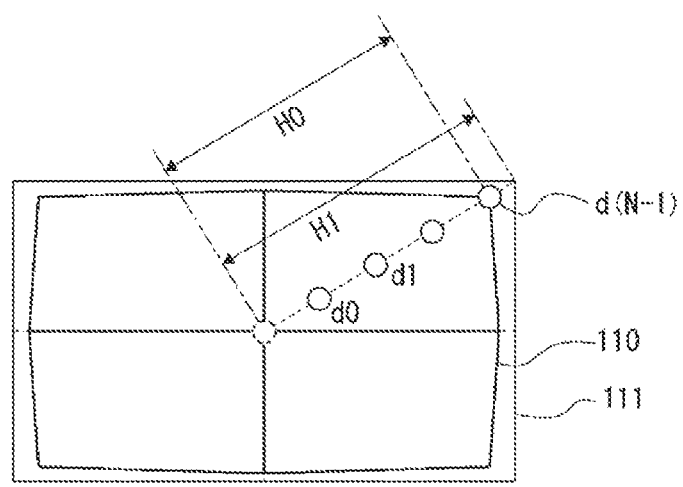

Fig. 11
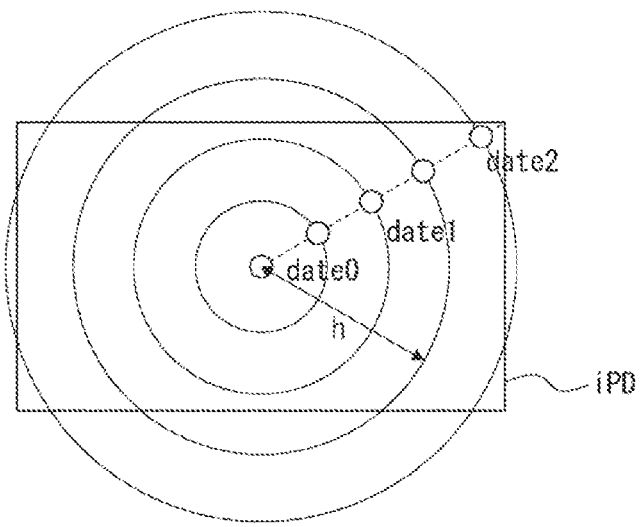
A
RELATIONSHIP BETWEEN IMAGER PLANE AND INCIDENT ANGLE
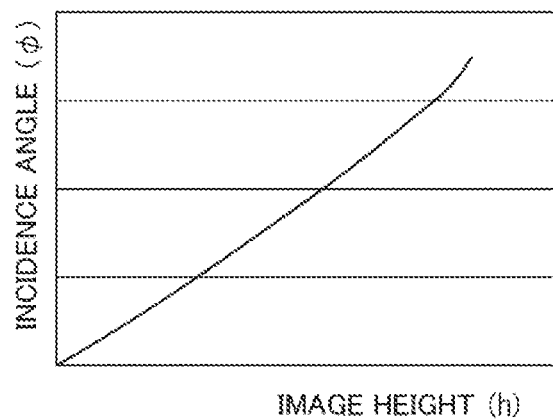
B
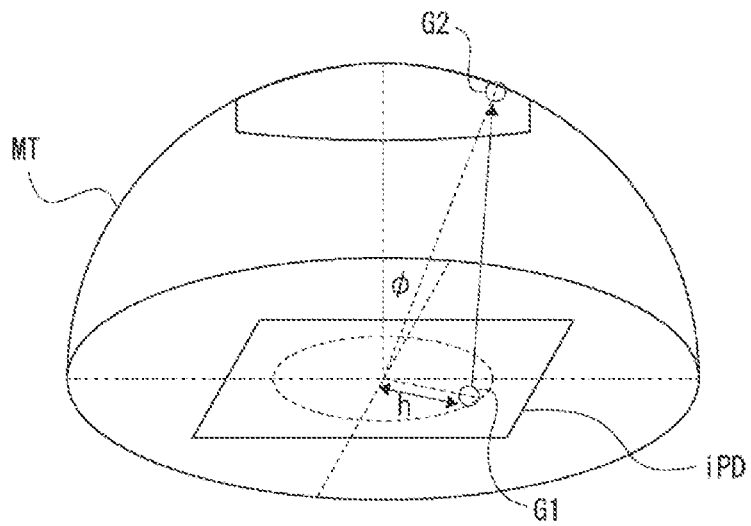
C Fig. 16
A
PROCESSING IN OUTPUT COORDINATE PLANE
B
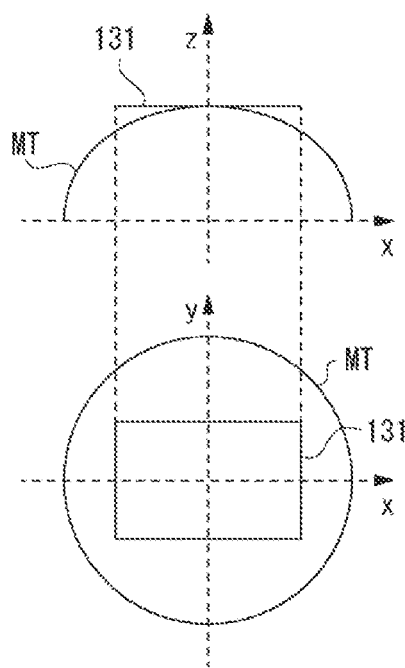
CONVERSION TO
NORMALIZED SPACE Fig. 17
A
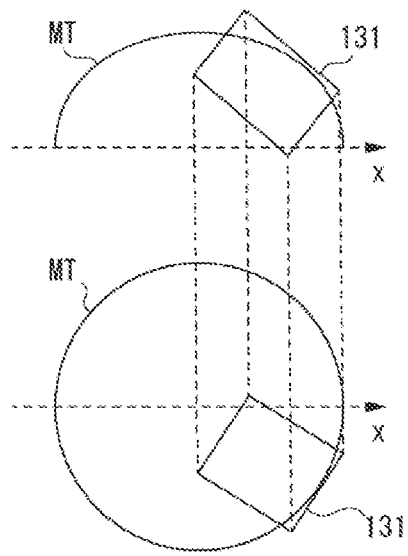
ROTATION
B
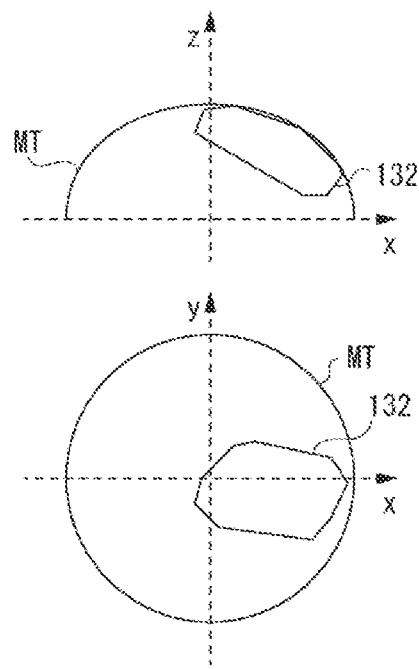
CALCULATION OF CELESTIAL SPHERE CORRESPONDENCE
POINTS IN PERSPECTIVE PROJECTION Fig. 18
A 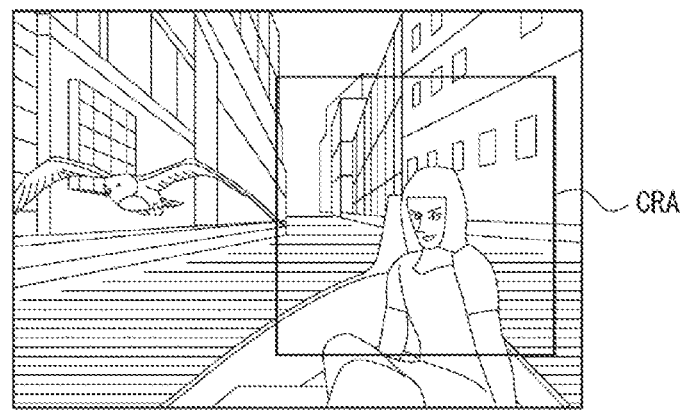
B 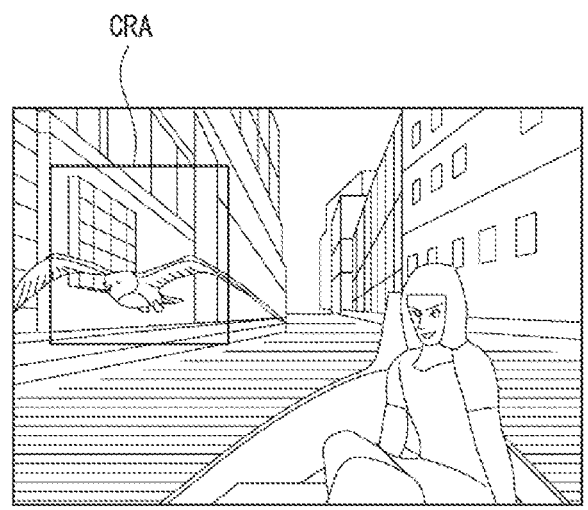

Fig. 19

MTD1

| IMU data | | gyro |
| --- | --- | --- |
| | | accel |
| | | SAMPLING RATE |
| | DISTORTION CORRECTION PARAMETER | LENS DISTORTION CORRECTION |
| | | TRAPEZOIDAL DISTORTION CORRECTION |
| | | FOCAL PLANE DISTORTION CORRECTION |
| COORDINATE TRANSFORMATION PARAMETER (HP) | | ELECTRONIC IMAGE STABILIZATION (yaw/pitch/roll) |
| | | OPTICAL IMAGE STABILIZATION (yaw/pitch/roll) |
| TIMING INFORMATION (TM) | | EXPOSURE TIME (shutter speed) |
| | | EXPOSURE START TIMING |
| | | READOUT TIME (CURTAIN SPEED) |
| | | NUMBER OF EXPOSURE FRAMES (LONG EXPOSURE INFORMATION) |
| | | IMU SAMPLE TIMING OFFSET |
| | | FRAME RATE |
| CAMERA PARAMETER (CP) | | ANGLE OF VIEW (FOCAL LENGTH) |
| | | ZOOM POSITION |
| | | LENS DISTORTION INFORMATION |

MTD2

| QUATERNION (QD) | |
| --- | --- |
| TIMING INFORMATION (TM) | EXPOSURE TIME (shutter speed) |
| | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

Fig. 22

| MTD1 | |
|---|---|
| IMU data | gyro |
| | accel |
| | SAMPLING RATE |
| TIMING INFORMATION (TM) | EXPOSURE TIME (shutter speed) |
| | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

| MTD2 | |
|---|---|
| QUATERNION (QD) | |
| TIMING INFORMATION (TM) | EXPOSURE TIME (shutter speed) |
| | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

Fig. 27

| MTD1 | |
|---|---|
| IMU data | gyro |
| | accel |
| | SAMPLING RATE |
| TIMING INFORMATION (TM) | EXPOSURE TIME (shutter speed) |
| | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

| MTD2 | |
|---|---|
| SHIFT AND ROTATION INFORMATION (SFRO) | EXPOSURE TIME (shutter speed) |
| TIMING INFORMATION (TM) | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |

Fig. 29

| MTD1 | | |
|---|---|---|
| IMU data | gyro | |
| | accel | |
| | SAMPLING RATE | |
| COORDINATE TRANSFORMATION PARAMETER (HP) | DISTORTION CORRECTION PARAMETER | LENS DISTORTION CORRECTION |
| | | TRAPEZOIDAL DISTORTION CORRECTION |
| | | FOCAL PLANE DISTORTION CORRECTION |
| | ELECTRONIC IMAGE STABILIZATION (yaw/pitch/roll) | |
| | OPTICAL IMAGE STABILIZATION (yaw/pitch/roll) | |
| TIMING INFORMATION (TM) | EXPOSURE TIME (shutter speed) | |
| | EXPOSURE START TIMING | |
| | READOUT TIME (CURTAIN SPEED) | |
| | NUMBER OF EXPOSURE FRAMES (LONG EXPOSURE INFORMATION) | |
| | IMU SAMPLE TIMING OFFSET | |
| | FRAME RATE | |
| CAMERA PARAMETER (CP) | ANGLE OF VIEW (FOCAL LENGTH) | |
| | ZOOM POSITION | |
| | LENS DISTORTION INFORMATION | |

| MTD2 | |
|---|---|
| IMU data | gyro |
| | accel |
| | SAMPLING RATE |
| TIMING INFORMATION (TM) | EXPOSURE TIME (shutter speed) |
| | EXPOSURE START TIMING |
| | READOUT TIME (CURTAIN SPEED) |
| | NUMBER OF EXPOSURE FRAMES (LONG EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

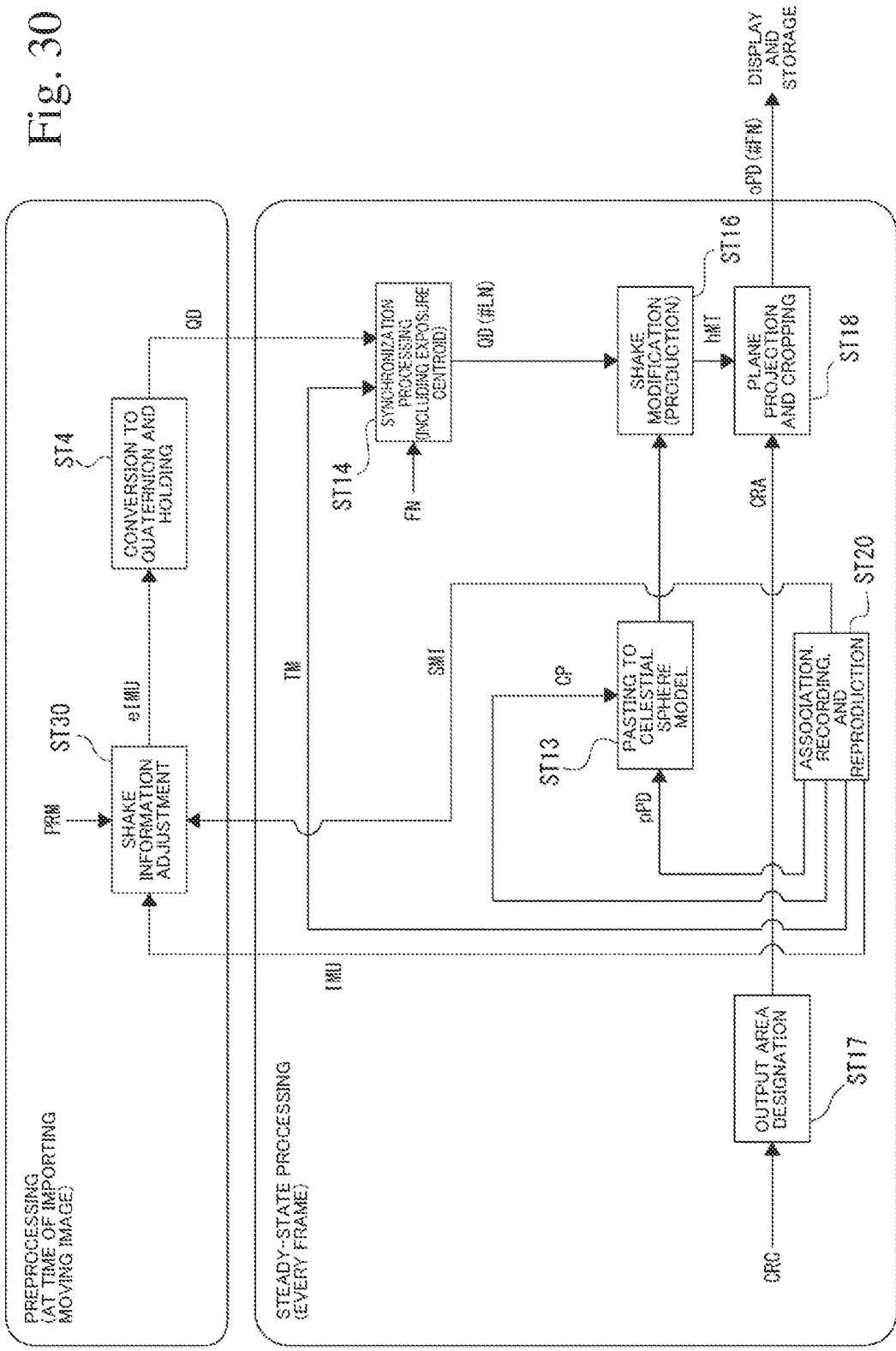

IMAGE PROCESSING DEVICE, IMAGE PROCESSING METHOD, AND PROGRAM

TECHNICAL FIELD

The present technology relates to an image processing device, an image processing method, and a program, and particularly, to image processing related to shake of an image.

BACKGROUND ART

A technology for performing various types of image processing such as correction on moving images captured by an imaging device is known.

PTL 1 below discloses that anti-vibration processing is executed on image data related to a captured image, and an influence of the anti-vibration processing on the image data after the anti-vibration processing is removed.

CITATION LIST

Patent Literature

[PTL 1] JP 2015-216510 A

SUMMARY

Technical Problem

Incidentally, in recent years, users have been able to easily perform image capturing, image adjustment, or the like using mobile terminals such as smartphones or tablets, cameras themselves, personal computers, or the like, and moving image posting or the like is also popular.

In such an environment, it is desired to produce higher quality images or various images, instead of outputting images captured by a user as they are.

Further, it is also desired that broadcasters and the like can perform various types of production of images.

Therefore, the present disclosure proposes a technology for making it easy to make adjustment related to shake in moving images.

Solution to Problem

An image processing device according to the present technology includes a shake information adjustment unit configured to generate adjusted shake information by adjusting imaging time shake information when input image data constituting a moving image is captured; an shake modification unit configured to perform shake modification processing for changing a state of shake of the input image data using the adjusted shake information to obtain shake-modified image data; and an association unit configured to associate at least one of the input image data and the shake-modified image data, the shake information at the time of imaging, and shake modification information capable of specifying a processing amount of the shake modification processing with each other.

The shake modification processing is to change a state of the shake, for example, by reducing the shake occurring in a moving image or adding shake. The shake modification unit performs the shake modification processing using the adjusted shake information of the shake information adjustment unit. In this case, the image data, the shake information at the time of imaging, and the adjusted shake information are associated with each other.

The shake information at the time of imaging is information indicating a motion of the imaging device at the time of imaging, and includes, for example, detection values of sensors such as an acceleration sensor and an angular velocity sensor of the imaging device, and posture information, an amount of rotation, and an amount of movement of the imaging device obtained from these.

In the image processing device according to the present technology described above, it is conceivable that the shake modification unit add shake production to the input image data on the basis of the adjusted shake information as the shake modification processing.

The shake production corresponds to, for example, adding a state of the shake or adjusting a shake state of the image as production of the image. In this case, the adjusted shake information becomes the shake information adjusted for shake production.

In the image processing device according to the present technology described above, it is conceivable that the association unit associate the input image data with the shake information at the time of imaging and the shake modification information.

For example, an image in a state in which the shake modification has not been performed can be associated and provided to another device.

In the image processing device according to the present technology described above, it is conceivable that the shake modification unit remove shake of the input image data on the basis of the shake information at the time of imaging as the shake modification processing.

Shake removal is removing shake (including reducing shake) that occurs in an image due to the motion of the imaging device (camera shake, or the like) at the time of imaging. The camera shake of an image or the like is removed by using the shake information at the time of imaging.

In the image processing device according to the present technology described above, it is conceivable that the association unit associate the shake-modified image data with the shake information at the time of imaging and the shake modification information.

For example, an image subjected to shake modification processing as shake removal, that is, an image in which shake due to a motion of the imaging device at the time of imaging has been removed can be associated and provided to another device.

Further, for example, an image subjected to the shake modification processing as shake reproduction may be associated and provided to another device.

In the image processing device according to the present technology described above, it is conceivable that the shake modification unit perform processing of cancelling the shake removal processing performed at the time of imaging using metadata associated with the input image data with respect to the input image data and then perform the shake modification processing.

When shake removal processing such as camera shake removal has been performed in the imaging device, the shake modification processing is performed after returning to a state in which the camera shake removal has not been performed occurs.

In the image processing device according to the present technology described above, it is conceivable that the image data associated with the shake information at the time of imaging and the shake modification information by the association unit be image data that is in a state in which the shake removal processing at the time of imaging has not been performed.

In this case, it is conceivable that the image data be the input image data that has not been subjected to the shake removal processing at the time of imaging. Further, it is conceivable that the image data be image data obtained by performing processing of cancelling the shake removal processing performed at the time of imaging on the input image data.

For example, an image in which shake removal at the time of imaging has been cancelled or an image in which shake removal has not been performed at the time of imaging can be associated and provided to another device.

In the image processing device according to the present technology described above, it is conceivable that the shake information at the time of imaging be posture information of the imaging device when the imaging device captures the input image data.

The posture information of the imaging device can be obtained from, for example, information from an angular velocity sensor or an acceleration sensor.

In the image processing device according to the present technology described above, it is conceivable that the posture information be shift information or rotation information indicating a motion of the imaging device when the imaging device captures the input image data.

For example, the posture information of the imaging device may be converted into shift information and rotation information and stored.

In the image processing device according to the present technology described above, it is conceivable that the shake information adjustment unit generate adjusted shake information for adding shake of a shake amount specified using an shake modification parameter for specifying the processing amount of the shake modification processing on the basis of the shake information at the time of imaging and the shake modification parameter.

For example, the posture information after adjustment obtained by adjusting the posture information using the shake modification parameter is generated and provided to the shake modification processing.

In the image processing device according to the present technology described above, it is conceivable that the shake modification information be the shake modification parameter.

The shake modification parameter is, for example, a parameter of the shake modification processing input for shake production.

In the image processing device according to the present technology described above, it is conceivable that the shake modification parameter be a parameter designated by a user operation.

That is, the shake modification parameter can be arbitrarily input by the user.

In the image processing device according to the present technology described above, it is conceivable that the shake modification information be the adjusted shake information.

For example, the posture information after adjustment adjusted using the shake modification parameter is stored as the shake modification information.

In the image processing device according to the present technology described above, it is conceivable that the shake information adjustment unit perform gain processing based on the shake modification parameter for each frequency band of the shake on the shake information for shake addition based on the shake information at the time of imaging to generate the adjusted shake information. For example, the gain designated by the shake modification parameter may be given to the posture information for each frequency band of the shake so that the posture information after adjustment is generated, and the posture information after adjustment is provided to the shake modification processing.

In the image processing device according to the present technology described above, it is conceivable that the shake information adjustment unit perform gain processing based on the shake modification parameter for each direction of the shake on the shake information for shake addition based on the shake information at the time of imaging to generate the adjusted shake information. For example, the gain designated by the shake modification parameter may be given to the posture information for each of directions (yaw, pitch, and roll) of the shake so that the posture information after adjustment is generated, and posture information after adjustment is provided to the shake modification processing.

In the image processing device according to the present technology described above, it is conceivable that the shake information at the time of imaging be posture information corresponding to each frame of the input image data obtained on the basis of metadata generated at the time of capturing the input image data.

For example, the posture information (for example, quaternion) of the imaging device obtained from the information of an angular velocity sensor and an acceleration sensor is adjusted so that the posture information after adjustment is used for shake modification processing.

In the image processing device according to the present technology described above, it is conceivable that the shake modification unit paste each frame of the input image data to a celestial sphere model and rotate each frame using the posture information after adjustment, the posture information after adjustment being the adjusted shake information corresponding to each frame, to perform the shake modification processing.

For example, rotation processing is performed on a celestial sphere model using the posture information after adjustment obtained by adjusting the posture information (for example, the quaternion) of the imaging device obtained from the information of an angular velocity sensor and an acceleration sensor.

Another image processing device according to the present technology includes a shake information adjustment unit configured to generate adjusted shake information using shake information at the time of imaging associated with image data constituting a moving image and shake modification information capable of specifying a processing amount of shake modification processing; and an shake modification unit configured to perform the shake modification processing for changing a state of shake of the image data using the adjusted shake information.

That is, an image processing device is configured, which performs secondary shake modification processing when the information in which the image data constituting the moving image, the shake information at the time of imaging, and the shake modification information capable of specifying the processing amount of the shake modification processing are associated with each other is provided. In this case, it is conceivable that the image data be image data not subjected to shake removal processing at the time of imaging or image data subjected to processing of cancelling the shake removal processing performed at the time of imaging.

That is, the image data is image data that is in a state in which the imaging device has not performed the shake removal processing.

Further, it is conceivable that the image data be image data in which the shake has been removed using the shake modification information based on the shake information at the time of imaging.

That is, the image data is image data that is in a state in which an influence of shake in the imaging device is removed (including reduction).

An image processing method according to the present technology includes performing shake information adjustment processing for adjusting shake information at the time of imaging when input image data constituting a moving image is captured and generating adjusted shake information; shake modification processing for changing a state of shake of the input image data using the adjusted shake information to obtain shake-modified image data; and association processing for associating at least one of the input image data and the shake-modified image data, the shake information at the time of imaging, and shake modification information capable of specifying a processing amount of the shake modification processing with each other.

This allows information on which the shake production or the shake removal for the image has been performed to be stored.

The program related to the present technology is a program that causes an information processing device to execute processing corresponding to such an image processing method.

This makes it possible for various information processing devices to execute the image processing of the present disclosure.

BRIEF DESCRIPTION OF DRAWINGS

FIG. 1 is an illustrative diagram of a device that is used in an embodiment of the present technology.

FIG. 8 is an illustrative diagram of content of an image file and metadata of the embodiment.

FIG. 9 is an illustrative diagram of metadata regarding lens distortion correction.

FIG. 11 is an illustrative diagram of pasting to a celestial sphere model of the embodiment.

FIG. 16 is an illustrative diagram of association between an output image and the celestial sphere model of the embodiment.

FIG. 17 is an illustrative diagram of rotation and perspective projection of an output coordinate plane of the embodiment.

FIG. 18 is an illustrative diagram of a cropping area of the embodiment.

FIG. 19 is an illustrative diagram of metadata to be transmitted according to the first embodiment.

FIG. 22 is an illustrative diagram of metadata that is transmitted according to a second embodiment.

FIG. 27 is an illustrative diagram of metadata that is transmitted according to the fourth embodiment.

FIG. 29 is an illustrative diagram of transmitted metadata according to the fifth embodiment.

FIG. 30 is an illustrative diagram of secondary image processing according to the third embodiment.

DESCRIPTION OF EMBODIMENTS

Figure 2:
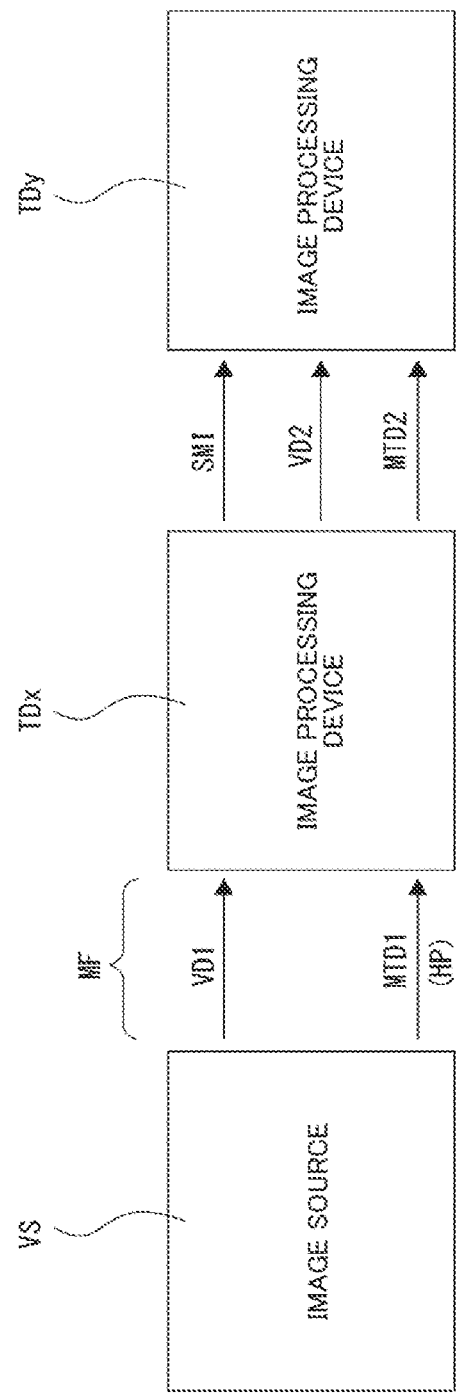
FIG. 2 is an illustrative diagram of information that transmitted between devices of the embodiment.

Hereinafter, embodiments will be described in the following order.

<1. Configuration of device applicable as an image processing device>
<2. Device configuration and processing function>
<3. Image files and metadata>
<4. First embodiment>
<5. Second embodiment>
<6. Third embodiment>
<7. Fourth embodiment>
<8. Fifth embodiment>
<9. Conclusion and modification examples>

Some terms used in the description will be described prior to the description of the embodiments.

"Shake" refers to interframe shake of images constituting a moving image. The shake broadly refers to a vibration component (shake of an image between frames) that is generated between the frames, such as shake caused by camera shake or the like in an image captured by a so-called imaging device, or shake intentionally added by image processing.

"Interframe shake modification" refers to changing a state of shake in an image, such as reducing shake occurring in the image or adding shake to the image. This "interframe shake modification" includes "interframe shake removal (interframe shake reduction)" and "interframe shake production".

"Shake removal" refers to eliminating shake that occurs in an image due to camera shake (removing all of the shake) or reducing the shake (removing part of the shake). That is, "shake removal" refers to making adjustment to reduce the shake on the basis of the shake information at the time of imaging. So-called image stabilization performed in the imaging device is to perform shake removal.

"shake production" may include adding shake to an image or reducing shake, and may be the same as "shake removal" as a result in that sense, but in the present embodiment, "shake production" refers to instructing an amount of change in shake according to an operation of a user or automatic control, and changing a shake state of the image according to the instruction. For example, reducing or increasing shake by changing the shake information at the time of imaging according to a user instruction or the like and performing the shake modification processing on the basis of the changed shake information, or reducing or increasing the shake by performing shake modification on the basis of information for adding generated shake according to the user instruction or the like corresponds to the "shake production".

It is conceivable that, even when adjustment is made in a direction in which shake is curbed, for example, intentionally adjusting a shake state corresponds to "shake production".

It is assumed that an example of the purpose of the shake production includes intentionally shaking an image in order to give dynamics to scenes of a moving image.

"Shake information at the time of imaging" is information on shake at the time of imaging in an imaging device, and corresponds to detection information of a motion of the imaging device, information that can be calculated from the detection information, posture information indicating a posture of the imaging device, information on shift or rotation as a motion of the imaging device, and the like.

In the embodiment, specific examples of the "shake information at the time of imaging" include quaternion (QD), IMU data, and shift and rotation information (SFRO). Of course, the present technology is not limited thereto.

"Adjusted shake information" is shake information generated by adjusting shake information at the time of imaging, and is information that is used for shake modification processing. For example, the adjusted shake information is shake information that is adjusted according to a user operation or automatic control. In the embodiment, specific examples of the "adjusted shake information" include a quaternion (eQD) after adjustment and IMU data (eIMU) after adjustment, but of course, the present technology is not limited thereto.

"Shake modification information" (denoted by a reference sign "SMI" in the description and the drawings) is information on shake modification processing of image data, and may be any information from which a processing amount of the shake modification processing can be specified.

In the embodiment, specific examples of the "shake modification information" include an shake modification parameter (PRM) and the quaternion (eQD) after adjustment, but of course, the present technology is not limited thereto.

1. CONFIGURATION OF DEVICE APPLICABLE AS IMAGE PROCESSING DEVICE

In the following embodiments, an example in which an image processing device according to the present disclosure is realized mainly by an information processing device such as a smartphone or a personal computer will be described, but the image processing device can be realized in various devices. First, a device to which the technology of the present disclosure can be applied will be described.

FIG. 1A illustrates an example as an image source VS and image processing devices (TDx and TDy) that acquire an image file MF from the image source VS. The image processing device TDx is a device that primarily performs shake modification processing on image data acquired from the image source VS.

On the other hand, the image processing device TDy is a device that secondarily performs the shake modification processing on the image data already subjected to shake modification processing by another image processing device.

An imaging device 1, a server 4, a recording medium 5, or the like is assumed as the image source VS.

A mobile terminal 2 such as a smartphone or a personal computer 3 is assumed as the image processing device TDx or TDy. Although not shown, various devices such as an image editing dedicated device, a cloud server, a television device, and a video recording and reproduction device are assumed as image processing devices TDx and TDy. These devices can function as any of the image processing devices TDx and TDy.

The imaging device 1 as the image source VS is, for example, a digital camera capable of performing moving image capturing, and transfers an image file MF obtained by the moving image capturing to the mobile terminal 2, the personal computer 3, or the like via wired communication or wireless communication. The server 4 may be any one of a local server, a network server, a cloud server, and the like, but refers to a device capable of providing the image file MF captured by the imaging device 1. It is conceivable that the server 4 transfer the image file MF to the mobile terminal 2, the personal computer 3, or the like via any transmission path.

The recording medium 5 may be any one of a solid-state memory such as a memory card, a disc-form recording medium such as an optical disc, a tape-form recording medium such as a magnetic tape, and the like, but refers to a removable recording medium in which the image file MF captured by the imaging device 1 is recorded. It is conceivable that the image file MF read from the recording medium 5 be read by the mobile terminal 2, the personal computer 3, or the like.

The mobile terminal 2, the personal computer 3, or the like as the image processing device TDx or TDy can perform image processing on the image file MF acquired from the above image source VS. The image processing referred to herein includes shake modification processing (shake production or shake removal).

The shake modification processing is performed using posture information corresponding to a frame of image data constituting a moving image after processing of pasting to a celestial sphere model is performed on each frame.

A certain mobile terminal 2 or personal computer 3 may serve as an image source VS for another mobile terminal 2 or personal computer 3 that functions as an image processing device TDx or TDy.

FIG. 1B illustrates the imaging device 1 or the mobile terminal 2 as one device capable of functioning as both the image source VS and the image processing device TDx.

For example, a microcomputer or the like inside the imaging device 1 performs the above shake modification processing.

That is, the imaging device 1 can perform the shake modification processing on the image file MF generated by the imaging and perform image output as an image processing result after shake removal or shake production.

The same applies to the mobile terminal 2, and since the mobile terminal 2 can be the image source VS by including an imaging function, the mobile terminal 2 can perform the above shake modification processing on the image file MF generated by imaging and thus perform image output for an image processing result after shake removal or shake production.

Of course, the present technology is not limited to the imaging device 1 or the mobile terminal 2, and various other devices that can serve as an image processing device also serving as an image source are conceivable.

As described above, there are various devices as the device functioning as the image processing device TDx or TDy of the embodiment and the image source VS, but in the following description, the image source VS such as the imaging device 1, the image processing device TDx such as the mobile terminal 2, and the other image processing device TDy are separate devices.

FIG. 2 illustrates a state of information transmission in the image source VS, the image processing device TDx, and the image processing device TDy.

Image data VD1 and metadata MTD1 are transmitted from the image source VS to the image processing device TDx via wired communication, wireless communication, or a recording medium.

As will be described below, the image data VD1 and the metadata MTD1 are information transmitted as, for example, the image file MF.

The metadata MTD1 may include coordinate transformation parameter HP as information on shake removal at the time of imaging performed as, for example, image stabilization.

The image processing device TDx can receive the image data VD1, the metadata MTD1, and the coordinate transformation parameter HP and perform various types of processing.

For example, the image processing device TDx can perform the shake modification processing on the image data VD1 using shake information at the time of imaging included in the metadata MTD1.

Further, for example, the image processing device TDx can cancel the shake removal applied to the image data VD1 at the time of imaging using the coordinate transformation parameter HP included in the metadata MTD1.

When the shake modification processing is performed, the image processing device TDx performs processing of associating the image data, the shake information at the time of imaging, and the shake modification information SMI capable of specifying the processing amount of the shake modification processing with each other.

The associated image data, shake information at the time of imaging, and shake modification information SMI can be collectively or separately transmitted to the image processing device TDy via wired communication, wireless communication, or a recording medium.

Here, the term "associate" means, for example, making other information available (linkable) when one piece of information (data, command, program, or the like) is processed. That is, associated information may be collected as one file or the like, or may be individual information. For example, information B associated with information A may be transmitted on a transmission path different from that for information A. Further, for example, information B associated with information A may be recorded on a recording medium (or another recording area of the same recording medium) different from that for information A. This "association" may be for part of the information, not the entire information. For example, an image and information corresponding to the image may be associated with each other in an arbitrary unit such as a plurality of frames, one frame, or a part within a frame.

More specifically, for example, actions such as assigning the same ID (identification information) to a plurality of pieces of information, recording a plurality of pieces of information on the same recording medium, storing a plurality of pieces of information in the same folder, storing a plurality of pieces of information in the same file (one is imparted to the other as metadata), and embedding a plurality of pieces of information in the same stream, for example, embedding meta in an image like an electronical watermark are included in "associate".

FIG. 2 illustrates image data that is transmitted from the image processing device TDx to the image processing device TDy as image data VD2. Various examples such as an image in which the shake removal in the imaging device 1 has been cancelled, and an image in which the shake removal has been performed by the image processing device TDx, or before the shake modification processing has been performed by the image processing device TDx are conceivable as the image data VD2.

Further, in FIG. 2, metadata MTD2 transmitted from the image processing device TDx to the image processing device TDy is illustrated. The metadata MTD2 may be the same information as the metadata MTD1 or may be information partially different from the metadata MTD1. However, the metadata MTD2 includes shake information at the time of imaging.

Therefore, the image processing device TDy can acquire at least the image data VD2, the shake information at the time of imaging included in the metadata MTD2, and the shake modification information SMI associated with each other. A data form in which the shake modification information SMI is also included in the metadata MTD2 is conceivable.

In the present embodiment, image processing that can be executed by the image processing devices TDx and TDy will be described on the assumption of such information transmission.

2. DEVICE CONFIGURATION AND PROCESSING FUNCTION

First, a configuration example of the imaging device 1 serving as the image source VS will be described with reference to FIG. 3.

As described in FIG. 1B, when it is assumed that the image file MF captured by the mobile terminal 2 is subjected to image processing in the mobile terminal 2, the mobile terminal 2 may have the same configuration as the following imaging device 1 in terms of an imaging function.

Further, in the imaging device 1, so-called image stabilization, which is processing of reducing shake of an image due to motion of the imaging device at the time of imaging, is performed, but this is "shake removal" that is performed by the imaging device. On the other hand, the "shake production" or "shake removal" that is performed by the image processing devices TDx and TDy is separate processing independent of the "shake removal" that is performed at the time of imaging by the imaging device 1.

Figure 3:
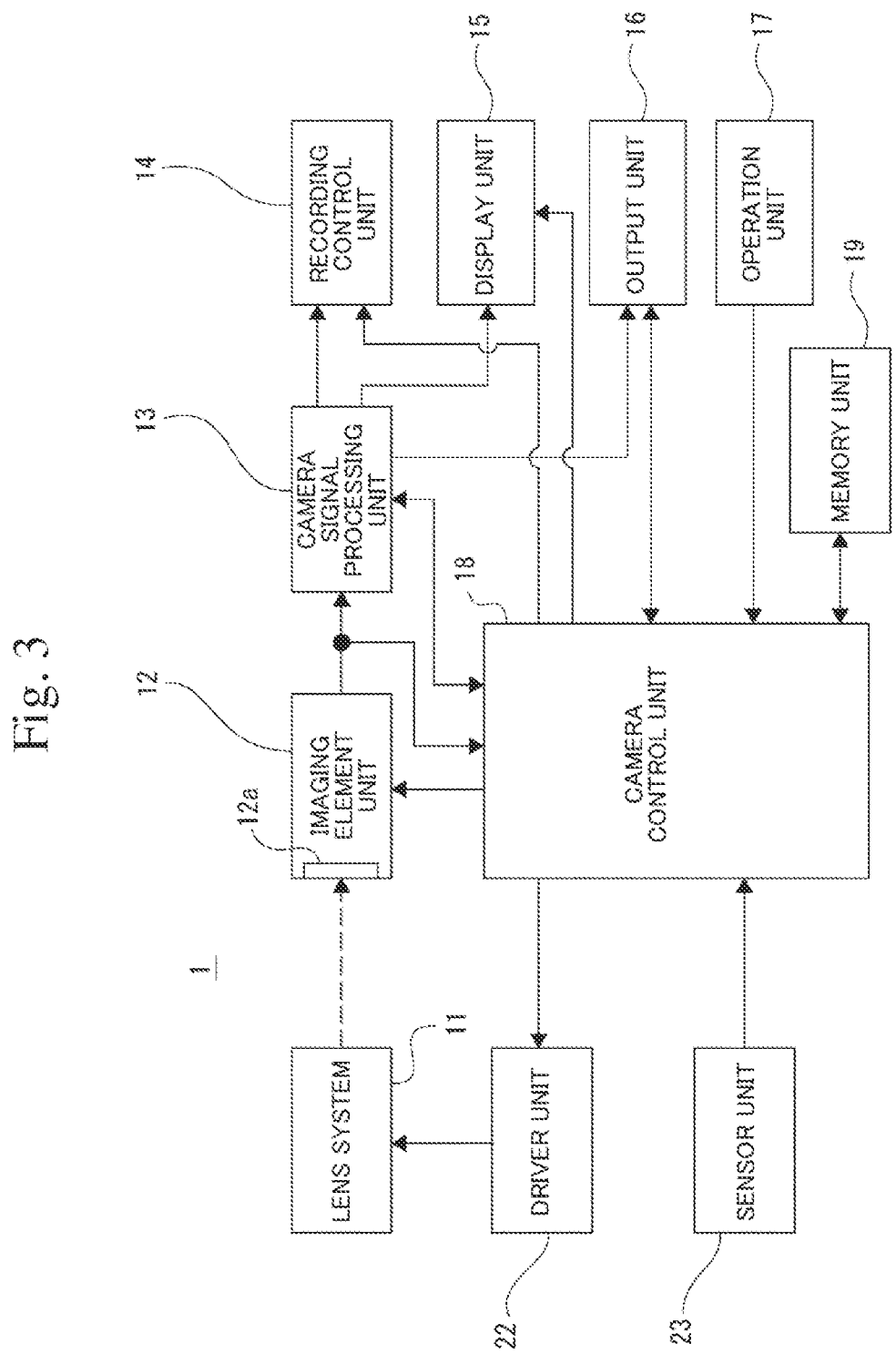
FIG. 3 is a block diagram of an imaging device according to the embodiment.

As illustrated in FIG. 3, the imaging device 1 includes, for example, a lens system 11, an imaging element unit 12, a camera signal processing unit 13, a recording control unit 14, a display unit 15, an output unit 16, an operation unit 17, a camera control unit 18, a memory unit 19, a driver unit 22, and a sensor unit 23.

The lens system 11 includes, for example, lenses such as a cover lens, a zoom lens, and a focus lens, and an aperture mechanism. Light (incident light) from a subject is guided by the lens system 11 and condensed on the imaging element unit 12.

Although not illustrated, an optical image stabilization mechanism that corrects shake (shake) and blur of an image due to camera shake or the like may be provided in the lens system 11.

The imaging element unit 12 includes, for example, an image sensor 12a (an imaging element), such as a complementary metal oxide semiconductor (CMOS) type or charge coupled device (CCD) type image sensor.

This imaging element unit 12 executes, for example, correlated double sampling (CDS) processing, automatic gain control (AGO) processing, and the like for an electrical signal obtained by photoelectric conversion of light received by the image sensor 12a, and further performs analog/digital (A/D) conversion processing. A captured signal as digital data is output to the camera signal processing unit 13 or the camera control unit 18 in a subsequent stage.

An optical image stabilization mechanism (not illustrated) is, for example, a mechanism for correcting shake of an image by moving the image sensor 12a instead of the lens system 11, or a spatial optical image stabilization mechanism using a gimbal (a balanced optical image stabilization mechanism), but any scheme may be used.

In the optical image stabilization mechanism, blur in the frame is also corrected as will be described below in addition to the shake (shake).

The camera signal processing unit 13 is configured as an image processing processor by, for example, a digital signal processor (DSP). The camera signal processing unit 13 performs various types of signal processing on a digital signal (a captured image signal) from the imaging element unit 12. For example, the camera signal processing unit 13 performs preprocessing, simultaneous processing, YC generation processing, resolution conversion processing, codec processing, and the like as camera processing.

Further, the camera signal processing unit 13 performs various types of correction processing. However, it is assumed that image stabilization may or may not be performed in the imaging device 1.

In the preprocessing, clamping processing for clamping black levels of R, G, and B to a predetermined level, processing for correction between the color channels of R, G, and B, or the like is performed on the captured image signal from the imaging element unit 12.

In the simultaneous processing, color separation processing is performed so that image data for each pixel has all color components of R, G, and B. For example, in the case of an imaging element using color filters in a Bayer array, demosaic processing is performed as the color separation processing.

In the YC generation processing, a luminance (Y) signal and a color (C) signal are generated (separated) from image data of R, G, and B.

In the resolution conversion processing, resolution conversion processing is executed for the image data subjected to various types of signal processing.

Figure 4:
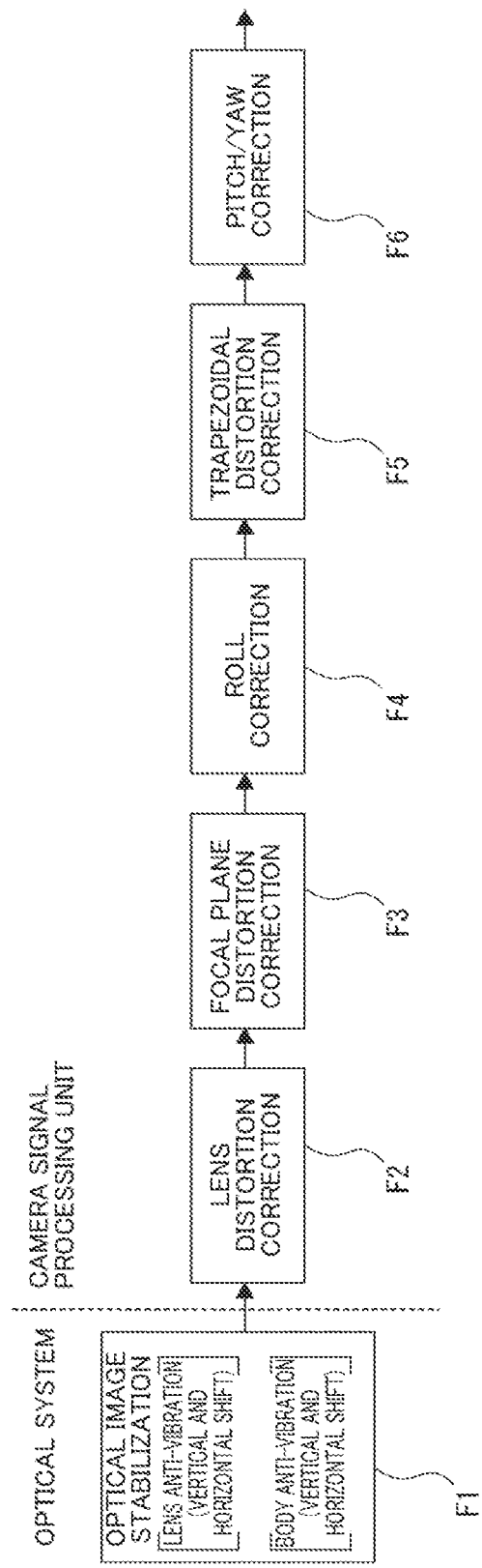
FIG. 4 is an illustrative diagram of image shake removal processing in the imaging device of the embodiment.

An example of various types of correction processing (internal correction of the imaging device 1) that is performed by the camera signal processing unit 13 is illustrated in FIG. 4. In FIG. 4, the optical image stabilization that is performed by the lens system 11 and the correction processing that is performed by the camera signal processing unit 13 are illustrated in execution order.

In the optical image stabilization as processing F1, in-lens image stabilization due to shifting in a yaw direction and a pitch direction of the lens system 11 or in-body image stabilization due to shifting in the yaw direction and the pitch direction of the image sensor 12a is performed so that an image of the subject is formed on the image sensor 12a in a state in which an influence of camera shake is physically cancelled.

One or both of the in-lens image stabilization and the in-body image stabilization may be used. When both of the in-lens image stabilization and the in-body image stabilization are used, it is conceivable that in the in-body image stabilization, shifting in the yaw direction and the pitch direction is not performed.

Further, neither the in-lens image stabilization nor the in-body image stabilization is adopted, and for camera shake, only electronical image stabilization or only optical image stabilization may be performed.

In the camera signal processing unit 13, processing from processing F2 to processing F7 is performed through spatial coordinate transformation for each pixel.

In processing F2, lens distortion correction is performed.

In processing F3, the focal plane distortion correction is performed as one element of the electronical image stabilization. This is, for example, correcting distortion in a case in which reading using a rolling shutter scheme is performed by the CMOS type image sensor 12a.

Roll correction is performed in processing F4. That is, correction of a roll component is performed as one element of the electronical image stabilization. In processing F5, trapezoidal distortion correction is performed on a trapezoidal distortion amount caused by the electronical image stabilization. The trapezoidal distortion caused by the electronical image stabilization is perspective distortion caused by cropping a place away from a center of the image.

In processing F6, shifting or cropping in the pitch direction and the yaw direction is performed as one element of the electronical image stabilization.

For example, the image stabilization, the lens distortion correction, and the trapezoidal distortion correction are performed by the above procedure.

It is not essential to perform all of the processing listed here, and an order of the processing may be changed appropriately.

In the codec processing in the camera signal processing unit 13 in FIG. 3, coding processing for recording or communication, and file generation, for example, are performed on the image data subjected to the various types of processing. For example, generation of an image file MF in an MP4 format used for recording an MPEG-4 compliant moving image/audio is performed. It is also conceivable to perform generation of a file in a format such as Joint Photographic Experts Group (JPEG), Tagged Image File Format (TIFF), or Graphics Interchange Format (GIF) as a still image file.

The camera signal processing unit 13 also performs generation of metadata to be added to the image file MF using, for example, information from the camera control unit 18.

Further, although an audio processing system is not illustrated in FIG. 3, in fact, an audio recording system and an audio processing system are included, and the image file MF may include audio data together with image data serving as a moving image.

The recording control unit 14 performs, for example, recording and reproduction on a recording medium using a non-volatile memory. The recording control unit 14 performs processing of recording the image file MF such as moving image data or still image data, a thumbnail image, or the like on the recording medium, for example.

An actual form of the recording control unit 14 can be considered in various ways. For example, the recording control unit 14 may be configured as a flash memory and a writing and reading circuit thereof built in the imaging device 1, or may be in the form of a card recording and reproduction unit that performs recording and reproduction access for a recording medium that can be attached to and detached from the imaging device 1, such as a memory card (portable flash memory, or the like). Further, the recording control unit 14 may be realized as a hard disk drive (HDD) or the like as a form built in the imaging device 1.

The display unit 15 is a display unit that performs various displays to an imaging person, and is, for example, a display panel or viewfinder using on a display device such as a liquid crystal panel (LCD: Liquid Crystal Display) or an organic electro-luminescence (EL) display disposed in a housing of the imaging device 1. The display unit 15 causes various displays to be executed on the display screen on the basis of an instruction of the camera control unit 18.

For example, the display unit 15 causes the recording control unit 14 to display a reproduced image of the image data read from the recording medium.

Further, image data of the captured image of which a resolution has been converted for a display by the camera signal processing unit 13 may be supplied to the display unit 15, and the display unit 15 may perform a display on the basis of the image data of the captured image in response to an instruction from the camera control unit 18. Accordingly, a so-called through image (a monitoring image of a subject), which is a captured image that is being subjected to composition confirmation, is displayed.

Further, the display unit 15 causes a display of various operation menus, icons, messages, or the like, that is, a graphical user interface (GUI) to be executed on the screen on the basis of the instruction of the camera control unit 18.

The output unit 16 performs data communication or network communication with an external device by wire or wirelessly.

For example, image data (still image file or moving image file) is transmitted and output to an external display device, recording device, reproduction device, or the like.

Further, the output unit 16 is a network communication unit, and may perform communication based on various networks such as the Internet, a home network, and a local area network (LAN), and perform transmission or reception of various pieces of data to or from a server, a terminal, or the like on the network.

The operation unit 17 collectively indicates an input device allowing the user to perform various operation inputs. Specifically, the operation unit 17 indicates various operators (keys, a dial, a touch panel, a touch pad, or the like) provided in the housing of the imaging device 1.

The operation of the user is detected by the operation unit 17, and a signal according to the input operation is sent to the camera control unit 18.

The camera control unit 18 is configured of a microcomputer (arithmetic processing device) including a central processing unit (CPU).

The memory unit 19 stores information or the like that the camera control unit 18 uses for processing. As the illustrated memory unit 19, for example, a read only memory (ROM), a random access memory (RAM), a flash memory, and the like are comprehensively shown.

The memory unit 19 may be a memory area built in the microcomputer chip serving as the camera control unit 18, or may be configured of a separate memory chip.

The camera control unit 18 executes a program stored in the ROM, flash memory, or the like of the memory unit 19 to control the entire imaging device 1.

For example, the camera control unit 18 controls operations of respective necessary units with respect to, for example, control of a shutter speed of the imaging element unit 12, an instruction for various types of signal processing in the camera signal processing unit 13, an imaging operation or a recording operation according to a user operation, a reproducing operation of recorded image files, an operation of the lens system 11 such as zoom, focus, and aperture adjustments in a lens barrel, and an operation of a user interface.

The RAM in the memory unit 19 is used for temporary storage of data, programs, and the like as a work area when various types of data processing of the CPU of the camera control unit 18 are performed.

The ROM or flash memory (a nonvolatile memory) in the memory unit 19 is used for storage of an operating system (OS) allowing the CPU to control each unit, content files such as image files, application programs for various operations, firmware, and the like.

A motor driver for a zoom lens drive motor, a motor driver for a focus lens drive motor, and a motor driver for an aperture mechanism motor, for example, are provided in the driver unit 22.

These motor drivers apply a drive current to the corresponding driver in response to an instruction from the camera control unit 18, to execute movement of a focus lens and zoom lens, opening and closing of aperture blades of the aperture mechanism, and the like.

The sensor unit 23 comprehensively indicates various sensors mounted in the imaging device.

The sensor unit 23 has, for example, an inertial measurement unit (IMU) mounted therein and detects, for example, an angular velocity using an angular velocity (gyro) sensor for three axes of pitch, yaw, and roll, and detects an acceleration using an acceleration sensor.

The sensor unit 23 may include a sensor capable of detecting camera shake at the time of imaging, and does not need to include both the gyro sensor and the acceleration sensor.

Further, a position information sensor, an illuminance sensor, or the like may be mounted as the sensor unit 23.

For example, the image file MF as a moving image captured and generated by the above imaging device 1 can be transmitted to an image processing device TDx or TDy such as the mobile terminal 2 and subjected to image processing.

Figure 5:
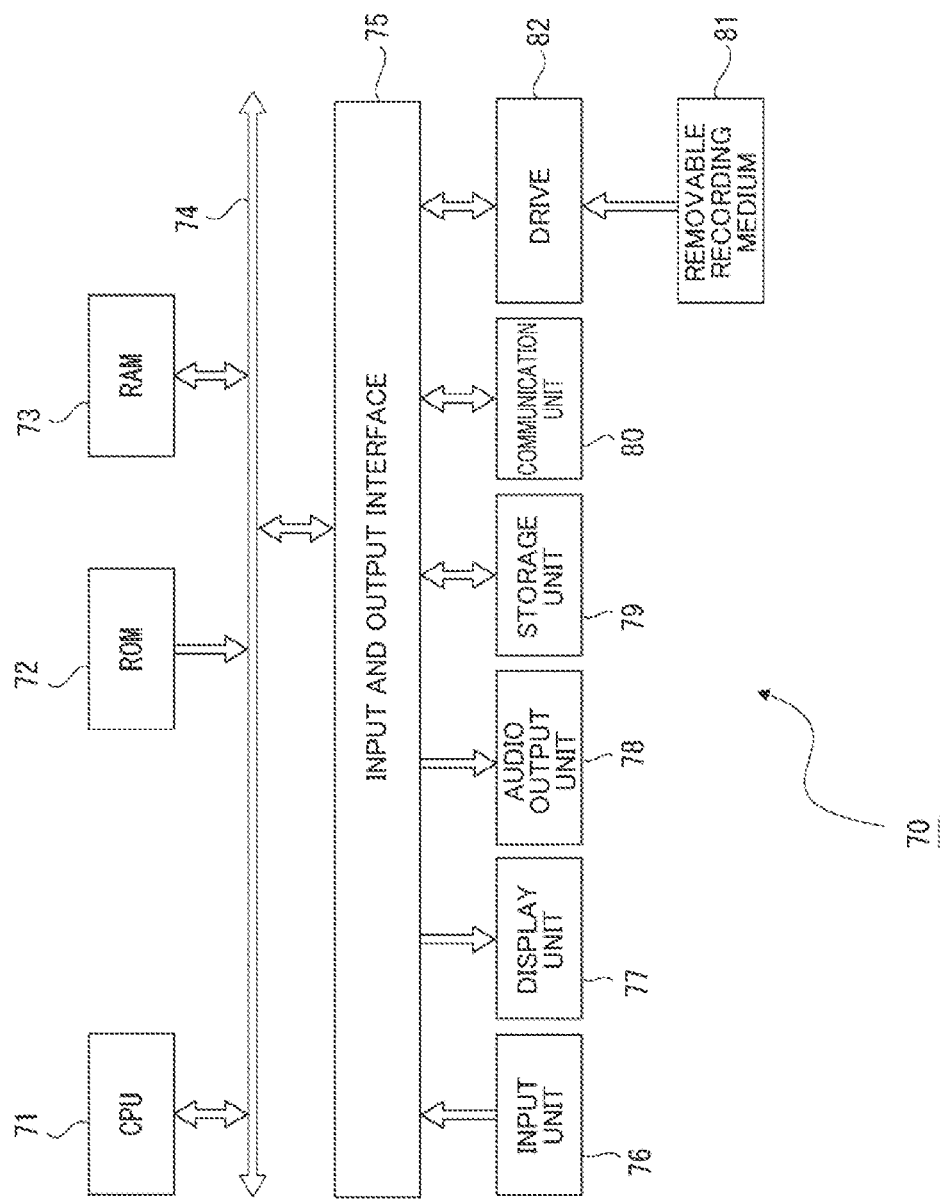
FIG. 5 is a block diagram of an information processing device according to the embodiment.

The mobile terminal 2 and the personal computer 3 serving as the image processing devices TDx and TDy can be realized as, for example, an information processing device having the configuration illustrated in FIG. 5. Similarly, the server 4 can be realized by the information processing device having the configuration illustrated in FIG. 5.

In FIG. 5, a CPU 71 of an information processing device 70 executes various types of processing according to a program stored in a ROM 72 or a program loaded from a storage unit 79 into a RAM 73. The RAM 73 also appropriately stores data and the like necessary for the CPU 71 to execute various types of processing. The CPU 71, ROM 72, and RAM 73 are connected to each other via a bus 74. An input and output interface 75 is also connected to the bus 74.

An input unit 76 including an operator or an operation device is connected to the input and output interface 75.

For example, various operators or operation devices such as a keyboard, mouse, keys, dial, touch panel, touch pad, and remote controller are assumed as the input unit 76.

An operation of the user is detected by the input unit 76, and a signal corresponding to the input operation is interpreted by the CPU 71.

Further, a display unit 77 configured of an LCD or an organic EL panel and an audio output unit 78 configured of a speaker or the like are connected to the input and output interface 75 as one body or separate bodies.

The display unit 77 is a display unit that performs various displays, and is configured of, for example, a display device provided in the housing of the information processing device 70, or, for example, a separate display device connected to the information processing device 70.

The display unit 77 executes a display of various images for image processing, a moving image that is a processing target, and the like on the display screen on the basis of an instruction of the CPU 71. Further, the display unit 77 displays various operation menus, icons, messages, or the like, that is, a graphical user interface (GUI) on the basis of an instruction of the CPU 71.

The storage unit 79 configured of a hard disk, a solid-state memory, or the like, or a communication unit 80 configured of a modem or the like may be connected to the input and output interface 75.

The communication unit 80 performs communication processing via a transmission path such as the Internet, and performs communication with various devices using wired/wireless communication, bus communication, or the like.

A drive 82 is also connected to the input and output interface 75 as necessary, and a removable recording medium 81 such as a magnetic disk, an optical disc, a magneto-optical disc, or a semiconductor memory is appropriately mounted in the drive 82.

Using the drive 82, it is possible to read data files such as an image file MF or various computer programs from the removable recording medium 81. The read data file is stored in the storage unit 79 or an image or audio included in the data file are output by the display unit 77 or the audio output unit 78. Further, the computer program or the like read from the removable recording medium 81 is installed in the storage unit 79, as necessary.

In the information processing device 70, for example, software for image processing in the image processing device of the present disclosure can be installed via network communication using the communication unit 80 or via the removable recording medium 81. Alternatively, the software may be stored in the ROM 72, the storage unit 79, or the like in advance.

Figure 6:
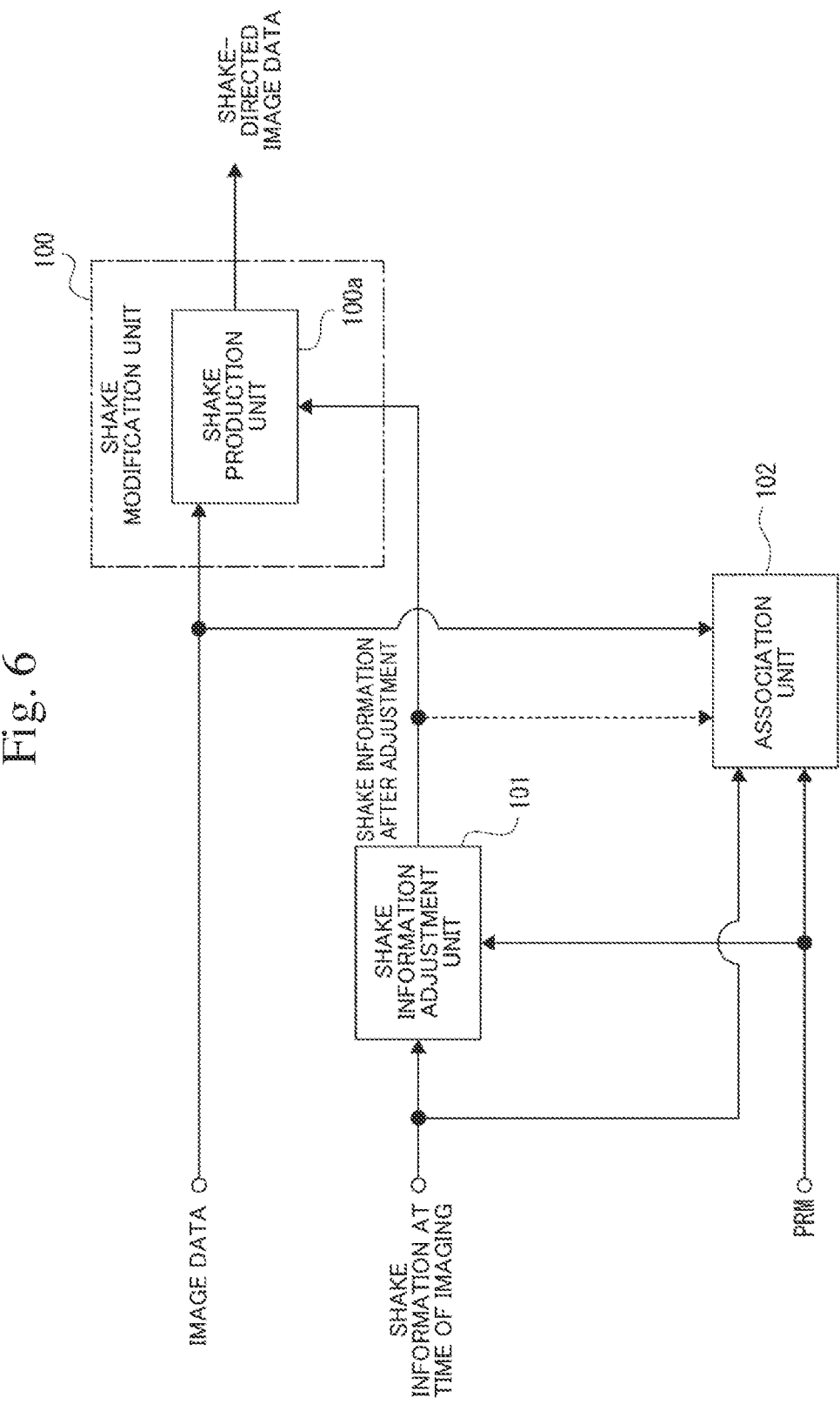
FIG. 6 is an illustrative diagram of a functional configuration of an image processing device according to the embodiment.

For example, a functional configuration as illustrated in FIG. 6 is constructed in the CPU 71 of the information processing device 70 by such software (application program).

FIG. 6 illustrates a function of the information processing device 70 that functions as the image processing device TDx. That is, the information processing device 70 (CPU 71) includes functions of an shake modification unit 100, a shake information adjustment unit 101, and an association unit 102.

The shake information adjustment unit 101 adjusts the shake information at the time of imaging for the image data constituting the moving image to generate the adjusted shake information. The shake information adjustment unit 101 passes the adjusted shake information to the shake modification unit 100. In this case, the shake information adjustment unit 101 adjusts the shake information at the time of imaging on the basis of the shake modification parameter PRM to generate the adjusted shake information.

The shake modification parameter PRM is a processing parameter that is generated according to a user operation or automatic control.

The shake modification unit 100 performs shake modification processing for changing a state of shake of the image data using the adjusted shake information.

The shake modification unit 100 has a function of an shake production unit 100a, and particularly uses the adjusted shake information to perform processing as shake production to add, increase, or decrease the shake. An output image subjected to the shake production is obtained as shake-directed image data.

The association unit 102 has a function of associating the image data, the shake information at the time of imaging, and the shake modification information capable of specifying the processing amount of the shake modification processing, with each other.

For example, the association unit 102 may store the image data, the shake information at the time of imaging, and the shake modification information in association with each other. Alternatively, it is conceivable for the association unit 102 to generate and store information for associating the image data, the shake information at the time of imaging, and the shake modification information with each other.

In this case, the image data is image data before the shake modification processing (shake production processing) is performed in the shake modification unit 100.

The shake information at the time of imaging associated with this image data is the shake information when the image data is captured by the imaging device 1. Further, the shake modification information associated with this image data becomes the shake modification parameter PRM input for shake modification for the image data. Alternatively, as indicated by a broken line, the adjusted shake information may be the shake modification information associated with the image data.

Figure 7:
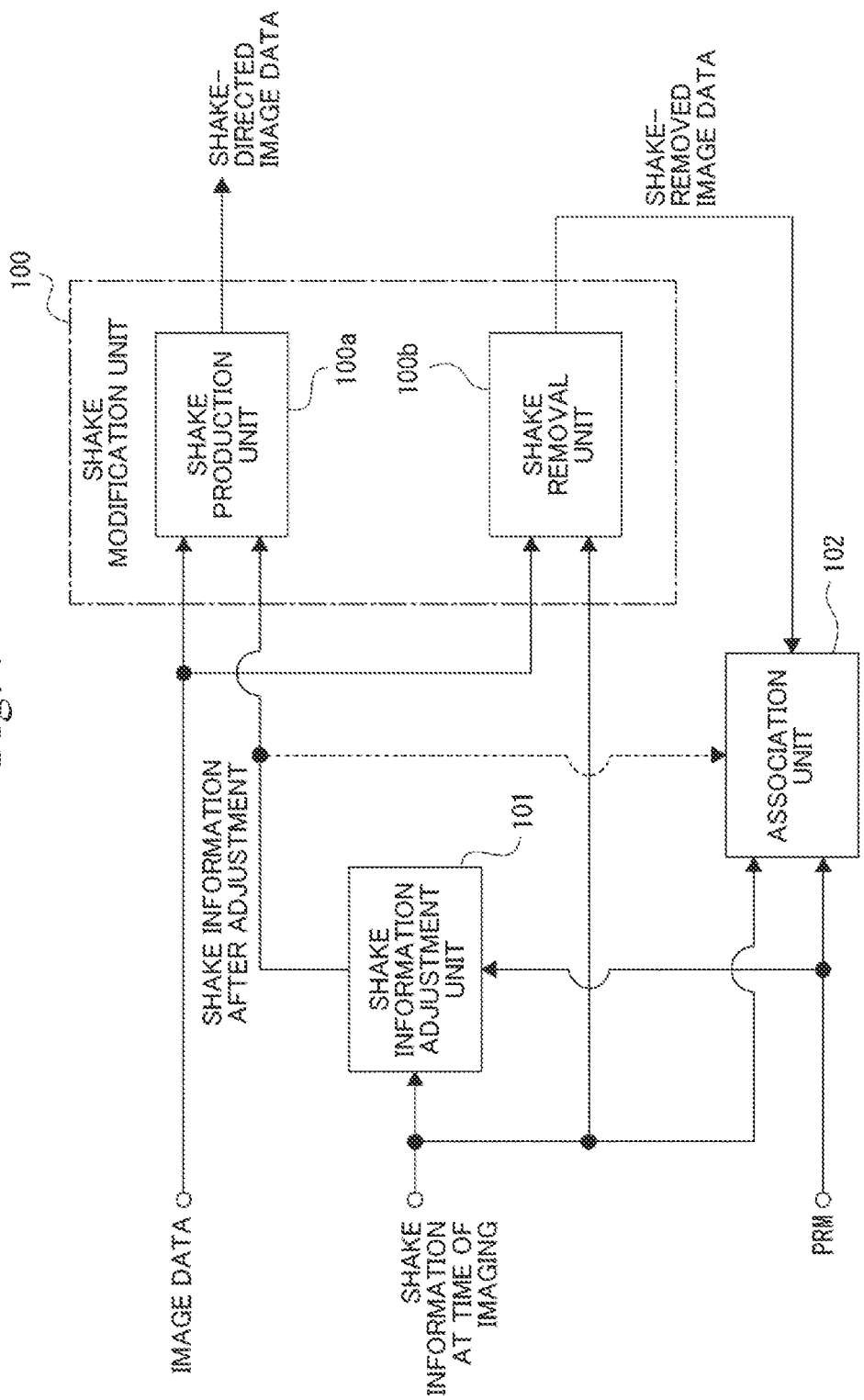
FIG. 7 is an illustrative diagram of another example of a functional configuration of an image processing device of the embodiment.

FIG. 7 illustrates a functional configuration in which FIG. 6 is slightly modified. In the case of FIG. 7, the shake modification unit 100 includes the shake production unit 100a and a shake removal unit 100b, for example.

That is, the shake modification unit 100 performs the shake production processing for changing the state of the shake of the image data by means of the shake production unit 100a using the adjusted shake information to obtain the output image subjected to the shake production.

Further, the shake modification unit 100 can perform shake removal processing by means of the shake removal unit 100b using the shake information at the time of imaging. That is, it is possible to obtain an output image in which shake due to camera shake or the like at the time of imaging is reduced.

The association unit 102 performs processing of associating the image data, the shake information at the time of imaging, and the shake modification information capable of specifying the processing amount of the shake modification processing, with each other.

In this case, the image data is the image data subjected to shake removal by the shake removal unit 100b.

The shake information at the time of imaging associated with this image data is shake information when the image data is captured.

Further, the shake modification information associated with this image data is the shake modification parameter PRM input for shake modification, as in the example of FIG. 6. Alternatively, the adjusted shake information may be used as the shake modification information, as indicated by a broken line. That is, in this case, the shake modification information that does not directly affect the image data from which the shake has been removed is associated.

The first, second, and fifth embodiments, which will be described below, are examples according to the functional configuration in FIG. 6, and the third and fourth embodiments are examples according to the functional configuration in FIG. 7.

Further, although the functional configuration as the image processing device TDx is shown above, at least the shake modification unit 100 and the shake information adjustment unit 101 in FIGS. 6 and 7 may be provided in the functional configuration as the image processing device TDy. The association unit 102 may be provided.

However, in the case of the image processing device TDy, the image data that is a processing target of the shake modification unit 100, the shake information at the time of imaging supplied to the shake information adjustment unit 101, and the shake modification parameter PRM (shake modification information) are data associated with the image processing device TDx or the like at the time of previous shake modification.

When the adjusted shake information is associated with the image data and the shake information at the time of imaging instead of the shake modification parameter PRM, the shake information adjustment unit 101 may obtain a processing amount of past shake modification from the shake information at the time of imaging and the adjusted shake information.

Further, when the image source VS and the image processing device TDx are realized by, for example, the imaging device 1 as described with reference to FIG. 1B, it is also conceivable for the camera signal combination processing unit 13 or the camera control unit 18 of the imaging device 1 to include functions in FIGS. 6 and 7 and function as the image processing device TDx.

3. IMAGE FILES AND METADATA

Content of the image file MF and content of the metadata transmitted from the image source VS such as the imaging device 1 to the image processing device TDx will be described.

FIG. 8A illustrates data included in the image file MF. As shown in FIG. 8A, the image file MF includes various pieces of data as "header", "sound", "movie", and "metadata".

In the "header", for example, information indicating the presence or absence of metadata is described together with information such as a file name and a file size.

The "sound" is audio data recorded together with the moving image. For example, 2-channel stereo audio data is stored.

The "movie" is moving image data, and includes image data as respective frames (#1, #2, #3, . . . ) constituting the moving image.

As the "metadata", additional information associated with the respective frames (#1, #2, #3, . . . ) constituting the moving image is described.

An example of content of the metadata is illustrated in FIG. 8B. For example, IMU data, coordinate transformation parameter HP, timing information TM, and camera parameter CP are described for one frame. These are a part of metadata content, and here, only information related to the image processing to be described below is shown.

As the IMU data, a gyro (angular velocity data), an accelerator (acceleration data), and a sampling rate are described.

The IMU mounted in the imaging device 1 as the sensor unit 23 outputs the angular velocity data and the acceleration data at a predetermined sampling rate. Generally, this sampling rate is higher than a frame rate of the captured image, so that many IMU data samples can be obtained in one frame period.

Therefore, as the angular velocity data, n samples such as gyro sample #1, gyro sample #2, . . . gyro sample #n illustrated in FIG. 8C are associated with one frame. Further, as the acceleration data, m samples such as accelerator sample #1, accelerator sample #2, . . . accelerator sample #m are associated with one frame. In some cases, n=m, and in other cases, n≠m.

Although the metadata is described herein in an example in which the metadata is associated with each frame, for example, the IMU data may not be completely synchronized with the frame. In such a case, for example, time information associated with time information of each frame is provided as an IMU sample timing offset in the timing information TM.

The coordinate transformation parameter HP is a general term for parameters that are used for correction with coordinate transformation of each pixel in the image. Further, non-linear coordinate transformation such as lens distortion is also included.

The coordinate transformation parameter HP is a term that can include at least a lens distortion correction parameter, a trapezoidal distortion correction parameter, a focal plane distortion correction parameter, an electronical image stabilization parameter, and an optical image stabilization parameter.

The lens distortion correction parameter is information for directly or indirectly ascertaining how distortion such as barrel aberration and pincushion aberration is corrected and returning to an image before lens distortion correction.

Metadata regarding the lens distortion correction parameter as one piece of metadata will be briefly described.

FIG. 9A illustrates an image height Y, an angle α, an incidence pupil position d1, and an exit pupil position d2 in a schematic diagram of the lens system 11 and the image sensor 12a.

The lens distortion correction parameter is used to know an angle of incidence on each pixel of the image sensor 12a in image processing. Therefore, it is sufficient to know a relationship between the image height Y and the angle α.

FIG. 9B illustrates an image 110 before lens distortion correction and an image 111 after the lens distortion correction. A maximum image height H0 is a maximum image height before distortion correction, and is a distance from a center to a farthest point of an optical axis. The maximum image height H1 is a maximum image height after distortion correction.

Metadata required to understand a relationship between the image height Y and the angle α is the maximum image height H0 before distortion correction and data d0, d1, . . . d(N−1) of incidence angles with respect to N image heights. It is assumed that "N" is about 10 as an example.

Referring back to FIG. 8B, the trapezoidal distortion correction parameter is a correction amount when trapezoidal distortion caused by shifting the cropping area from a center through the electronical image stabilization is corrected, and is also a value according to a correction amount for the electronical image stabilization.

The focal plane distortion correction parameter is a value indicating an amount of correction for each line with respect to the focal plane distortion.

For the electronical image stabilization and optical image stabilization, the parameter is a parameter indicating an amount of correction in each of axial directions of yaw, pitch, and roll.

The parameters of the lens distortion correction, the trapezoidal distortion correction, the focal plane distortion correction, and the electronical image stabilization are collectively referred to as coordinate transformation parameters, but this is because such correction processing is correction processing for an image formed on each pixel of the image sensor 12a of the imaging element unit 12 and is a parameter of a correction processing involving coordinate transformation of each pixel. The optical image stabilization is also one coordinate transformation parameter, but this is because the correction of shake of an inter-frame component in the optical image stabilization is processing involving coordinate transformation of each pixel.

That is, when reverse correction is performed using these parameters, image data subjected to the lens distortion correction, the trapezoidal distortion correction, the focal plane distortion correction, the electronical image stabilization, and the optical image stabilization can be returned to a state before each correction processing, that is, a state when an image is formed on the image sensor 12a of the imaging element unit 12.

Further, respective parameters of the lens distortion correction, the trapezoidal distortion correction, and the focal plane distortion correction are generically called an optical distortion correction parameter because distortion correction processing is for a case in which an optical image itself from the subject is an image captured in an optically distorted state, and each of them is intended for optical distortion correction.

That is, when reverse correction is performed using these parameters, the image data subjected to the lens distortion correction, the trapezoidal distortion correction, and the focal plane distortion correction can be returned to a state before the optical distortion correction.

The timing information TM in the metadata includes respective pieces of information on an exposure time (shutter speed), an exposure start timing, a readout time (curtain speed), the number of exposure frames (long exposure information), an IMU sample offset, and a frame rate.

In the image processing of the present embodiment, these are mainly used to associate the line of each frame with the IMU data.

However, even when the image sensor 12a is of a CCD type or a CMOS type using a global shutter scheme, correction according to an exposure centroid becomes possible using the exposure start timing and the curtain speed when the exposure centroid shifts using an electronical shutter or a mechanical shutter.

An angle of view (focal length), a zoom position, and lens distortion information are described as the camera parameter CP in the metadata.

4. FIRST EMBODIMENT

A processing example of the information processing device 70 serving as the image processing devices TDx and TDy as the first embodiment will be described.

Figure 10:
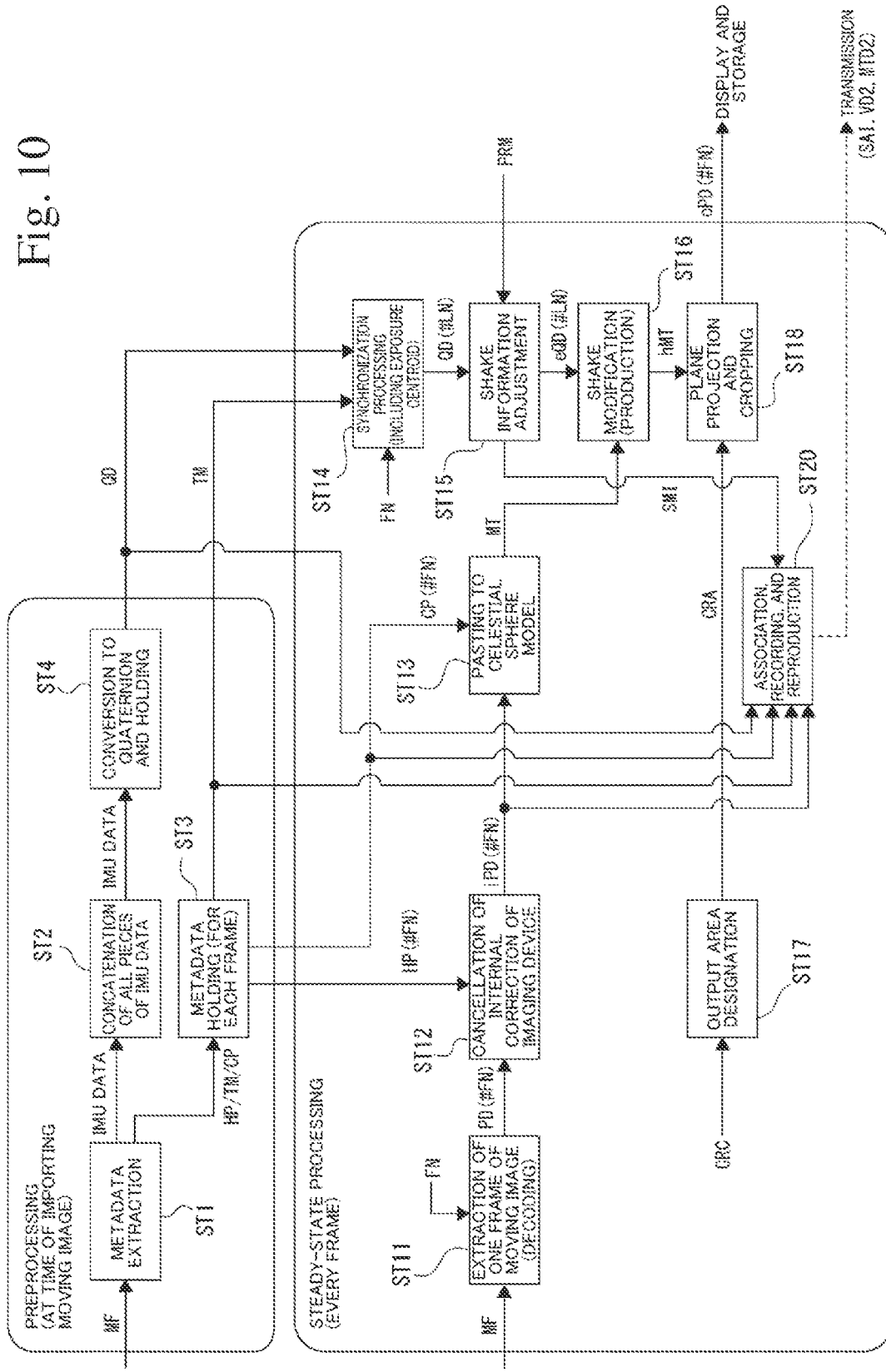
FIG. 10 is an illustrative diagram of image processing according to a first embodiment.

FIG. 10 illustrates a procedure of various types of processing that is executed in the information processing device 70 as the image processing device TDx, and illustrates a relationship between pieces of information that are used in each processing.

At least processing of step ST16 may be performed depending on a function of the shake modification unit 100 in FIG. 6. However, steps ST11, ST12, ST13, ST14, ST17, and ST18 can also be considered as processing of the shake modification unit 100.

Further, processing of step ST15 is performed depending on the function of the shake information adjustment unit 101.

Further, processing of step ST20 is performed depending on the function of the association unit 102.

First, steps ST1, ST2, ST3, and ST4 as preprocessing will be described.

The preprocessing is processing that is performed when the image file MF is imported.

"import" described herein refers to the fact that, for example, an image file MF that is allowed to be accessed due to the information processing device 70 storing the image file MF in, for example, the storage unit 79 is set as an image processing target, and means performing preprocessing for image processing. For example, :import" does not mean transferring from the imaging device 1 to the mobile terminal 2 or the like.

The CPU 71 imports the image file MF designated by the user operation or the like so that the image file MF becomes the image processing target, and also performs processing regarding the metadata added to the image file MF as preprocessing. For example, the CPU 71 performs processing of extracting and storing the metadata corresponding to each frame of the moving image.

Specifically, in this preprocessing, metadata extraction (step ST1), concatenation of all pieces of IMU data (step ST2), metadata holding (step ST3), conversion into quaternion (posture information of the imaging device 1), and holding (step ST4) are performed.

As the metadata extraction in step ST1, the CPU 71 reads the image file MF that is a target and extracts the metadata included in the image file MF as described with reference to FIG. 8.

Some or all of steps ST1, ST2, ST3, and ST4 may be performed on the image source VS side such as the imaging device 1. In this case, in the preprocessing, content after processing to be described below is acquired as metadata.

The CPU 71 performs concatenation processing on the IMU data (angular velocity data (gyro sample) and acceleration data (accelerator sample)) in the extracted metadata in step ST2.

This is processing of arranging and concatenating all pieces of IMU data associated with all the frames in chronological order to construct IMU data corresponding to an entire sequence of the moving image.

Integration processing is performed on the concatenated IMU data to calculate a quaternion QD indicating the posture of the imaging device 1 at each point in time on a sequence of moving images, and store and hold the quaternion QD.

The calculation of the quaternion QD is an example.

It is also possible to calculate the quaternion QD using only the angular velocity data.

The CPU 71 performs processing of holding the metadata other than the IMU data, that is, the coordinate transformation parameter HP, the timing information TM, and the camera parameter CP among the extracted metadata in step ST3. That is, the coordinate transformation parameter HE the timing information TM, and the camera parameter CP are stored in a state corresponding to each frame.

The above preprocessing is performed such that the CPU 71 is ready to perform various image processing including the shake modification of the image data received as the image file MF.

Steady-state processing of FIG. 10 indicates image processing that is performed on the image data of the image file MF subjected to preprocessing as described above.

The CPU 71 performs processing of extraction of one frame of the moving image (step ST11), cancellation of the internal correction of the imaging device (step ST12), pasting to the celestial sphere model (step ST13), synchronization processing (step ST14), the shake information adjustment (step ST15), and shake modification (step ST16), output area designation (step ST17), plane projection and cropping (step ST18), and association recording and reproduction (step ST20).

The CPU 71 performs each processing of steps ST11 to ST20 above on each frame at the time of reproduction of the image of the image file MF.

In step ST11, the CPU 71 decodes one frame of the moving image (image file MF) along a frame number FN. Image data PD (#FN) of one frame is output.

"(#FN)" indicates a frame number and indicates that information corresponds to such a frame.

When the moving image is not subjected to encoding processing such as compression, the decoding processing of step ST11 is unnecessary.

In step ST12, the CPU 71 performs processing of cancelling the internal correction performed on the image data PD (#FN) of one frame by the imaging device 1.

Therefore, the CPU 71 performs reverse correction of the correction performed by the imaging device 1 by referring to a coordinate transformation parameter HP (#FN) stored in correspondence to the frame number (#FN) at the time of preprocessing. Accordingly, image data iPD (#FN) in a state in which the lens distortion correction, the trapezoidal distortion correction, the focal plane distortion correction, the electronical image stabilization, and the optical image stabilization have been cancelled in the imaging device 1 is obtained.

In step ST13, the CPU 71 performs pasting of image data iPD (#FN) of one frame that is in a state in which various corrections have been cancelled, to the celestial sphere model. In this case, the camera parameter CP (#FN) stored in correspondence to the frame number (#FN), that is, the angle of view, the zoom position, and the lens distortion information are referred to.

FIG. 11 illustrates an overview of pasting to the celestial sphere model.

Image data iPD is illustrated in FIG. 11A. An image height h is a distance from a center of the image. Each circle in FIG. 11A indicates a position in which the image height h is equal.

A "relationship between an image sensor surface and an incidence angle φ" in the frame is calculated from the angle of view, zoom position, and lens distortion information for the frame of this image data iPD, and "data0" . . . "dataN−1" at respective positions on the image sensor surface are obtained. A one-dimensional graph of the relationship between the image height h and the incidence angle φ as illustrated in FIG. 11B is represented from "data0" . . . "dataN−1". The incidence angle φ is an angle of a light ray (an angle seen from the optical axis).

This one-dimensional graph is rotated once around a center of the captured image, and a relationship between each pixel and the incidence angle is obtained. Accordingly, each pixel of the image data iPD is mapped to a celestial sphere model MT, like a pixel G2 at celestial sphere coordinates from a pixel G1 in FIG. 11C.

Accordingly, an image (data) of the celestial sphere model MT in which the captured image is pasted to an ideal celestial spherical surface in a state in which lens distortion has been removed can be obtained. This celestial sphere model MT is a model in which a unique parameter or distortion of the imaging device 1 that has originally captured the image data iPD is removed and a range seen by an ideal pinhole camera is pasted to a celestial spherical surface.

Therefore, the image of the celestial sphere model MT is rotated in a predetermined direction in this state, such that the shake modification processing as the shake removal or shake production can be realized.

Here, the posture information (quaternion QD) of the imaging device 1 is used for the shake modification processing. Therefore, the CPU 71 performs a synchronization processing of step ST14.

In the synchronization processing, processing of specifying and acquiring a quaternion QD (#LN) suitable for each line in correspondence to the frame number FN is performed. "(#LN)" indicates a line number in the frame and indicates that information corresponds to the line.

The quaternion QD (#LN) for each line is used because an amount of shake differs for each line when the image sensor 12a is of a CMOS type and imaging using a rolling shutter scheme is performed.

For example, when the image sensor 12a is of a CCD type and imaging using a global shutter scheme is performed, a frame-by-frame quaternion QD (#FN) may be used.

In the case of a global shutter of the CCD or CMOS type image sensor as the image sensor 12a, a centroid is shifted when an electronical shutter (or a mechanical shutter) is used, and thus, a quaternion at a timing at a center of an exposure period of the frame (which is shifted depending on a shutter speed of the electronical shutter) may be used.

Here, blur appearing in the image is considered.

The blur is image bleeding due to relative motion between the imaging device and the subject in the same frame. That is, this is image bleeding due to shake within the exposure time. When the exposure time becomes longer, an influence of the bleeding as the blur is stronger.

In the electronical image stabilization, when a scheme for controlling the image range to be cropped for each frame is used, "shake" occurring between frames can be reduced or eliminated, but relative shake within the exposure time cannot be reduced by the electronical image stabilization.

Further, when the cropping area is changed due to the image stabilization, posture information of each frame is used, but when the posture information deviates from a center of the exposure period such as a start or end timing of the exposure period, a direction of shake within the exposure time based on the posture is biased, and bleeding is easily noticeable. Further, the exposure period differs for each line in a rolling shutter of the CMOS type image sensor.

Therefore, in the synchronization processing of step ST14, the quaternion QD is acquired for each frame of the image data on the basis of a timing of the exposure centroid for each line.

Figure 12:
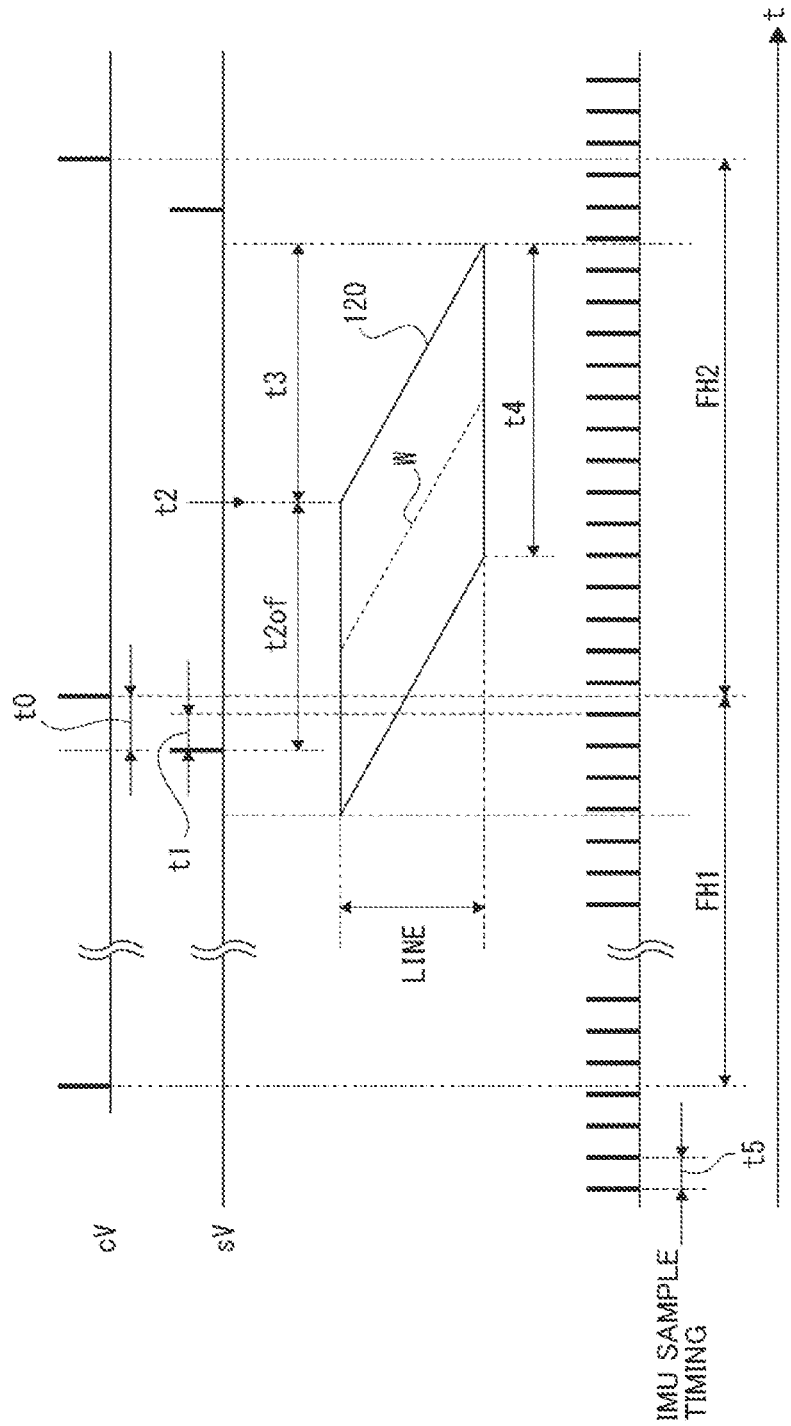
FIG. 12 is an illustrative diagram of a sample timing of IMU data of the embodiment.

FIG. 12 illustrates a synchronization signal cV of the imaging device 1 in a vertical period, a synchronization signal sV of the image sensor 12a generated from the synchronization signal cV, and a sample timing of the IMU data, and also illustrates an exposure timing range 120.

The exposure timing range is a range schematically indicating, in a parallelogram, an exposure period of each line of one frame when the exposure time is t4 in the rolling shutter scheme. Further, a temporal offset t0 of the synchronization signal cV and the synchronization signal sV, an IMU sample timing offset t1, a readout start timing t2, a readout time (curtain speed) t3, and an exposure time t4 are shown. The readout start timing t2 is a timing at which a predetermined time t2 of has passed from the synchronization signal sV.

Each piece of IMU data obtained at each IMU sample timing is associated with the frame. For example, the IMU data in a period FH1 is metadata associated with the current frame indicating the exposure period in a parallelogram, and the IMU data in the period FH1 is metadata associated with the next frame. However, by concatenating all pieces of IMU data in step ST2 of FIG. 10, the association between each frame and the IMU data is released so that the IMU data can be managed in chronological order.

In this case, the IMU data corresponding to an exposure centroid (timing indicated by a broken line W) of each line of the current frame is specified. This can be calculated when a temporal relationship between the IMU data and an effective pixel area of the image sensor 12a is known.

Therefore, IMU data corresponding to the exposure centroid (the timing indicated by the broken line W) of each line is specified using information that can be acquired as the timing information TM corresponding to the frame (#FN).

That is, the information is information on the exposure time, the exposure start timing, the readout time, the number of exposure frames, the IMU sample offset, and the frame rate.

The quaternion QD calculated from the IMU data of the exposure centroid is specified and used as the quaternion QD (#LN) which is the posture information for each line.

This quaternion QD (#LN) is provided to the processing of adjusting the shake information in step ST15.

In the shake information adjustment, the CPU 71 adjusts the quaternion QD according to the input shake modification parameter PRM.

The shake modification parameter PRM may be a parameter input according to a user operation or a parameter generated through automatic control.

The user can input the shake modification parameter PRM to add an arbitrary shake state to the image. Further, the CPU 71 can generate the shake modification parameter PRM through automatic control according to image analysis, image type, a user's shake model selection operation, or the like. Specifically, in step ST15, the CPU 71 generates a quaternion after adjustment eQD for adding shake to the image or increasing or decreasing an amount of shake on the basis of the quaternion QD which is the shake information at the time of imaging.

A specific example of generating the quaternion after adjustment eQD will be described with reference to FIGS. 13, 14, and 15.

Figure 13:
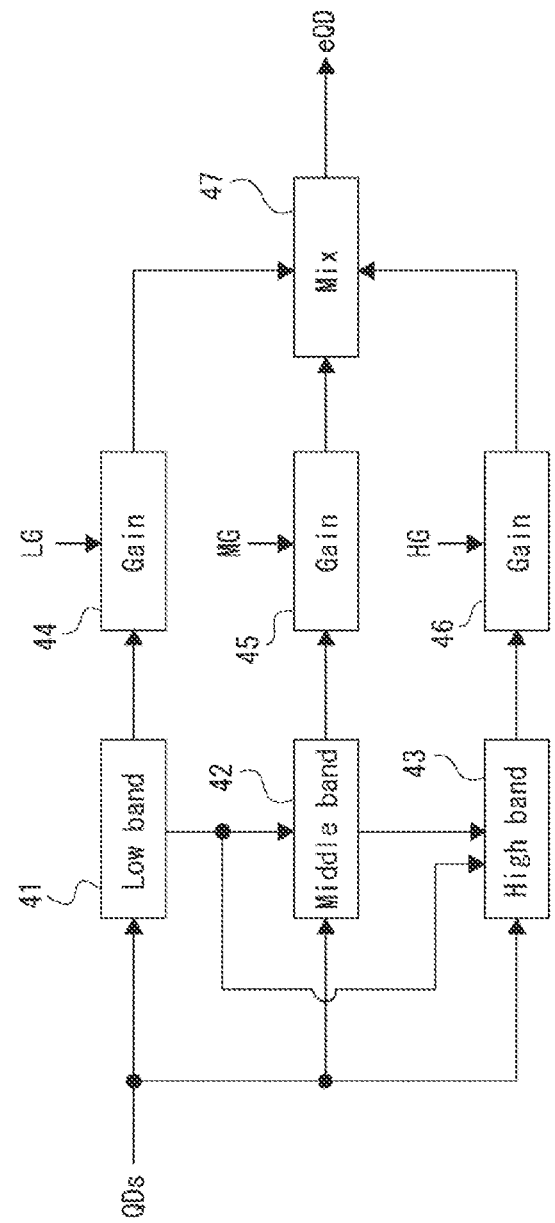
FIG. 13 is an illustrative diagram of the shake information adjustment for each frequency band of the embodiment.

FIG. 13 illustrates an example in which the quaternion after adjustment eQD is generated according to an instruction of a frequency band-specific gain using the shake modification parameter PRM.

The frequency band is a band of a frequency of the shake. For description, it is assumed that the band is divided into three bands including a low band, a middle band, and a high band. Of course, this is only an example, and the number of bands may be 2 or more.

A low-frequency gain LG, a mid-frequency gain MG, and a high-frequency gain HG are given as the shake modification parameter PRM.

An adjustment processing system of FIG. 13 includes a low pass filter 41, a mid pass filter 42, a high pass filter 43, gain calculation units 44, 45, and 46, and a mixing unit 47.

"Quaternion QDs for shake" is input to this adjustment processing system. This is a conjugate of the quaternion QD serving as shake information at the time of imaging.

Respective values q for the current frame as a quaternion QDs for shake and predetermined previous and subsequent frames are input to the low pass filter 41 and a low frequency component $q_{low}$ is obtained.

$$q_{low} = mean(q, n) \qquad [\text{Math. 1}]$$

The gain calculation unit 44 gives a low-frequency gain LG to this low frequency component $q_{low}$.

mean (q, n) in the equation indicates an average value of n before and after q.

Further, the value q of the quaternion QDs for shake is input to the mid pass filter 42, and a mid-band component $q_{mid}$ is obtained.

$$q_{mid} = q_{low}^* \times mean(q.m) \qquad [\text{Math. 2}]$$

WHERE, $n > m$ $q^*_{low}$ is a conjugate of $q_{low}$.

Further, "x" is quaternion product.

The gain calculation unit 45 gives a mid-frequency gain MG to this mid-band component $q_{mid}$.

Further, the value q of the quaternion QDs for shake is input to the high pass filter 43, and a high-frequency component $q_{high}$ is obtained.

$$q_{high} = q_{mid}^* \times q_{low}^* \times q \qquad [\text{Math. 3}]$$

$q^*_{mid}$ is a conjugate of $q_{mid}$.

The gain calculation unit 46 gives a high-frequency gain HG to this high-frequency component $q_{high}$.

An input of these gain calculation units 44, 45, 46 is "$q_{in}$".

$$q_{in} = \left[ \cos\frac{\theta}{2} \quad a_x\sin\frac{\theta}{2} \quad a_y\sin\frac{\theta}{2} \quad a_z\sin\frac{\theta}{2} \right] \qquad [\text{Math. 4}]$$

In this case, $\theta'=\theta*$ gain is set and the next "$q_{out}$" is output.
(Here, gain is low-frequency gain LG, mid-frequency gain MG, and high-frequency gain HG).

$$q_{out} = \left[ \cos\frac{\theta'}{2} \quad a_x\sin\frac{\theta'}{2} \quad a_y\sin\frac{\theta'}{2} \quad a_z\sin\frac{\theta'}{2} \right] \qquad [\text{Math. 5}]$$

Using such gain calculation units 44, 45, 46, the low-frequency component $q_{low}$, the mid-frequency component $q_{mid}$, and the high-frequency component $q_{high}$ to which the low-frequency gain LG, the mid-frequency gain MG, and the high-frequency gain HG have been given can be obtained. A value $q_{mixed}$ is obtained by mixing these in the mixing unit 47.

$$q_{mixed} = q_{low} \times q_{mid} \times q_{high} \qquad [\text{Math. 6}]$$

"x" is quaternion product.

The value $q_{mixed}$ obtained in this way becomes a value of the quaternion after adjustment eQD.

Although the above is an example of band division, a scheme for generating the quaternion after adjustment eQD in which a gain according to the shake modification parameter PRM is given without band division is also conceivable.

Figure 14:
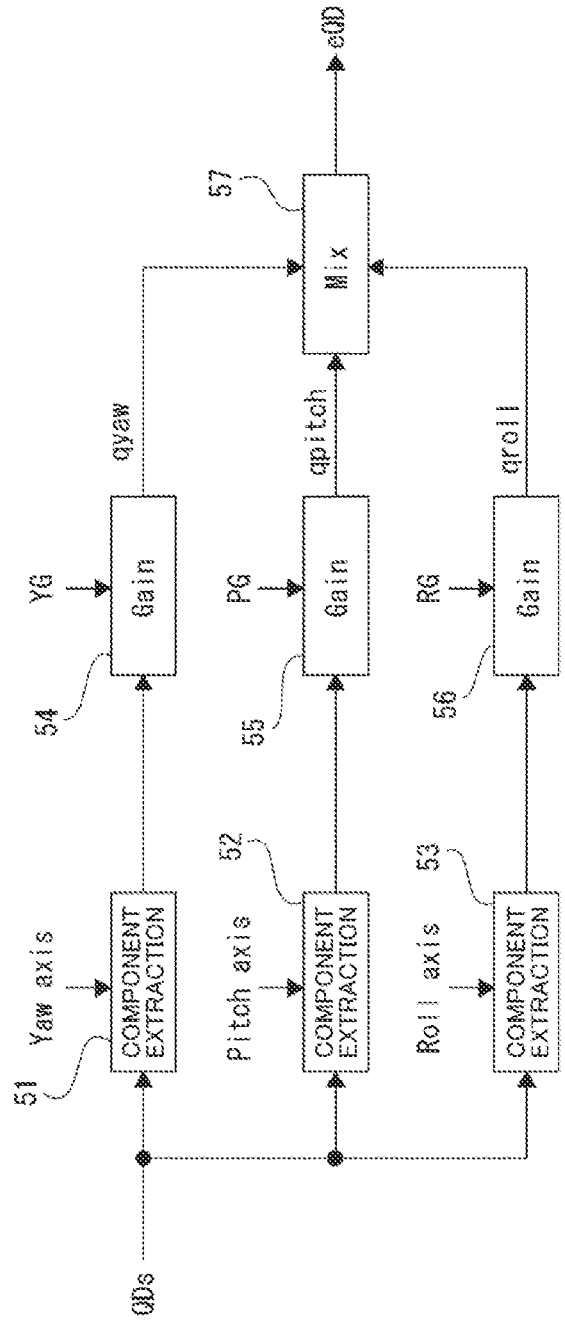
FIG. 14 is an illustrative diagram of the shake information adjustment for each direction of the embodiment.

Next, FIG. 14 illustrates an example in which the quaternion after adjustment eQD is generated according to an indication of a direction-specific gain using the shake modification parameter PRM.

The direction is a direction of shake, that is, a direction of yaw, pitch, and roll. A yaw gain YG, a pitch gain PG, and a roll gain RG are given as the shake modification parameters PRM.

An adjustment processing system of FIG. 14 includes a yaw component extraction unit 51, a pitch component extraction unit 52, a roll component extraction unit 53, gain calculation units 54, 55, and 56, and a mixing unit 57.

Information on a yaw axis, a pitch axis, and a roll axis is provided to the yaw component extraction unit 51, the pitch component extraction unit 52, and the roll component extraction unit 53, respectively.

Respective values q for the current frame as a quaternion QDs for shake and predetermined previous and subsequent frames are input to the yaw component extraction unit 51, the pitch component extraction unit 52, and the roll component extraction unit 53, and a yaw component $q_{yaw}$, a pitch component $q_{pitch}$, and a roll component $q_{roll}$ are obtained.

In each component extraction processing, an input is "$q_{in}$" below.

$$q_{in} = \left[\cos\frac{\theta}{2} \quad a_x\sin\frac{\theta}{2} \quad a_y\sin\frac{\theta}{2} \quad a_z\sin\frac{\theta}{2}\right] \quad \text{[Math. 7]}$$
$$u = [u_x \quad u_y \quad u_z]$$

u is a unit vector indicating the direction of axes such as the yaw axis, pitch axis, and roll axis.

In this case, "$q_{out}$" below is output with $\theta' = \theta * (a \cdot u)$.

$$q_{out} = \left[\cos\frac{\theta'}{2} \quad u_x\sin\frac{\theta'}{2} \quad u_y\sin\frac{\theta'}{2} \quad u_z\sin\frac{\theta'}{2}\right] \quad \text{[Math. 8]}$$

The gain calculation units 54, 55, and 56 give the yaw gain YG, the pitch gain PG, and the roll gain RG to the yaw component $q_{yaw}$, the pitch component $q_{pitch}$, and the roll component $q_{roll}$ obtained by such component extraction, respectively. A value $q_{mixed}$ is obtained by the mixing unit 47 mixing the yaw component $q_{yaw}$, the pitch component $q_{pitch}$, and the roll component $q_{roll}$ subjected to the gain calculation.

$$q_{mixed} = q_{yaw} \times q_{pitch} \times q_{roll} \quad \text{[Math. 9]}$$

"x" in this case is also quaternion product.

The value $q_{mixed}$ obtained in this way becomes the value of the quaternion after adjustment eQD.

Figure 15:
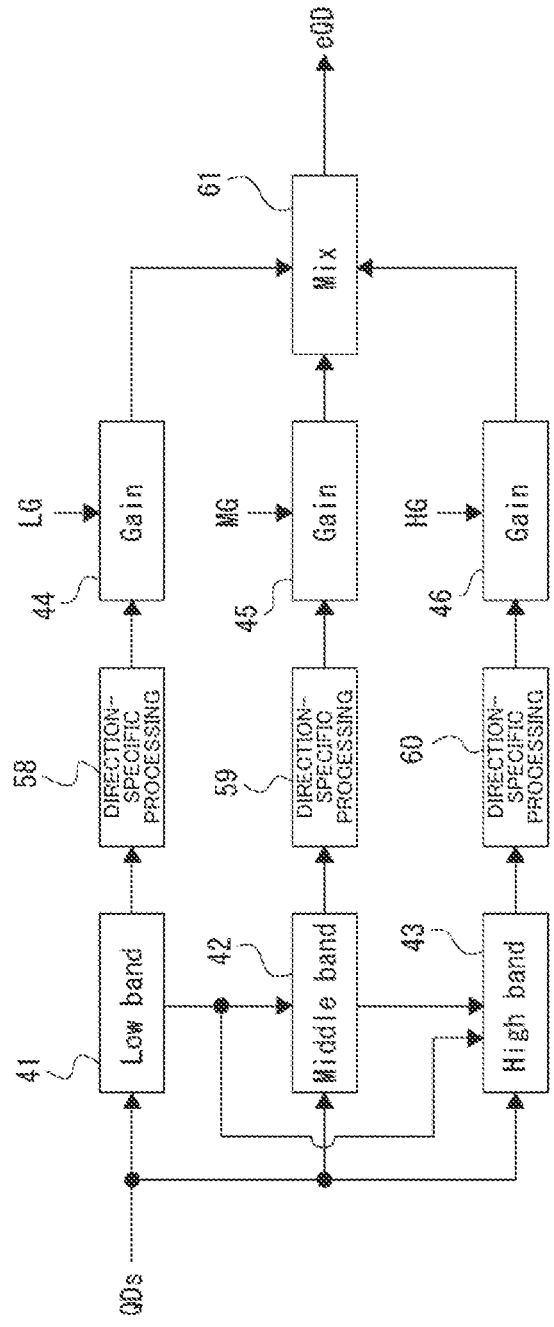
FIG. 15 is an illustrative diagram of the shake information adjustment for each frequency band and each direction of the embodiment.

FIG. 15 illustrates an example in which the above frequency band is combined with the direction.

The adjustment processing system includes a low pass filter 41, a mid pass filter 42, a high pass filter 43, direction-specific processing units 58, 59, and 60, gain calculation units 44, 45, and 46, and a mixing unit 61.

A low-frequency gain LG, a mid-frequency gain MG, and a high-frequency gain HG, and a yaw gain YG, a pitch gain PG, and a roll gain RG (not illustrated) are given depending on the shake modification parameter PRM.

In this adjustment processing system, respective values q for the current frame as the quaternion QDs for shake and predetermined previous and subsequent frames are supplied to the low pass filter 41, the mid pass filter 42, and the high pass filter 43, and respective band components are obtained. The respective band component is input to the direction-specific processing units 58, 59, and 60. Each of the direction-specific processing units 58, 59, 60 includes the yaw component extraction unit 51, the pitch component extraction unit 52, the roll component extraction unit 53, the gain calculation unit 54, 55, and 56, and the mixing unit 57 in FIG. 14.

That is, the direction-specific processing unit 58 divides low-frequency components of the quaternion QDs for shake into yaw direction, roll direction, and pitch direction components, performs gain calculation using the yaw gain YG, the pitch gain PG, and the roll gain RG, and then, mixes the components.

The direction-specific processing unit 59 divides mid-frequency components of the quaternion QDs for shake into yaw direction, roll direction, and pitch direction components, similarly performs gain calculation, and then, mixes the components.

The direction-specific processing unit 60 divides high-frequency components of the quaternion QDs for shake into yaw direction, roll direction, and pitch direction components, similarly performs gain calculation, and then, mixes these.

Outputs of the direction-specific processing units 58, 59, and 60 are supplied to the gain calculation units 44, 45, and 46, respectively, and the low-frequency gain LG, the mid-frequency gain MG, and the high-frequency gain HG are given to the outputs. The outputs are mixed by the mixing unit 61 and output as the value of the quaternion after adjustment eQD.

In the above example of FIG. 15, after the frequency band-specific division is first performed, direction-specific processing is applied to each band component, but the reverse is also possible. That is, after the direction-specific division is first performed, frequency band-specific processing may be applied to each direction component.

In step ST15 of FIG. 10, the quaternion after adjustment eQD is generated according to, for example, the above processing example.

The generated quaternion after adjustment eQD is provided to the shake modification processing of step ST16.

It is conceivable that the shake modification in step ST16 is to apply, for example, the quaternion after adjustment eQD obtained through the processing of FIGS. 13, 14, and 15 to an image that is in a state in which the shake has stopped, and add shake.

In the shake correction of step ST16, the CPU 71 rotates the image of the celestial sphere model MT to which the image of the frame has been pasted in step ST13 using the quaternion after adjustment eQD (#LN) for each line so that shake is added. The image of the celestial sphere model hMT subjected to the shake modification is sent to the processing of step ST18.

In step ST18, the CPU 71 projects the image of the celestial sphere model hMT subjected to the shake modification onto a plane and crops the image to obtain an image (output image data oPD) subjected to the shake modification.

In this case, the shake modification is realized through the rotation of the celestial sphere model MT, and use of the celestial sphere model MT prevents a trapezoidal shape from being formed regardless of a cropped portion, and as a result, the trapezoidal distortion is also eliminated. Further, in the celestial sphere model MT, because the range seen by the ideal pinhole camera is pasted to the celestial spherical surface as described above, there is no lens distortion. Rotation of the celestial sphere model MT is performed according to the quaternion after adjustment eQD (#LN) based on the quaternion QD (#LN) for each line, which also eliminates the focal plane distortion correction.

Further, since the quaternion QD (#LN) corresponds to the exposure centroid of each line, an image in which the blur is not noticeable is obtained.

Association between the image after the plane projection in step ST18 and the celestial sphere model MT is as follows.

FIG. 16A illustrates an example of a rectangular coordinate plane 131 subjected to plane projection. Coordinates of the image subjected to the plane projection are (x, y).

As illustrated in FIG. 16B, the coordinate plane 131 is disposed (normalized) in a three-dimensional space so that the coordinate plane 131 comes in contact with the celestial sphere model MT on the celestial sphere model MT and at a center of the celestial sphere model MT. That is, a center of the coordinate plane 131 is disposed at a position that matches a center of the celestial sphere model MT and is in contact with the celestial sphere model MT.

In this case, coordinates are normalized on the basis of a zoom magnification or a size of the cropping area. For example, when a horizontal coordinate of the coordinate plane 131 is 0 to outh and a vertical coordinate is 0 to outv as illustrated in FIG. 16A, outh and outv are an image size. For example, the coordinates are normalized using the following equation.

$$x_{norm} = \frac{1}{zoom} \cdot \frac{(x - outh/2)}{r}$$
$$y_{norm} = \frac{1}{zoom} \cdot \frac{(y - outv/2)}{r}$$
$$z_{norm} = 1$$
WHERE, $r = \min(outh, outv)/2$

[Math. 10]

In (Math. 10) above, min (A, B) is a function of returning a smaller value of A and B. Further, "zoom" is a parameter for controlling enlargement and reduction. Further, xnorm, ynorm, and znorm are normalized x, y, and z coordinates. According to each of the above equations of (Math. 10) above, coordinates of the coordinate plane 131 are normalized to coordinates on a spherical surface of a hemisphere having a radius of 1.0.

For rotation for obtaining a direction of the cropping area, the coordinate plane 131 is rotated through rotation matrix calculation, as illustrated in FIG. 17A. That is, a rotation matrix of (Math. 11) below is used to rotate a pan angle, tilt angle, and roll angle. Here, the pan angle is a rotation angle at which the coordinates are rotated around a z-axis. Further, the tilt angle is a rotation angle at which the coordinates are rotated around an x-axis, and the roll angle is a rotation angle at which the coordinates are rotated around a y-axis.

$$\begin{pmatrix} x_{rot} \\ y_{rot} \\ z_{rot} \end{pmatrix} = \begin{pmatrix} 1 & 0 & 0 \\ 0 & \cos R_t & -\sin R_t \\ 0 & \sin R_t & \cos R_t \end{pmatrix}$$
$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

[Math. 11]

In (Math. 11) above, "Rt" is the tilt angle, "Rr" is the roll angle, and "Rp" is the pan angle. Further, (xrot, yrot, zrot) are coordinates after rotation.

These coordinates (xrot, yrot, zrot) are used for calculation of celestial sphere correspondence points in perspective projection.

As illustrated in FIG. 17B, the coordinate plane 131 is perspectively projected onto a surface of the celestial sphere (area 132). That is, when a straight line is drawn from the coordinate toward a center of the celestial sphere, a point intersecting the spherical surface is obtained. Each coordinate is calculated as follows.

$$x_{sph} = x_{rot}/\sqrt{x_{rot}^2 + y_{rot}^2 + z_{rot}^2}$$
$$x_{sph} = y_{rot}/\sqrt{x_{rot}^2 + y_{rot}^2 + z_{rot}^2}$$
$$z_{sph} = z_{rot}/\sqrt{x_{rot}^2 + y_{rot}^2 + z_{rot}^2}$$

[Math. 12]

In (Math. 12), xsph, ysph, and zsph are coordinates obtained by projecting coordinates on the coordinate plane 131 onto coordinates on a surface of the celestial sphere model MT.

Image data subjected to plane projection can be obtained in this relationship.

For example, the cropping area for the image projected onto the plane using the above scheme is set in step ST17 of FIG. 10.

In step ST17, cropping area information CRA in the current frame is set on the basis of tracking processing based on image analysis (subject recognition) or a cropping area indication information CRC according to a user operation.

For example, FIGS. 18A and 18B illustrate cropping area information CRA set for an image of a certain frame in a state of a frame.

Such cropping area indication information CRC is set for each frame.

The cropping area information CRA also reflects an instruction of an aspect ratio of the image from the user or automatic control.

The cropping area information CRA is reflected in the processing of step ST18. That is, an area according to the cropping area information CRA is projected onto a plane on the celestial sphere model MT, and an output image oPD is obtained, as described above.

The output image oPD obtained in this way is the image data subjected to the shake modification processing of step ST16.

The processing of FIG. 10 is performed for every frame, thereby allowing an image to which the shake has been added as the shake production to be displayed when the output image oPD is reproduced and displayed. Therefore, when the user performs an operation for inputting the shake modification parameter PRM, the image becomes an image to which the shake production according to user's intention has been added. Such image data is displayed or stored as an image subjected to the shake production.

Here, in the present embodiment, for example, association, recording, and reproduction are performed as step ST20. For example, the CPU 71 can perform association recording (for example, recording on the storage unit 79 or the removable recording medium 81 of FIG. 5) on each frame, and cause the frame to be reproduced or transmitted and output when necessary.

As the association recording processing for each frame, for example, the shake information at the time of imaging and the shake modification information SMI are associated with the image data for each frame and recorded.

First, the CPU 71 performs processing of recording the image data iPD in which the internal correction of the imaging device has been cancelled in step ST12 as image data for each frame. That is, the image data is image data in which the shake removal in the imaging device 1 is cancelled and an influence of the shake such as camera shake at the time of imaging appears as it is.

Further, the CPU 71 performs processing of recording the quaternion QD, the timing information TM, and the camera parameter CP for the frame as the shake information at the time of imaging associated with the image data iPD.

FIG. 19 illustrates the metadata MTD1 supplied from the image source VS to the image processing device TDx and the metadata MTD2 supplied from the image processing device TDx to the image processing device TDy, but information corresponding to the metadata MTD2 is associated with each frame of the image data iPD as the shake information at the time of imaging.

Further, the CPU 71 performs processing of recording the shake modification parameter PRM as the shake modification information SMI associated with the image data iPD. Alternatively, the quaternion after adjustment eQD may be recorded instead of the shake modification parameter PRM or together with the shake modification parameter PRM.

The image data iPD of each frame, the shake information at the time of imaging (metadata MTD2), and the shake modification information SMI recorded in association with each other as described above are transmitted to an external device and made available.

FIG. 2 illustrates that the image data VD2, the metadata MTD2, and the shake modification information SMI are transmitted from the image processing device TDx to the image processing device TDy, but in the case of the example of FIG. 10, the image data VD2 is image data composed of the image data iPD. Further, the metadata MTD2 indicates the shake information at the time of imaging as content illustrated in FIG. 19. The shake modification information SMI is information indicating an amount of processing of the shake production performed on the image data iPD.

Figure 20:
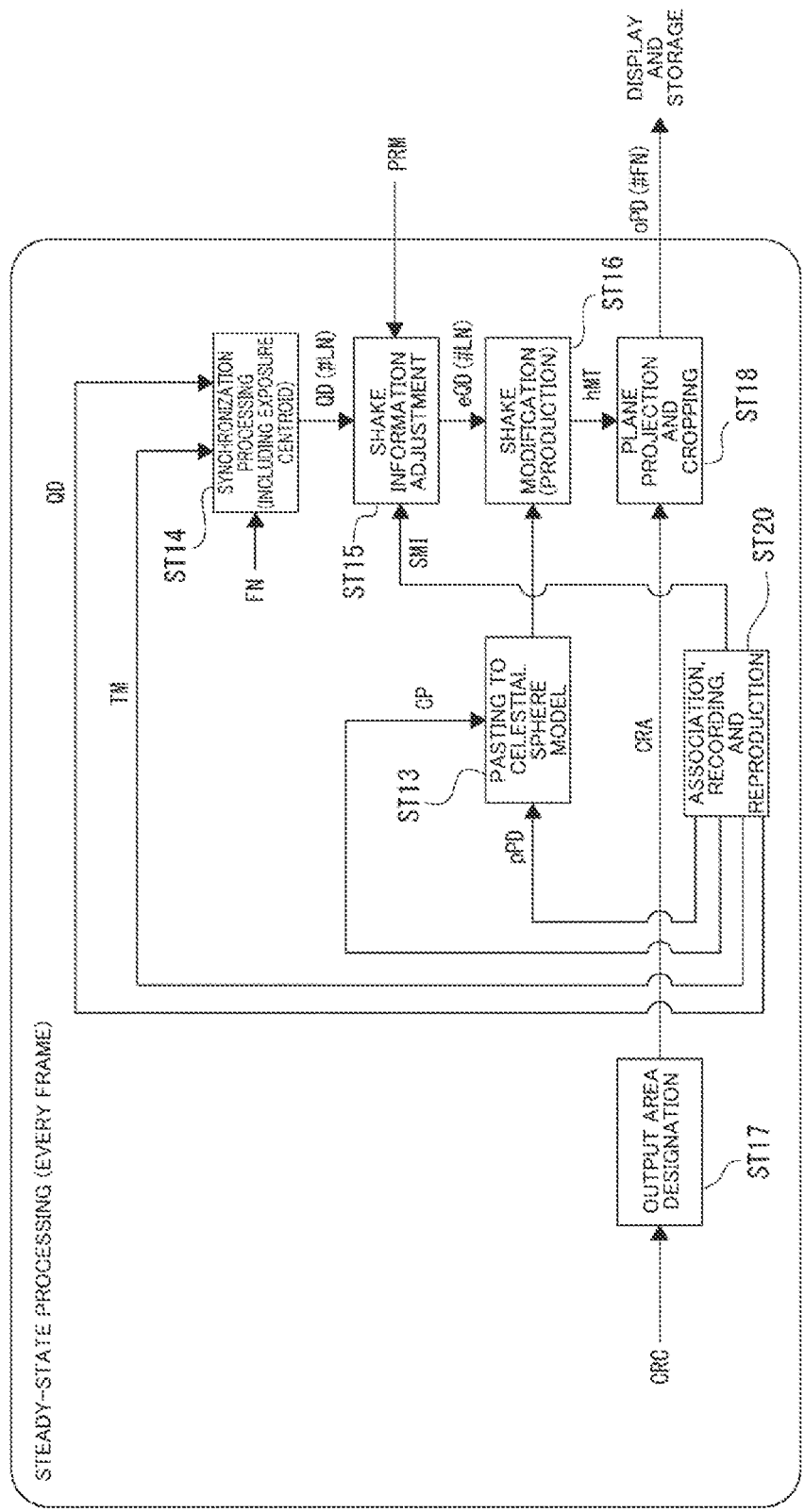
FIG. 20 is an illustrative diagram of secondary image processing according to the first embodiment.

FIG. 20 illustrates a processing example of the image processing device TDy that has acquired such image data VD2, metadata MTD2, and shake modification information SMI.

Thereafter, the same processing as the above-described processing is denoted by the same step number for avoidance of duplicate description of processing content.

FIG. 20 illustrates, for example, steady-state processing that is performed by the image processing device TDy.

In this case, as the association recording and reproduction processing of step ST20, it is assumed that reproduction of information transmitted from the image processing device TDx is performed.

That is, the association recording and reproduction processing of step ST20 is, for example, processing in which the information (the image data VD2, the metadata MTD2, and the shake modification information SMI) transmitted from the image processing device TDx has been recorded on the storage unit 79 or the removable recording medium 81 of the information processing device 70 in FIG. 5 functioning as the image processing device TDy. and is sequentially read from the storage unit 79 or the removable recording medium 81.

The CPU 71 of the information processing device 70 functioning as the image processing device TDy reads out image data pPD for each frame as the processing of step ST20. The image data pPD refers to image data that is reproduced from the recording medium in step ST20.

When the image processing device TDx performs the processing of FIG. 10, image data pPD to be reproduced is the image data iPD described with reference to FIG. 10.

Further, as the processing of step ST20, the CPU 71 reads out the camera parameter CP corresponding to the image data pPD of the current reproduced frame for pasting to the celestial sphere model MT in step ST13.

Further, as the processing of step ST20, the CPU 71 reads out the quaternion QD and the timing information TM corresponding to the image data pPD of the current reproduced frame for the synchronization processing of step ST14.

Further, as the processing of step ST20, the CPU 71 reads out the shake modification information SMI corresponding to the image data pPD of the current reproduced frame for the shake information adjustment in step ST15.

As the processing of step ST13, the CPU 71 pastes the reproduced image data pPD to the celestial sphere model with reference to the reproduced camera parameter CP.

As the processing of step ST14, the CPU 71 performs synchronization processing using the quaternion QD and the timing information TM corresponding to the reproduced image data pPD.

As the processing of step ST15, the CPU 71 adjusts the quaternion QD using the reproduced shake modification information SMI and the input shake modification parameter PRM, and generates the quaternion after adjustment eQD.

As the processing of step ST16, the CPU 71 rotates the image data pPD pasted to the celestial sphere model MT using the quaternion after adjustment eQD, and performs the shake modification processing.

In step ST18, the CPU 71 crops the image subjected to the shake modification according to the cropping area information CRA, projects the image onto the plane to generate the output image data oPD, and outputs the output image data oPD.

In the image processing device TDy that performs each of such processing, the following operations can be performed.

Reproduction of Shake Production Performed by the Image Processing Device TDx in the Past In step ST15, the shake modification information SMI (for example, shake modification parameter PRM) in the image processing device TDx can be reflected and the quaternion after adjustment eQD can be generated. Therefore, in step ST16, the CPU 71 of the image processing device TDy can perform the same shake modification processing as the shake modification performed by the image processing device TDx in the past, and can obtain and display the output image data oPD or record the output image data oPD.

Addition of New Shake Production

The image data pPD (image data iPD) to be reproduced as a processing target is image data not subjected to the shake modification in the image processing device TDx. Therefore, in the image processing device TDy, the shake modification parameter PRM is input according to a user operation or automatic control, and the quaternion after adjustment eQD is generated accordingly making it possible to perform the shake modification processing of only the image processing device TDy not affected by the past shake modification in step ST16 and to display or record an image based on such output image data oPD.

Adjustment or Correction of Shake Production Performed by the Image Processing Device TDx in the Past In step ST15, both the shake modification information SMI (for example, shake modification parameter PRM) in the image processing device TDx and the shake modification parameter PRM newly input according to a user operation or automatic control can be reflected and the quaternion after adjustment eQD can be generated.

Therefore, the CPU 71 of the image processing device TDy can change, for example, the shake state of the image due to the shake modification performed by the image processing device TDx depending on a user of the image processing device TDy adjusting or partially changing the shake modification parameter PRM. An image based on such output image data oPD can be displayed or recorded.

Further, it is conceivable that, when the shake modification has been performed in the image processing device TDy, information thereon is also associated.

Figure 21:
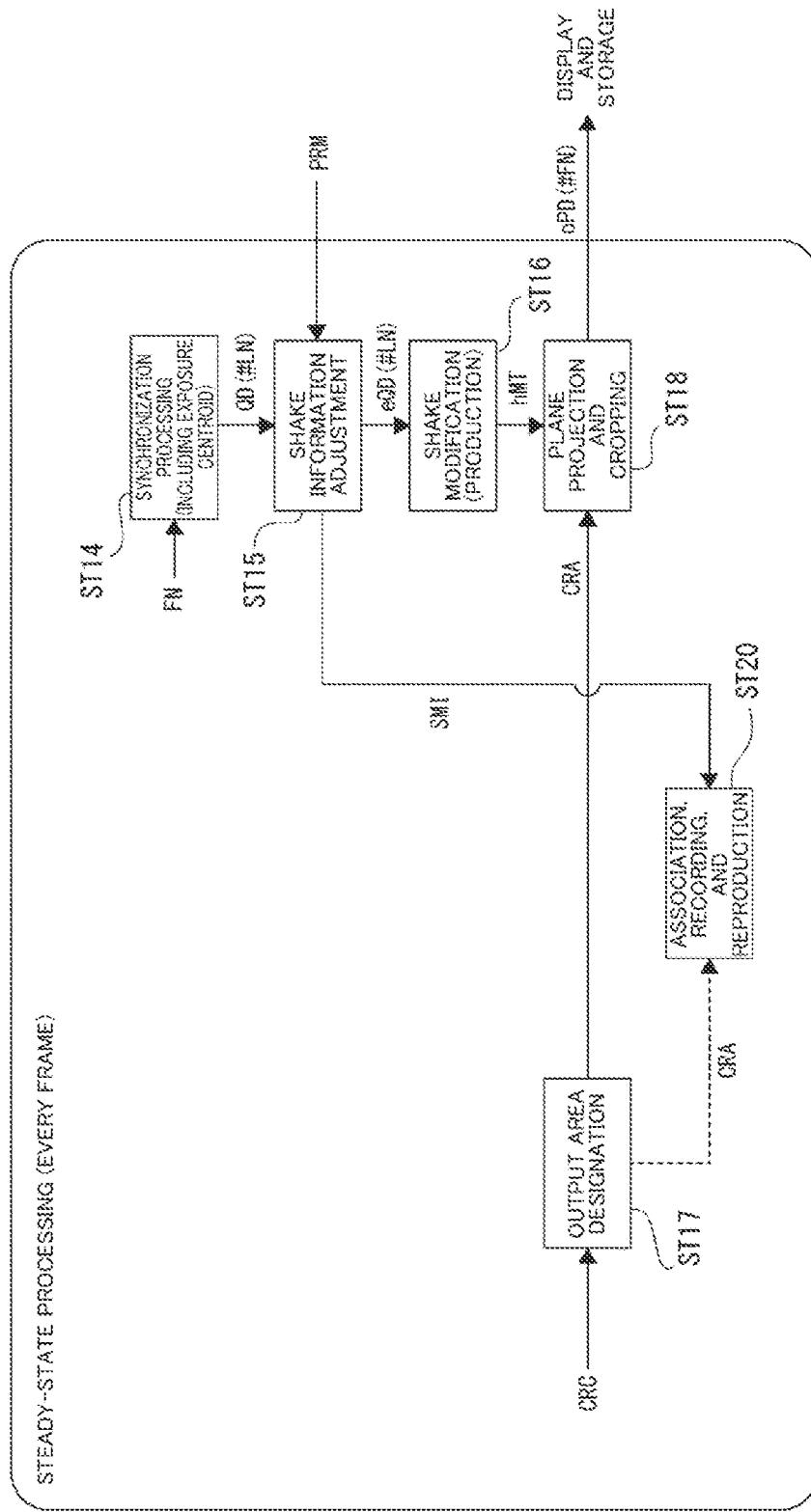
FIG. 21 is an illustrative diagram of recording in secondary image processing according to the first embodiment.

FIG. 21 illustrates updating of the shake modification information SMI.

When the shake modification parameter PRM is newly input in step ST15 and reflected in the shake modification, the CPU 71 shows processing of updating the shake modification information SMI as the association recording and reproduction processing of step ST20 of FIG. 21.

That is, the shake modification information SMI associated with the image data VD2 (iPD) of each frame and the shake information (metadata MTD2) at the time of imaging is updated to the shake modification information SMI used this time.

Thus, another image processing device that has acquired the associated information group can reproduce or correct the shake modification performed by the image processing device TDy.

It is also conceivable that information on the cropping area information CRA in step ST17 is also associated and recorded, as indicated by a broken line in FIG. 21. For example, information on the aspect ratio is associated. This makes it possible to also reflect aspect ratio designation information at the time of subsequent image reproduction, addition of shake production, or the like.

Of course, the cropping area information CRA such as the aspect ratio may be recorded even in the processing of the image processing device TDx in FIG. 10.

5. SECOND EMBODIMENT

A processing example of the information processing device 70 serving as the image processing device TDx or TDy in a second embodiment will be described.

The second embodiment is an example in which the image data VD1 not subjected to shake removal in the image source VS (for example, the imaging device 1) is supplied to the image processing device TDx.

Therefore, the metadata MTD1 supplied from the image source VS to the image processing device TDx as illustrated in FIG. 2 is illustrated in FIG. 22.

The metadata MTD1 illustrated in FIG. 22 includes IMU data, timing information TM, and camera parameter CP. However, since the shake removal (for example, image stabilization) is not performed, the coordinate transformation parameter HP (see FIG. 8) is not included.

Figure 23:
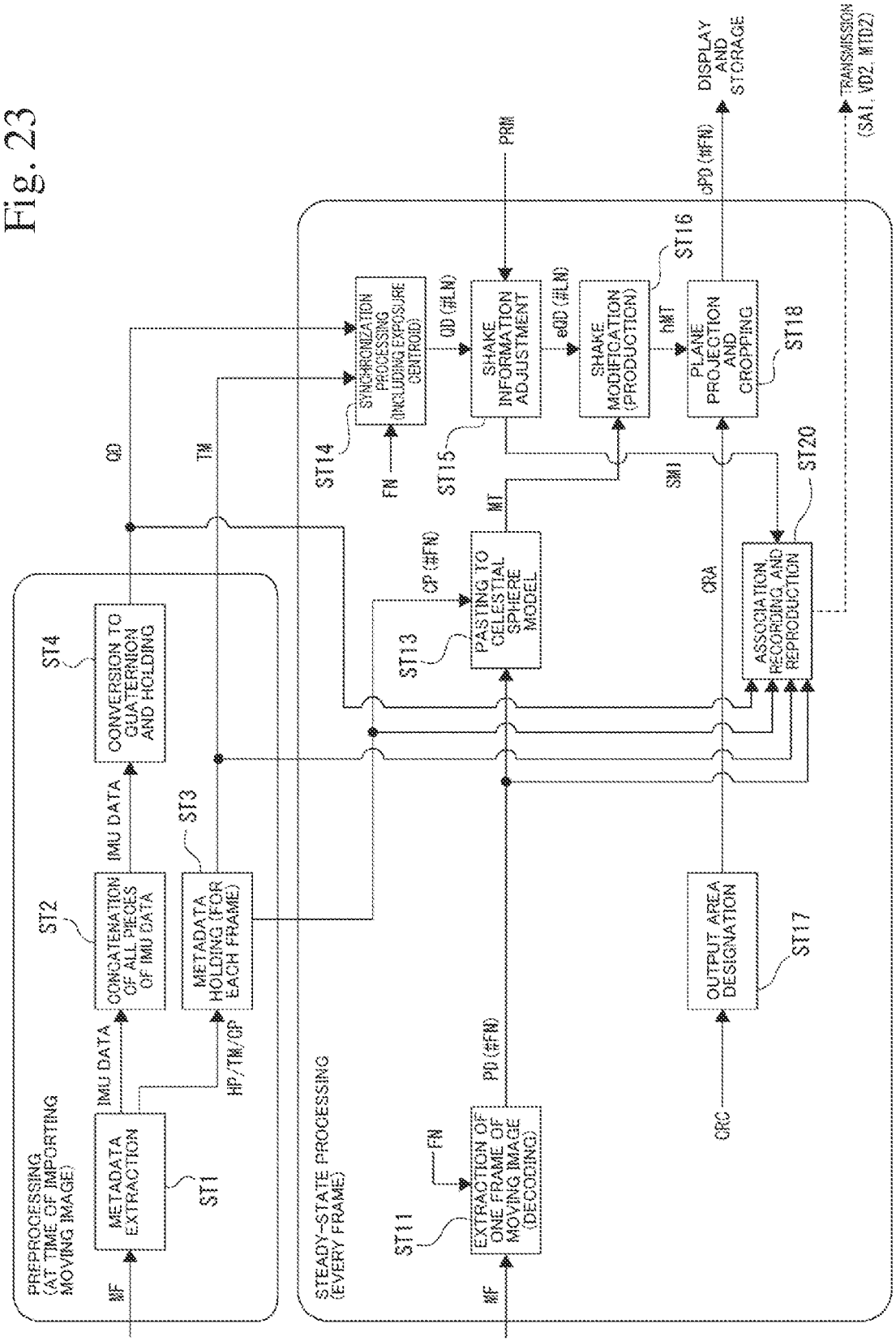
FIG. 23 is an illustrative diagram of image processing according to the second embodiment.

FIG. 23 illustrates a procedure of various types of processing that are executed in the information processing device 70 as the image processing device TDx as in FIG. 10, and illustrates a relationship between pieces of information that are used in respective processing. The above-described processing is denoted by the same step numbers, and description thereof will be omitted.

The processing of FIG. 23 is basically the same as that of FIG. 10, but the processing of cancelling the internal correction of the imaging device (step ST12 of FIG. 10) is not performed in the processing of FIG. 23. This is because the shake removal is not performed in the imaging device 1.

The image data recorded in the association recording and reproduction processing of step ST20 becomes the image data PD extracted in step ST11.

As the association recording processing for each frame, the image data PD for each frame is stored in association with the shake information at the time of imaging and the shake modification information SMI.

That is, the CPU 71 performs processing of recording the quaternion QD, the timing information TM, and the camera parameter CP for the frame as the shake information at the time of imaging associated with the image data PD. The metadata MTD2 in FIG. 22 is content of the shake information at the time of imaging.

Further, the CPU 71 performs processing of recording the shake modification parameter PRM as the shake modification information SMI associated with the image data PD. Alternatively, the quaternion after adjustment eQD may be recorded instead of the shake modification parameter PRM or together with the shake modification parameter PRM.

The image data PD of each frame, the shake information at the time of imaging, and the shake modification information SMI recorded in association with each other as described above are transmitted to an external device and made available.

FIG. 2 illustrates that the image data VD2, the metadata MTD2, and the shake modification information SMI are transmitted from the image processing device TDx to the image processing device TDy, but in the case of the example of FIG. 23, the image data VD2 is image data composed of the image data PD. Further, the metadata MTD2 indicates the shake information at the time of imaging as content illustrated in FIG. 22. The shake modification information SMI is information indicating an amount of processing of the shake production performed on the image data PD.

The processing of the image processing device TDy that has acquired the image data VD2, the metadata MTD2, and the shake modification information SMI is performed in the same manner as that described in the first embodiment.

6. THIRD EMBODIMENT

A processing example of the information processing device 70 serving as the image processing devices TDx and TDy in a third embodiment will be described.

Figure 24:
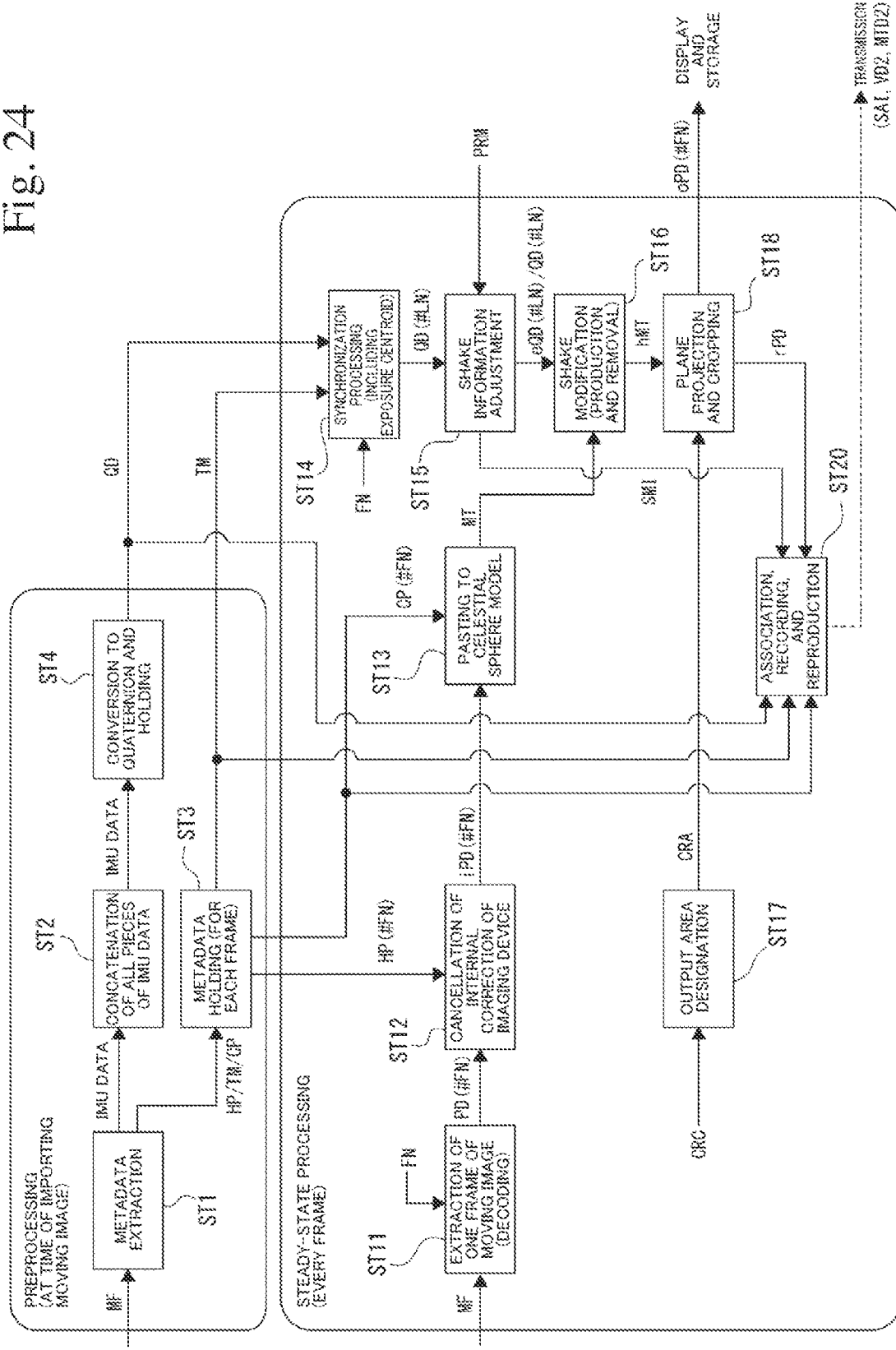
FIG. 24 is an illustrative diagram of image processing according to a third embodiment.

FIG. 24 illustrates a relationship between procedures of various types of processing executed in the information processing device 70 as the image processing device TDx and information used in each processing as in FIG. 10.

FIG. 24 illustrates an example based on the functional configuration of FIG. 7. At least the processing of step ST16 is performed depending on the function of the shake modification unit 100 in FIG. 7. However, steps ST11, ST12, ST13, ST14, ST17, and ST18 can also be considered as the processing of the shake modification unit 100.

Further, the processing of step ST15 is performed depending on the function of the shake information adjustment unit 101.

Further, the processing of step ST20 is performed depending on the function of the association unit 102.

A difference from the first embodiment is that the image data recorded in the association recording and reproduction processing of step ST20 becomes the image data rPD from which the shake removal has been performed in step ST16. Therefore, in the shake modification processing of step ST16, the shake production using a function of the shake production unit 100a illustrated in FIG. 7 and the shake removal using a function of the shake removal unit 100b are performed.

First, processing for performing the shake production is the same as that in FIG. 10. That is, the shake information adjustment is performed in step ST15, and the shake modification processing is performed using the quaternion after adjustment eQD in step ST16. The image is projected onto a plane and cropped in step ST18, and is used as output image data oPD. Therefore, it is possible to display or store the image with the shake production.

On the other hand, the shake removal is performed in step ST16 for the association, recording, and reproduction processing of step ST20. That is, the celestial sphere model MT is rotated on the basis of the quaternion QD, and the shake removal is performed to remove the shake generated at the time of imaging. This image is projected onto the plane and cropped in step ST18 and used as the image data rPD, and each frame of this image data rPD is stored in the association, recording, and reproduction processing.

Further, processing of recording the quaternion QD, timing information TM, and camera parameter CP for each frame is performed in correspondence to the image data rPD subjected to the shake removal. That is, the metadata MTD2 in FIG. 19 becomes content of the shake information at the time of imaging.

Further, the CPU 71 performs the processing of recording the shake modification parameter PRM as the shake modification information SMI associated with the image data PD. Alternatively, the quaternion after adjustment eQD may be recorded instead of the shake modification parameter PRM or together with the shake modification parameter PRM.

However, this is a parameter for processing of shake production. That is, the shake modification information SMI used for processing based on the function of the shake production unit 100a is recorded in association with each frame of the image data rPD subjected to shake removal using the function of the shake removal unit 100b.

The shake production processing and the shake removal processing may be performed as the shake modification processing of step ST16 at the same time or may be performed at different points in time.

When the shake production processing and the shake removal processing are performed at the same time, the function of the shake production unit 100a and the function of the shake removal unit 100b execute the processing in parallel at the same time, as illustrated in FIG. 7, in step ST16.

In this case, two celestial sphere models MT are prepared, and rotation or cropping of the image for shake production is performed in one of the celestial sphere models MT on the basis of the quaternion after adjustment eQD. In the other celestial sphere model MT, the quaternion QD that bypasses the shake information adjustment processing of step ST15 is supplied, and rotation or cropping of the image for shake production is performed.

Accordingly, the image data rPD subjected to the shake removal can be obtained together with the output image data oPD to which the shake production has been added. Therefore, the image data rPD is recorded in association with the shake information at the time of imaging and the shake modification information SMI used for the output image data oPD in step ST20.

Further, when the shake production processing and the shake removal processing are performed at different points in times as the shake modification processing of step ST16, processing for shake production is first performed in the same manner as in the first embodiment described with reference to FIG. 10.

The image data rPD from which the shake has been removed is recorded in the processing of step ST20 while removing the shake at a different point in time.

The quaternion QD that bypasses the shake information adjustment processing of step ST15 may be supplied to the processing of the shake removal unit 100b in this case. Alternatively, the quaternion after adjustment eQD (that is, substantially original quaternion QD) may be obtained in a state in which gain values of all the parameters (for example, the gain calculation units 44, 45, and 46 or the gain calculation units 54, 55, and 56) are set to "1" in the shake information adjustment processing of step ST15.

The image data rPD subjected to shake removal obtained in this way is recorded in association with the shake information at the time of imaging and the shake modification information SMI used for processing of the shake production at another point in time.

It is conceivable to record the shake modification information for each frame in advance when the shake production processing is performed, or latest shake modification parameter PRM may be separately stored and be associated, and recorded at the time of recording of the image data rPD.

The image data rPD subjected to the shake removal and the image data (image data in which the shake removal at the time of imaging has been cancelled) iPD or PD before the shake modification processing is performed may be stored in association with each other.

Further, the image data rPD subjected to the shake removal and the output image data oPD after the shake modification processing has been performed may be stored in association with each other.

Figure 25:
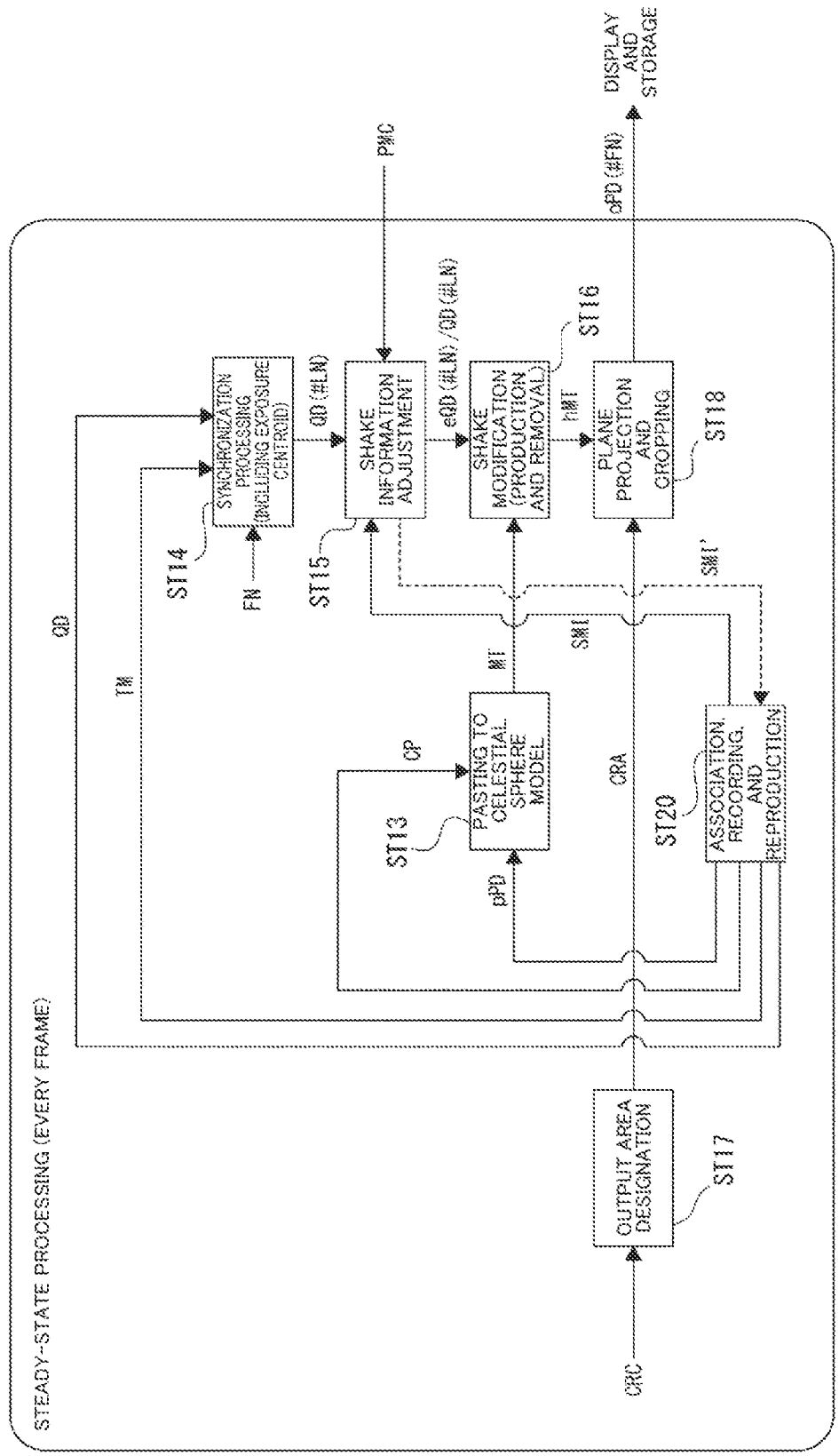
FIG. 25 is an illustrative diagram of secondary image processing according to the third embodiment.

FIG. 25 illustrates a processing example of the image processing device TDy that has acquired the image data VD2 as such image data rPD subjected to the shake removal, the metadata MTD2, and the shake modification information SMI.

This is basically the same as the processing of the image processing device TDy described above with reference to FIG. 20, but the image data pPD to be reproduced, which will be provided to processing of pasting to the celestial sphere model MT in step ST13, becomes image data from which the shake at the time of imaging has been removed.

In this case, the image processing device TDy can perform the same processing as that described in the first embodiment.

Further, in FIG. 25, a broken line indicates an example in which shake modification information SMI' (shake modification parameter PRM or quaternion after adjustment eQD) in the image processing device TDy is associated and recorded in the association recording and reproduction processing of step ST20. For example, the image data rPD subjected to the shake removal, the shake information at the time of imaging, and the shake modification information SMI related to the shake production in the image processing device TDx have already been associated, but in addition thereto, the shake modification information SMI' related to the shake production in the image processing device TDy is also associated and recorded.

Thus, the shake modification information SMI' related to the shake productions performed by the respective image processing devices TDx, TDy, . . . is association and added, making it possible for an image processing device that will perform processing later to reproduce each of shake productions performed a plurality of times in the past.

Incidentally, although the processing is performed by the image processing device TDy capable of performing the shake modification processing in FIG. 25, a device to which the image data is supplied from the image processing device TDx may not have a function of performing the shake modification processing.

When the image data rPD subjected to the shake removal is recorded and supplied to another device in consideration of such a case, a device having no shake modification function such as shake removal can reproduce a moving image from which shake has been removed.

7. FOURTH EMBODIMENT

A processing example of a fourth embodiment will be described with reference to FIG. 26.

Figure 26:
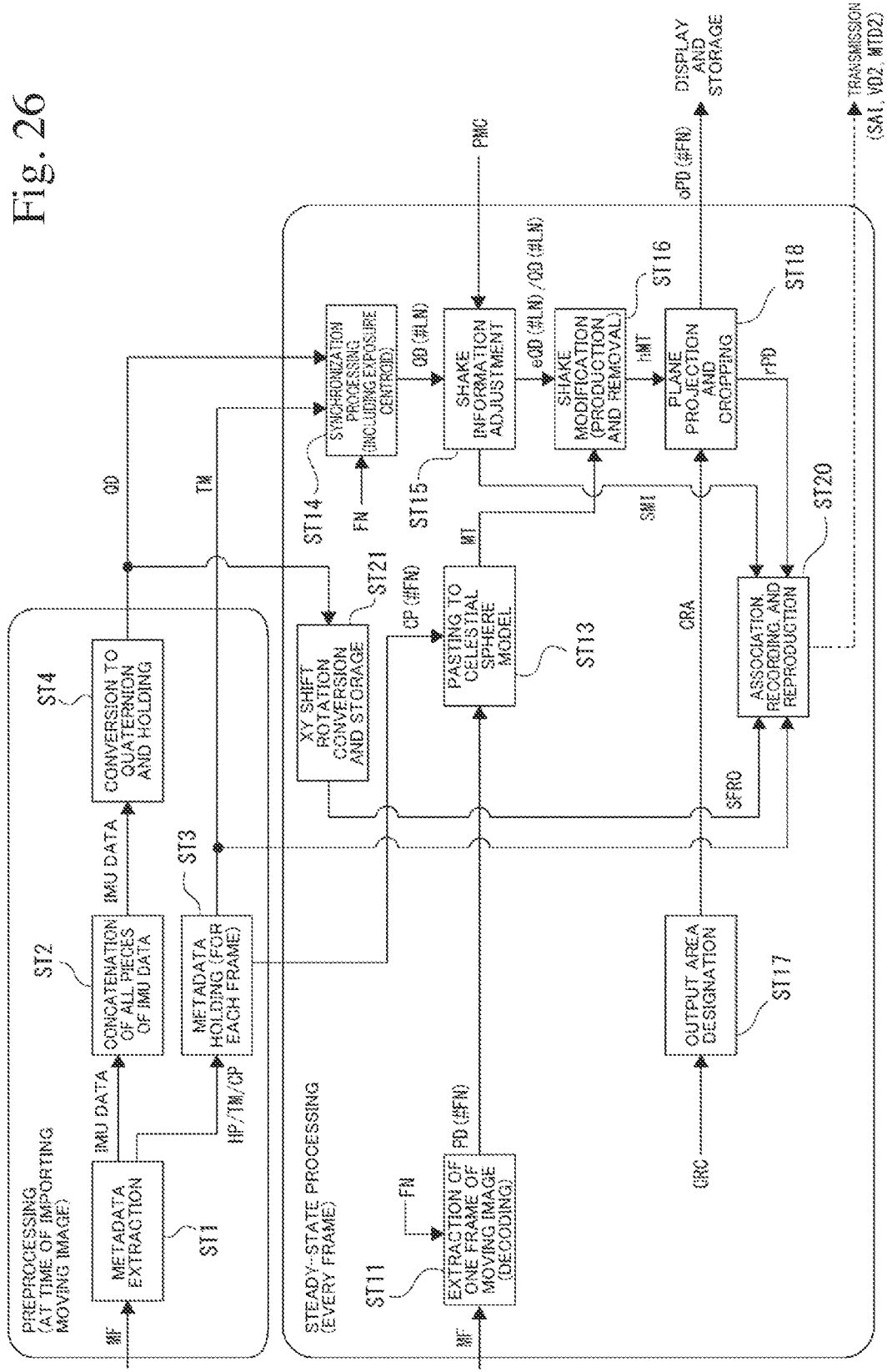
FIG. 26 is an illustrative diagram of image processing according to a fourth embodiment.

FIG. 26 illustrates an example in which the image data VD1 not subjected to the shake removal in the image source VS (for example, the imaging device 1) is supplied to the image processing device TDx, as in the second embodiment. Therefore, the metadata MTD1 supplied from the image source VS to the image processing device TDx as illustrated in FIG. 2 is illustrated in FIG. 27. That is, since the shake removal (for example, image stabilization) is not performed at the time of imaging, the coordinate transformation parameter HP (see FIG. 8) is not included.

Therefore, the processing of cancelling the internal correction of the imaging device (step ST12 of FIG. 10) is not performed as a processing example of FIG. 26. The image data recorded in the association recording and reproduction processing of step ST20 becomes the image data PD extracted in step ST11.

Further, in FIG. 26, it is assumed that the image data rPD subjected to the shake removal is recorded in the association recording and reproduction processing, as described in the third embodiment.

The fourth embodiment is different from the previous examples in that processing of converting the quaternion QD obtained in step ST4 into information on the XY shift and rotation and holding the information on the XY shift and rotation is performed as step ST21.

That is, the quaternion QD, which is the posture information, is converted into information on XY shift and rotation of the shake. X and Y directions are horizontal and vertical directions of a plane forming a plane orthogonal to a Z direction when an optical axis direction of the imaging device 1 is the Z direction. That is, the X and Y directions are horizontal and vertical directions of an image. The rotation information is information on rotation with respect to the yaw axis, rotation with respect to the pitch axis, and rotation with respect to the roll axis. Therefore, the information on the XY shift and rotation includes information on X direction shift, Y direction shift, yaw axis rotation, pitch axis rotation, and roll axis rotation.

For simplicity, not all of these may be included, but one or more of these may be included. Further, information on the Z-axis shift may be added.

The information on the XY shift and rotation is obtained, and recorded in association with each frame of the image data rVD in step ST20. That is, the information on change as the XY shift and rotation is recorded as the shake information at the time of imaging instead of the quaternion QD.

Therefore, it is assumed that the metadata MTD2 that the image processing device TDx transmits to the image processing device TDy includes the shift and rotation information SFRO as illustrated in FIG. 27.

When the shake modification is performed, an application program using the celestial sphere model MT requires a relatively large amount of system resources. Therefore, assuming a case in which the image processing device TDy, which does not have abundant system resources, performs the shake modification processing, the provision of the quaternion QD may impose a heavy system load. Therefore, the information on the XY shift and rotation is provided to the image processing device TDy instead of the quaternion QD. Accordingly, the image processing device TDy can perform the shake modification with a small processing load. For example, this is suitable when the mobile terminal 2 or the like is assumed as the image processing device TDy.

In the processing of FIG. 26, the camera parameter CP is not provided to the association, recording, and reproduction processing of step ST20. Therefore, the metadata MTD2 does not include the camera parameter CP, as illustrated in FIG. 27.

This is because the camera parameter CP is information that is used for pasting to the celestial sphere model MT, and is unnecessary when the image processing device TDy is caused to execute processing that does not use the celestial sphere model MT.

8. FIFTH EMBODIMENT

A processing example of a fifth embodiment will be described with reference to FIGS. 28, 29, and 30.

Figure 28:
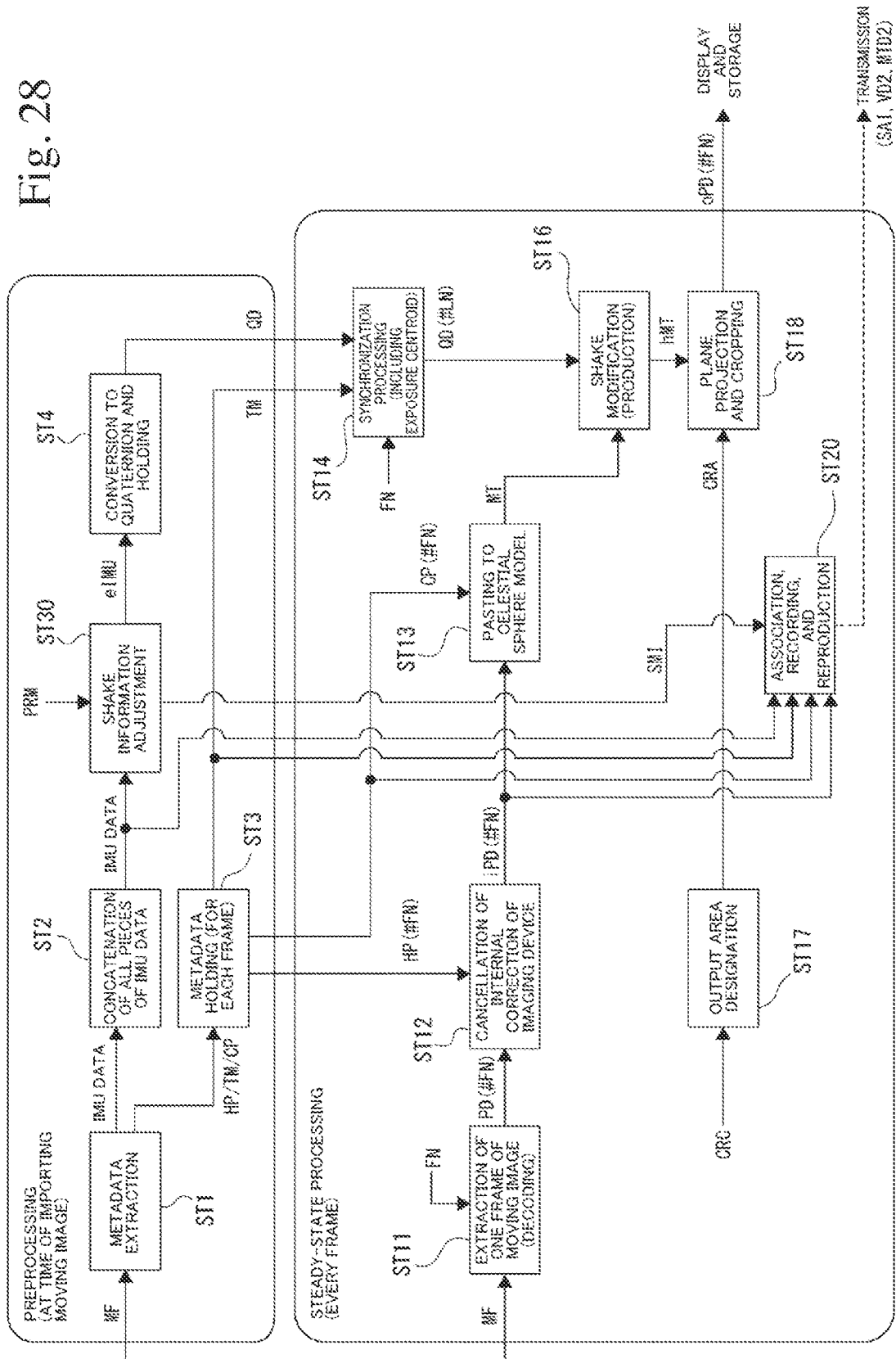
FIG. 28 is an illustrative diagram of image processing according to a fifth embodiment.

FIG. 28 illustrates a processing example of the image processing device TDx. This is an example in which the shake information adjustment processing by the function of the shake information adjustment unit 101 is performed as step ST30 at the time of preprocessing.

In step ST30, the CPU 71 adjusts the IMU data on the basis of shake adjustment parameter PRM according to a user operation or automatic control to obtain IMU data eIMU after the adjustment.

The data, yaw, pitch, and roll of the angular velocity sensor can be assigned to a direction of the shake modification as they are.

In step ST4, the CPU 71 obtains and holds the quaternion QD from the IMU data eIMU after the adjustment.

That is, adjustment for shake production is performed on the IMU data before the quaternion QD is obtained so that the quaternion QD obtained from the IMU data eIMU after the adjustment has already become posture information for shake production.

At the time of the steady-state processing, this quaternion QD is used to perform synchronization processing of step ST14 and shake modification processing of step ST16.

Accordingly, the output image data oPD becomes an image that reflects the shake production using the shake modification parameter PRM.

As the association recording processing of step ST20, the shake information at the time of imaging and the shake modification information SMI are associated with the image data iPD for each frame and stored.

That is, the CPU 71 performs processing of recording the IMU data, timing information TM, and camera parameter CP for the frame as shake information at the time of imaging associated with the image data iPD. The metadata MTD2 in FIG. 29 becomes content of the shake information at the time of imaging.

Further, the CPU 71 performs processing of recording the shake modification parameter PRM as the shake modification information SMI associated with the image data PD. Alternatively, the IMU data eIMU after the adjustment may be recorded instead of the shake modification parameter PRM or together with the shake modification parameter PRM.

The image data PD of each frame, the shake information at the time of imaging, and the shake modification information SMI recorded in association with each other in this way are transmitted to an external device and made available.

FIG. 30 illustrates a processing example of the image processing device TDy that acquired these.

It is assumed that the association recording and reproduction processing of step ST20 in FIG. 30 is processing in which, for example, information (the image data VD2, the metadata MTD2, and the shake modification information SMI) transmitted from the image processing device TDx is recorded in and sequentially read from the storage unit 79 or the removable recording medium 81 of the information processing device 70 of FIG. 5 functioning as the image processing device TDy.

The shake information adjustment in step ST30 and the conversion into the quaternion QD and holding in step ST4, for example, are performed as the preprocessing in FIG. 30.

In this case, the CPU 71 of the image processing device TDy reads out the shake modification information SMI of each frame of the image, that is, the IMU data for the shake information adjustment in step ST30 as the processing of step ST20.

Further, the PU 71 reads out the shake modification information SMI that can be used for the shake information adjustment in step ST30 as the processing of step ST20.

The reproduced IMU data is adjusted on the basis of the shake modification parameter PRM input in step ST30 in this image processing device TDy, and is used as the IMU data eIMU after the adjustment. Alternatively, the reproduced IMU data may be adjusted on the basis of the shake modification information SMI so that the reproduced IMU data is the IMU data eIMU after the adjustment.

In step ST4, the CPU 71 converts the IMU data eIMU after the adjustment into the quaternion QD and holds the quaternion QD.

By doing this, in the steady-state processing, the quaternion QD for shake production has already been prepared.

The processing of steps ST30 and ST4 above may be performed in parallel at the time of the steady-state processing.

In the image processing device TDy, the following processing is performed as the steady-state processing.

The CPU 71 of the information processing device 70 that functions as the image processing device TDy reads out the image data pPD for each frame as the processing of step ST20.

When the image processing device TDx performs the processing of FIG. 28, the image data pPD to be reproduced becomes the image data iPD.

Further, the CPU 71 reads out the camera parameter CP corresponding to the image data pPD of the current reproduced frame for pasting to the celestial sphere model MT in step ST13 as the processing of step ST20.

Further, the CPU 71 reads out the timing information TM corresponding to the image data pPD of the current reproduced frame for the synchronization processing of step ST14 as the processing of step ST20.

The CPU 71 pastes the image data pPD reproduced with reference to the reproduced camera parameter CP to the celestial sphere model as the processing of step ST13.

The CPU 71 performs synchronization processing using the quaternion QD and the timing information TM corresponding to the reproduced image data pPD as the processing of step ST14.

The CPU 71 rotates the image data pPD pasted to the celestial sphere model MT using the quaternion QD to perform the shake modification processing as the processing of step ST16.

In step ST18, the CPU 71 crops the image subjected to the shake modification according to the cropping area information CRA, projects the image onto the plane to generate the output image data oPD, and outputs the output image data oPD.

In the image processing device TDy that performs each of such processing, although a processing scheme differs from that of the first embodiment, an operation that is substantially the same as that of the first embodiment is made possible.

Reproduction of the Shake Production Subjected to the Image Processing Device TDx in the Past In step ST30, the IMU data eIMU after adjustment can be generated by reflecting the shake modification information SMI (for example, shake modification parameter PRM) in the image processing device TDx. Therefore, the quaternion QD obtained in step ST4 becomes information for performing the same shake modification processing as the shake modification performed by the image processing device TDx in the past, and the CPU 71 of the image processing device TDy can obtain the output image data oPD subjected to the same shake production as that of the image processing device TDx and cause the output image data oPD to be displayed or recorded.

Addition of New Shake Production

The image data pPD (image data iPD) to be reproduced as a processing target is image data that not subjected to the shake modification in the image processing device TDx. Therefore, in the image processing device TDy, the shake modification parameter PRM is input according to a user operation or automatic control, the IMU data eIMU after the adjustment is generated accordingly, and the quaternion QD is generated, making it possible to perform the shake modification processing of only the image processing device TDy not affected by the past shake modification in step ST16 and to display or record the image based on such output image data oPD.

Adjustment or Correction of the Shake Production Performed in the Image Processing Device TDx in the Past In step ST30, both the shake modification information SMI (for example, shake modification parameter PRM) in the image processing device TDx and the shake modification parameter PRM newly input according to a user operation or automatic control can be reflected, the IMU data eIMU after the adjustment can be generated, and the quaternion QD can be generated.

Therefore, the CPU 71 of the image processing device TDy can change, for example, the shake state of the image due to the shake modification performed by the image processing device TDx depending on the user of the image processing device TDy adjusting or partially changing the shake modification parameter PRM. It is possible to display or record an image based on such output image data oPD.

When the shake modification has been performed in the image processing device TDy, it is conceivable that the information is also associated. In that case, it is conceivable that the shake modification information SMI associated with the image data VD2 (iPD) of each frame and the shake information (metadata MTD2) at the time of imaging is updated or added to the shake modification information SMI used this time.

In this case, the shake modification information SMI used this time is the shake modification parameter PRM used in step ST30 or the IMU data eIMU after the adjustment.

9. CONCLUSION AND MODIFICATION EXAMPLES

The following effects can be obtained in the above embodiments.

The image processing device TDx of the embodiment includes the shake information adjustment unit 101 (steps ST15 and ST30) that adjusts shake information at the time of imaging of the image data (input image data) constituting the moving image and generates the adjusted shake information. Further, the image processing device TDx includes the shake modification unit 100 (step ST16) that performs the shake modification processing for changing the state of the shake of the image data using the adjusted shake information. Further, the image processing device TDx includes the association unit 102 (step ST20) that performs processing for associating the image data, the shake information at the time of imaging, and the shake modification information SMI capable of specifying the processing amount of the shake modification processing, with each other.

The image data VD2 (PD, iPD, rPD, or the like), the shake information at the time of imaging (quaternion QD, IMU data, shift and rotation data SFRO, or the like in each embodiment), and the shake modification information SMI (the quaternion after adjustment eQD, the IMU data eIMU after adjustment, or the like in each embodiment) are associated, for example, making it possible for the image processing device TDy to ascertain shake modification performed through the shake modification processing in the image processing device TDx.

Then, the image processing device TDy can perform, for example, processing such as performing the shake modification processing as the shake production again, adjusting the shake state of the shake production that has already been performed, or cancelling the shake production.

It is also possible to cancel the shake production performed by the image processing device TDx and then perform the shake removal in the image processing device TDy.

That is, the state of the shake can be arbitrarily and variously changed in each image processing device.

It is conceivable that the image data, the shake information at the time of imaging, and the shake modification information SMI, which are associated with each other, be recorded in the same file, for example. For example, a file including the image data (and audio data) constituting a moving image, the metadata, and the shake modification information SMI is constructed. For example, the shake information at the time of imaging and the shake modification information SMI can be included as metadata associated with the image data.

However, the data and the information does not necessarily have to be recorded in the same file or the like. One or both of the shake information at the time of imaging and the shake modification information SMI may be in a form that can be later associated with each frame of the image data even when the information is a data file different from the image data. That is, the information suffices as long as the information can be acquired in a state in which the information is associated with each other in the image processing device TDy that is a destination to which the image has been transmitted regardless of a recording form.

Further, although examples of the shake information at the time of imaging include the quaternion QD, the IMU data, and the shift and rotation data SFRO, the shake information at the time of imaging may be any information indicating a motion of the imaging device 1 at the time of imaging and other information is conceivable.

In the embodiment, an example in which the shake modification unit 100 performs the shake modification processing for adding shake production to an image on the basis of the adjusted shake information has been given.

For example, in the image processing device TDx, the user performs an operation such as instructing an amount of shake as the shake production, the shake production adjustment value PRM is input accordingly, and the quaternion QD is adjusted, so that the shake modification processing as shake production is performed using the quaternion after adjustment eQD. In the case of the present embodiment, such shake production can be inherited or further changed in another image processing device TDy.

In the first, second, and fifth embodiments, the association unit 102 associates the shake information at the time of imaging and the shake modification information with the input image data. That is, it is assumed that the image associated with the shake information at the time of imaging and the shake modification information SMI by the association unit 102 is an image before the shake modification processing is performed.

The image data not subjected to the shake modification processing is, for example, image data that is in a state in which the shake removal such as image stabilization in the imaging device 1 has been cancelled. In the embodiment, the image data not subjected to the shake modification processing corresponds to the image data PD input in a state in which the imaging device 1 does not perform the shake removal such as image stabilization as illustrated in FIG. 23, or the image data iPD for which the shake removal such as image stabilization has been performed by the imaging device 1, but the shake removal has been cancelled through the processing of cancelling the internal correction of the imaging device in step ST12 as illustrated in FIGS. 10 and 28, which is image data not subjected to the shake modification processing of step ST16.

Such image data is stored, for example, making it possible for the image processing device TDy to reproduce the shake production performed by the image processing device TDx using the shake information at the time of imaging SI or the shake modification information SMI (for example, the quaternion after adjustment eQD) for the image data or to adjust the shake state of the shake production.

In the third and fourth embodiments, an example in which the shake modification unit 100 performs the shake modification processing for removing the shake of the image on the basis of the shake information at the time of imaging has been given.

For example, the image processing device TDx performing the shake modification processing on the basis of the quaternion QD before adjustment instead of the quaternion after adjustment eQD in step ST16 corresponds to performing the shake removal (see FIGS. 24 and 26).

This makes it suitable for a case in which an image without shake (or with reduced shake) is obtained.

It is also possible to remove the shake that cannot be removed depending on a processing capacity of the imaging device 1 by using the image processing device TDx having a high processing capacity. That is, it is possible to perform shake removal with high accuracy.

In the third and fourth embodiments, the image associated with the shake information at the time of imaging and the shake modification information by the association unit 102 is an image subjected to the shake removal processing.

The image data subjected to the shake removal is, for example, image data in which the shake generated in the image due to a motion at the time of imaging in the imaging device 1 has been removed. In the embodiment, this corresponds to the image data rPD subjected to shake removal in the shake modification processing of step ST16 as illustrated in FIG. 24 or 26.

By recording and storing such image data, it is possible to reproduce an image in which camera shake and the like have been reduced and curbed even when the image processing device TDy or another image reproduction device does not include a shake removing function, for example.

Of course, such image data is associated with the shake information at the time of imaging or the shake modification information SMI, for example, making it possible for the image processing device TDy to cancel the shake removal of the image data or reproduce the shake production performed by the image processing device TDx, or to adjust the shake state of the shake production.

In the first, third, and fifth embodiments, the shake modification unit 100 performs processing of cancelling the shake removal processing performed on the image data at the time of imaging using the metadata associated with the image data and then perform the shake modification processing.

For example, in the processing of step ST12 in FIGS. 10, 24, and 28 of the embodiment, the shake modification processing is performed on the image data iPD subjected to the cancellation of the internal correction of the imaging device. This makes it possible to perform shake production or shake removal that is not affected by the shake removal in the imaging device 1, and to perform a variety of shake production or a more accurate shake removal.

In step ST12, correction cancellation is performed using the coordinate transformation parameter HP in the metadata. The coordinate transformation parameter HP is information in a case in which an image frame (an image range including the angle of view) of the captured image is changed, such as respective parameters of lens distortion, trapezoidal distortion, focal plane distortion, electronical image stabilization, and optical image stabilization.

This makes it possible to cancel the correction regarding the image frame at the time of imaging, and to perform return to an original state when the image frame (range of the image) is corrected by the imaging device 1.

In the first, second, and fifth embodiments, the image data associated with the shake information at the time of imaging and the shake modification information by the association unit 102 is the input image data that is in a state in which the shake removal processing at the time of imaging is not performed.

The input image data that is in a state in which the shake removal at the time of imaging is not performed is, for example, image data that is in a state in which the shake removal such as the image stabilization in the imaging device 1 has been cancelled, or image data that is in a state in which the shake removal such as the image stabilization has not been performed in the imaging device 1.

In the embodiment, this corresponds to the image data PD input in a state in which the imaging device 1 does not perform shake removal such as image stabilization as illustrated in FIG. 22, or the image data iPD for which the shake removal such as image stabilization has been performed by the imaging device 1, but the shake removal has been cancelled through the processing of cancelling the internal correction of the imaging device in step ST12 as illustrated in FIGS. 10 and 28.

The storage of such image data makes it unnecessary, for example, for the image processing device TDy to cancel the shake removal performed by the imaging device 1.

The image processing device TDy can perform more accurate shake removal on the image data using the shake information at the time of imaging (for example, quaternion QD).

Further, in the image processing device TDy, it is possible to reproduce the shake production performed by the image processing device TDx or adjust the shake state of the shake production using the shake information at the time of imaging or the shake modification information SMI (for example, quaternion after adjustment eQD) for the image data.

In the first, second, and third embodiments, the shake information at the time of imaging associated with the image data and the shake modification information by the association unit 102 is the posture information of the imaging device 1 at the time of imaging.

That is, the quaternion QD as the posture information obtained from the IMU data is used as the shake information at the time of imaging. Accordingly, information for appropriately representing the shake at the time of imaging can be sent to the image processing device TDy.

In the fourth embodiment, the shake information at the time of imaging associated with the image data and the shake modification information by the association unit 102 has been the shift and rotation information SFRO indicating the motion of the imaging device 1 at the time of imaging.

An application program for performing shake modification using the quaternion QD and the celestial sphere model MT consumes a relatively large amount of system resources. Therefore, assuming a device with few system resources as the image processing device TDy, it is preferable to convert the quaternion QD to the shift and rotation information SFRO and provide the shift and rotation information SFRO so that the shake modification can be easily executed.

Needless to say, the shift and rotation data SFRO may be stored together with the quaternion QD so that the shift and rotation data SFRO can be provided to other devices.

Further, there is also IMU data as shake information at the time of imaging. Therefore, any one of the IMU data, the shift and rotation data SFRO, and the quaternion QD may be stored as the shake information at the time of imaging, any two of these may be stored as the shake information at the time of imaging, or all of these may be stored as the shake information at the time of imaging. Of course, information other than the above information may be used as the shake information at the time of imaging.

In the embodiment, an example in which the shake information adjustment unit 101 generates the adjusted shake information for adding shake of a shake amount designated by the shake modification parameter PRM on the basis of the shake modification parameter PRM for designating the shake information at the time of imaging and the shake modification processing amount has been given. For example, when the shake production is performed by the image processing device TDx, the quaternion QD is adjusted using the shake modification parameter PRM, and the shake production is performed using the quaternion after adjustment eQD. Introduction of such an shake modification parameter PRM makes it possible to realize shake modification with an arbitrary amount of shake.

In the embodiment, an example in which the shake modification information SMI associated with the image data and the shake information at the time of imaging by the association unit 102 is used as the shake modification parameter PRM has been given.

For example, when the shake production is performed by the image processing device TDx, the image processing device TDy that has acquired the shake modification parameter PRM in this case can specify a processing amount of the shake production performed by the image processing device TDx.

Therefore, in the image processing device TDy, the shake production performed by the image processing device TDx is adjusted or cancelled so that the shake of the image can be arbitrarily readjusted.

In the embodiment, the shake modification parameter PRM is assumed to be a parameter designated by, for example, a user operation.

For example, when the user arbitrarily designates the shake modification parameter PRM and the shake production is performed by the image processing device TDx, the image processing device TDy that has acquired the shake modification parameter PRM in this case can confirm a state of the user instruction as the shake production performed by the image processing device TDx.

Therefore, after a setting of the user on the image processing device TDx side is confirmed, the user on the image processing device TDy side can arbitrarily perform the shake adjustment.

In the embodiment, an example in which the shake modification information SMI associated with the image data and the shake information at the time of imaging by the association unit 102 is the adjusted shake information has been given.

For example, when the shake production is performed by the image processing device TDx, the quaternion QD is adjusted using the shake modification parameter PRM, and the shake production is performed using the quaternion after adjustment eQD.

This quaternion after adjustment eQD may be stored as the shake modification information SMI in association with the quaternion QD which is the shake information at the time of imaging SI.

The image processing device TDy that has acquired these can specify the processing amount of the shake production performed by the image processing device TDx using the quaternion QD and the quaternion after adjustment eQD. Therefore, in the image processing device TDy, the shake production performed by the image processing device TDx is adjusted or cancelled so that the shake of the image can be arbitrarily readjusted.

Although examples of the shake modification information SMI include the shake modification parameter PRM and the quaternion after adjustment eQD, both of these may be stored.

Further, in the fifth embodiment, although the example of the shake modification information SMI includes the IMU data eIMU after the adjustment, both the IMU data eIMU after the adjustment and the shake modification parameter PRM may be stored as the shake modification information SMI.

In the embodiment, an example in which the shake information adjustment unit 101 performs gain processing based on the shake modification parameter PRM for each frequency band of the shake on the shake information for shake addition based on the shake information at the time of imaging (for example, quaternions QDs for shake) to generate the adjusted shake information has been given.

It is possible to generate the quaternion after adjustment eQD in which the amount of shake has been adjusted for each frequency band of the shake by performing the band division, performing the gain processing, and performing mixing as in the processing of FIGS. 13 and 15. This makes it possible to perform various types of shake production by making arbitrary adjustment for each frequency band of the shake.

For example, it is possible to easily perform shake production such as curbing large shake but increasing small shake.

In the embodiment, an example in which the shake information adjustment unit 101 performs gain processing based on the shake modification parameter for each shake direction on the shake information for shake addition based on the shake information at the time of imaging (for example, quaternion QDs for shake) to generate the adjusted shake information has been given.

It is possible to generate the quaternion after adjustment eQD in which the amount of shake has been adjusted for each direction of shake by performing the gain processing for each direction of shake (yaw, pitch, and roll) and performing mixing as in the processing of FIGS. 14 and 15. This makes it possible to make arbitrary adjustment for each direction of shake to perform various types of shake production.

For example, it is possible to easily perform shake production such as adding shake in a vertical direction but not adding shake in a horizontal direction.

In the embodiment, the shake information at the time of imaging adjusted by the shake information adjustment unit 101 is posture information corresponding to each frame obtained on the basis of the metadata generated when the image data as a processing target is captured, and the posture information after adjustment is provided to the shake modification processing.

That is, the quaternion QD as the posture information obtained from the IMU data is used as the shake information at the time of imaging, and the shake modification processing is performed using the adjusted shake information (quaternion after adjustment eQD) obtained by adjusting such information. Accordingly, the shake modification can be appropriately performed using the celestial sphere model MT.

In the embodiment, an example in which the shake modification unit 100 pastes each frame of the input image data as a processing target to the celestial sphere model MT, and rotates the celestial sphere model MT using the posture information after adjustment which is the adjusted shake information corresponding to each frame, to perform the shake modification has been given. That is, the image of each frame is rotated on the celestial sphere model MT using the quaternion after adjustment eQD so that the shake modification processing is performed.

The rotation is performed to increase or decrease the shake for each frame on the celestial sphere model MT so that shake modification correction is performed, making shake modification without trapezoidal distortion possible. Therefore, a high-quality image with little distortion can be obtained as an image subjected to shake production.

In the embodiment, an example in which the image of the cropping area is cropped after the shake modification has been performed in the celestial sphere model MT and the projection onto the plane has been performed has been described, but the present technology is not limited thereto. That is, an image of the area designated by the cropping area information CRA is cropped in a state in which the shake correction has been performed in the celestial sphere model MT, and the image is projected onto the plane, making it possible to also generate the output image data oPD.

Further, an example in which the shake modification processing for shake production or shake removal is performed without using the celestial sphere model MT is also assumed. For example, an example in which the cropping area is changed for each frame can be considered.

Further, in the embodiment, the image processing device TDx extracts and stores the metadata corresponding to each frame of the image data for the image file MF including the image data VD1 constituting the moving image and the corresponding metadata MTD1. That is, when the image file MF as the moving image is an image processing target, the metadata for each frame is stored (step ST3).

This makes it possible to use the metadata for each frame in the shake modification processing.

Incidentally, in the embodiment, the posture information (quaternion QD (LN)) acquired on the basis of a timing of the exposure centroid for each line is used for each frame of the image data.

Relative shake between the subject and the imaging device in the exposure period causes so-called blur, which becomes more noticeable when the exposure time becomes longer depending on the shutter speed. In this case, when posture information at an exposure start timing of each line is used, relative shake in the exposure period of each line becomes shake in one direction when viewed from the posture information, and becomes more noticeable on the image.

On the other hand, when the posture information is acquired on the basis of the IMU data at the centroid position in the exposure period of each line as illustrated in FIG. 12, relative shake in the exposure period becomes bidirectional shake when viewed from a state of the posture information, and visually, the shake seems to be offset in a time direction so that the blur is less noticeable in the image.

In the embodiment, the image processing device TDy includes the shake information adjustment unit 101 that generates the adjusted shake information using the shake information at the time of imaging associated with the image data constituting the moving image and the shake modification information SMI capable of specifying the processing amount of the shake modification processing, and the shake modification unit 100 that performs shake modification processing for changing the state of the shake of image data using the adjusted shake information.

That is, the image processing device TDy can execute secondary shake modification processing when the information in which the image data, the shake information at the time of imaging, and the shake modification information SMI are associated with each other is provided. The image processing device TDy can cancel the shake modification performed by the image processing device TDx or adjust the amount of shake. That is, an environment in which the image already subjected to the primary shake modification can be further freely adjusted or subjected to shake modification is prepared.

In the image processing devices TDx and TDy, the shake modification unit 100 may perform at least the processing of step ST16 in FIG. 10 or the like, and some or all of steps ST11, ST12, ST13, and ST14 may be performed outside the function of the shake modification unit 100 (for example, a device different from the image processing device having the shake modification unit 100).

Further, it is also conceivable that RAW image data is an image processing target.

Further, various processing examples can be considered in addition to the description of the embodiment described above.

Content of the shake production processing (shake amount of shake production, a shake state, or the like) may be switched depending on cases. Alternatively, the shake production and the shake removal may be switched depending on cases.

For example, it is conceivable to automatically perform the switching on the basis of the metadata MTD1.

Further, it is also conceivable to perform switching of the shake modification depending on a device that is a destination to which the image data, the shake information at the time of imaging, and data of the shake modification information SMI associated with each other are distributed.

For example, for video production companies, shake modification with an emphasis on quality is performed, and when smartphone applications are distributed, a load should be lowered.

Further, it is conceivable to switch the shake modification processing depending on a form of the display device. For example, when a goggle for virtual reality is used, this is an example in which shake is weakened.

That is, the device that is the destination to which the image data, the shake information at the time of imaging, and the data of shake modification information SMI associated with each other are distributed and, a form of the display device may be automatically detected, and content of the shake production processing may be switched automatically depending on a result of the detection.

Angle of view information, an aspect ratio, and an angle of view setting value of the image may also be stored in association with the image data or the like in step ST20, and may be adjusted many times.

The program of the embodiment is a program for causing, for example, a CPU, a DSP, or a device including these to execute the processing illustrated in FIGS. 10, 23, 24, 26, and 28.

That is, the program of the embodiment is a program causing an information processing device to execute shake information adjustment processing (ST15, ST30) for adjusting shake information at the time of imaging when input image data constituting a moving image is captured and generating adjusted shake information, shake modification processing (ST16) for changing a state of shake of the input image data using the adjusted shake information to obtain shake-modified image data, and association processing (ST20) for associating at least one of the input image data and the shake-modified image data, the shake information at the time of imaging, and shake modification information SMI capable of specifying a processing amount of the shake modification processing with each other.

With such a program, the image processing device TDx described above can be realized in a device such as the mobile terminal 2, the personal computer 3, or the imaging device 1.

Further, the program of the embodiment may be a program that causes a CPU, a DSP, or a device including these to execute the processing illustrated in FIGS. 20, 21, 25, and 30.

That is, the program of the embodiment is a program that causes the information processing device to execute the shake information adjustment processing (ST15, ST30) for generating the adjusted shake information using the shake information at the time of imaging and the shake modification information SMI that have been associated with each other when the image data constituting the moving image, the shake information at the time of imaging, and the shake modification information SMI capable of specifying the processing amount of the shake modification processing are associated with each other, and the shake modification processing (ST16) for changing the state of shake of the image data using the adjusted shake information.

With such a program, the image processing device TDy described above can be realized in a device such as the mobile terminal 2, the personal computer 3, or the imaging device 1.

The program that realizes such image processing devices TDx and TDy can be recorded in advance in an HDD as a recording medium built in a device such as a computer device, a ROM in a microcomputer including a CPU, or the like.

Alternatively, the program can be temporarily or permanently stored (recorded) in a removable recording medium such as a flexible disc, a compact disc read only memory (CD-ROM), a magnet optical (MO) disc, a digital versatile disc (DVD), a Blu-ray disc (registered trademark), a magnetic disk, a semiconductor memory, or a memory card. Such a removable recording medium can be provided as so-called package software.

Further, such a program can be installed in a personal computer or the like from the removable recording medium, and can also be downloaded from a download site via a network such as a local area network (LAN) or the Internet.

Further, such a program is suitable for a wide range of provision of the image processing devices TDx and TDy of the embodiments. For example, a program is downloaded to a personal computer, a portable information processing device, a mobile phone, a game device, a video device, a personal digital assistant (PDA), or the like, making it possible for the personal computer or the like to function as the image processing device of the present disclosure.

The effects described in the present specification are merely examples and are not limited, and other effects may be obtained.

The present technology can also adopt the following configurations.

(1)

An image processing device including:

a shake information adjustment unit configured to generate adjusted shake information by adjusting imaging time shake information when input image data constituting a moving image is captured;

an shake modification unit configured to perform shake modification processing for changing a state of shake of the input image data using the adjusted shake information to obtain shake-modified image data; and an association unit configured to associate at least one of the input image data and the shake-modified image data, the shake information at the time of imaging, and shake modification information capable of specifying a processing amount of the shake modification processing with each other.

(2)

The image processing device according to (1), wherein the shake modification unit adds shake production to the input image data on the basis of the adjusted shake information as the shake modification processing.

(3)

The image processing device according to (1) or (2), wherein the association unit associates the input image data with the shake information at the time of imaging and the shake modification information.

(4)

The image processing device according to any one of (1) to (3), wherein the shake modification unit removes shake of the input image data on the basis of the shake information at the time of imaging as the shake modification processing.

(5)

The image processing device according to any one of (1) to (4), wherein the association unit associates the shake-modified image data with the shake information at the time of imaging and the shake modification information.

(6)

The image processing device according to any one of (1) to (5), wherein the shake modification unit performs processing of cancelling shake removal processing performed at the time of imaging using metadata associated with the input image data with respect to the input image data and then performs the shake modification processing.

(7)

The image processing device according to any one of (1) to (6), wherein the image data associated with the shake information at the time of imaging and the shake modification information by the association unit is image data that is in a state in which shake removal processing at the time of imaging has not been performed.

(8)

The image processing device according to (7), wherein the image data is the input image data on which shake removal processing has not been performed at the time of imaging.

(9)

The image processing device according to (7), wherein the image data is image data obtained by performing processing of cancelling the shake removal processing performed at the time of imaging, on the input image data.

(10)

The image processing device according to any one of (1) to (9), wherein the shake information at the time of imaging is posture information of the imaging device when the imaging device captures the input image data.

(11)

The image processing device according to any one of (1) to (10), wherein the posture information is shift information or rotation information indicating a motion of the imaging device when the imaging device captures the input image data.

(12)

The image processing device according to any one of (1) to (11), wherein the shake information adjustment unit generate adjusted shake information for adding shake of a shake amount specified using an shake modification parameter for specifying the processing amount of the shake modification processing on the basis of the shake information at the time of imaging and the shake modification parameter.

(13)
The image processing device according to (12), wherein the shake modification information is the shake modification parameter.

(14)
The image processing device according to (12) or (13), wherein the shake modification parameter is a parameter designated by a user operation.

(15)
The image processing device according to any one of (12) to (14), wherein the shake modification information is the adjusted shake information.

(16)
The image processing device according to any one of (12) to (15), wherein the shake information adjustment unit performs gain processing based on the shake modification parameter for each frequency band of the shake on the shake information for shake addition based on the shake information at the time of imaging to generate the adjusted shake information.

(17)
The image processing device according to any one of (12) to (16), wherein the shake information adjustment unit performs gain processing based on the shake modification parameter for each direction of the shake on the shake information for shake addition based on the shake information at the time of imaging to generate the adjusted shake information.

(18)
The image processing device according to any one of (1) to (17), wherein the shake information at the time of imaging is posture information corresponding to each frame of the input image data obtained on the basis of metadata generated at the time of capturing the input image data.

(19)
The image processing device according to (18), wherein the shake modification unit pastes each frame of the input image data to a celestial sphere model and rotates each frame using the posture information after adjustment, the posture information after adjustment being the adjusted shake information corresponding to each frame, to perform the shake modification processing.

(20)
An image processing device including:
a shake information adjustment unit configured to generate adjusted shake information using shake information at the time of imaging associated with image data constituting a moving image and shake modification information capable of specifying a processing amount of shake modification processing; and an shake modification unit configured to perform the shake modification processing for changing a state of shake of the image data using the adjusted shake information.

(21)
The image processing device according to (20), wherein the image data is image data not subjected to shake removal processing at the time of imaging or image data subjected to processing of cancelling the shake removal processing performed at the time of imaging.

(22)
The image processing device according to (20) or (21), wherein the image data is image data in which the shake has been removed using the shake modification information based on the shake information at the time of imaging.

(23)
An image processing method including:
performing, by an image processing device, shake information adjustment processing for adjusting shake information at the time of imaging when input image data constituting a moving image is captured and generating adjusted shake information;
shake modification processing for changing a state of shake of the input image data using the adjusted shake information to obtain shake-modified image data; and
association processing for associating at least one of the input image data and the shake-modified image data, the shake information at the time of imaging, and shake modification information capable of specifying a processing amount of the shake modification processing with each other.

(24)
A program causing an information processing device to execute:
shake information adjustment processing for adjusting shake information at the time of imaging when input image data constituting a moving image is captured and generating adjusted shake information;
shake modification processing for changing a state of shake of the input image data using the adjusted shake information to obtain shake-modified image data; and
association processing for associating at least one of the input image data and the shake-modified image data, the shake information at the time of imaging, and shake modification information capable of specifying a processing amount of the shake modification processing with each other.

REFERENCE SIGNS LIST

1 Imaging device
2 Mobile terminal
3 Personal computer
4 Server
5 Recording medium
11 Lens system
12 Imaging element unit
13 Camera signal processing unit
14 Recording control unit
15 Display unit
16 Output unit
17 Operation unit
18 Camera control unit
19 Memory unit
22 Driver unit
23 Sensor unit
41 Low pass filter
42 Mid pass filter
43 High pass filter
44, 45, 46 Gain calculation unit
47, 57, 61 Mixing unit
51 Yaw component extraction unit
52 Pitch component extraction unit
53 Roll component extraction unit
54, 55, 56 Gain calculation unit
58, 59, 60 Direction-specific processing unit
65 Imaging pixel range
66 Imaging area
70 Information processing device
71 CPU
72 ROM
73 RAM 74 Bus
75 Input and output interface
76 Input unit
77 Display unit
78 Audio output unit
79 Storage unit
80 Communication unit
81 Removable recording medium
82 Drive
100 Shake modification unit
100a Shake production unit
100b Shake removal unit
101 Shake information adjustment unit
102 Association unit
VS Image source
TDx Image processing device
TDy Image processing device
MF Image file
PD Image data
iPD Image Data
oPD Output image data
pPD Image data
rPD Image data
FN Frame number
HP Coordinate transformation parameter
TM Timing information
CP Camera parameter
QD Quaternion
eQD Quaternion after adjustment
QDs Quaternion
eIMU IMU data after adjustment
SFRO Shift and rotation information
PRM Shake change parameter
SMI, SMI' Shake modification information
MT Celestial sphere model
hMT Shake-corrected celestial sphere model
W Exposure centroid
MTD, MTD1, MTD2 Metadata
CRC Cropping area indication information
CRA Cropping area information

The invention claimed is:

1. An image processing device comprising:
a memory configured to store program code, and
a processor configured to execute the program code to perform operations comprising:
generating adjusted shake information by adjusting imaging time shake information when input image data constituting a moving image is captured;
performing shake modification processing for changing a state of shake of the input image data using the adjusted shake information to obtain shake-modified image data; and
associating at least one of the input image data and the shake-modified image data, the shake information at the time of imaging, and shake modification information capable of specifying a processing amount of the shake modification processing,
wherein performing the shake modification processing comprises cancelling shake removal processing performed at the time of imaging using metadata associated with the input image data with respect to the input image data and then performing the shake modification processing.

2. The image processing device according to claim 1, wherein the operations further comprise:
adding shake production to the input image data on the basis of the adjusted shake information as the shake modification processing.

3. The image processing device according to claim 1, wherein the operations further comprise:
associating the input image data with the shake information at the time of imaging and the shake modification information.

4. The image processing device according to claim 1, wherein the operations further comprise:
removing shake of the input image data on the basis of the shake information at the time of imaging as the shake modification processing.

5. The image processing device according to claim 1, wherein the operations further comprise:
associating the shake-modified image data with the shake information at the time of imaging and the shake modification information.

6. The image processing device according to claim 1, wherein the shake information at the time of imaging is posture information of an imaging device when the imaging device captures the input image data.

7. The image processing device according to claim 6, wherein the posture information is shift information or rotation information indicating a motion of the imaging device when the imaging device captures the input image data.

8. An image processing device comprising:
a memory configured to store program code, and
a processor configured to execute the program code to perform operations comprising:
generating adjusted shake information by adjusting imaging time shake information when input image data constituting a moving image is captured;
performing shake modification processing for changing a state of shake of the input image data using the adjusted shake information to obtain shake-modified image data; and
associating at least one of the input image data and the shake-modified image data, the shake information at the time of imaging, and shake modification information capable of specifying a processing amount of the shake modification processing,
wherein the image data associated with the shake information at the time of imaging and the shake modification information is image data that is in a state in which shake removal processing at the time of imaging has not been performed.

9. The image processing device according to claim 8, wherein the image data is the input image data on which shake removal processing has not been performed at the time of imaging.

10. The image processing device according to claim 8, wherein the image data is image data obtained by performing processing of cancelling the shake removal processing performed at the time of imaging on the input image data.

11. An image processing device comprising:
a memory configured to store program code, and
a processor configured to execute the program code to perform operations comprising:
generating adjusted shake information by adjusting imaging time shake information when input image data constituting a moving image is captured;
performing shake modification processing for changing a state of shake of the input image data using the adjusted shake information to obtain shake-modified image data;

associating at least one of the input image data and the shake-modified image data, the shake information at the time of imaging, and shake modification information capable of specifying a processing amount of the shake modification processing; and adding shake of a shake amount specified using a shake modification parameter for specifying the processing amount of the shake modification processing on the basis of the shake information at the time of imaging and the shake modification parameter.

12. The image processing device according to claim 11, wherein the shake modification information is the shake modification parameter.

13. The image processing device according to claim 11, wherein the shake modification parameter is a parameter designated by a user operation.

14. The image processing device according to claim 11, wherein the shake modification information is the adjusted shake information.

15. The image processing device according to claim 11, wherein the operations further comprise:
performing gain processing based on the shake modification parameter for each frequency band of the shake on the shake information for shake addition based on the shake information at the time of imaging to generate the adjusted shake information.

16. The image processing device according to claim 11, wherein the operations further comprise:
performing gain processing based on the shake modification parameter for each direction of the shake on the shake information for shake addition based on the shake information at the time of imaging to generate the adjusted shake information.

17. An image processing device comprising:
a memory configured to store program code, and
a processor configured to execute the program code to perform operations comprising:
generating adjusted shake information by adjusting imaging time shake information when input image data constituting a moving image is captured;
performing shake modification processing for changing a state of shake of the input image data using the adjusted shake information to obtain shake-modified image data; and
associating at least one of the input image data and the shake-modified image data, the shake information at the time of imaging, and shake modification information capable of specifying a processing amount of the shake modification processing,
wherein the shake information at the time of imaging is posture information corresponding to each frame of the input image data obtained on the basis of metadata generated at the time of capturing the input image data.

18. The image processing device according to claim 17, wherein the operations further comprise:
pasting each frame of the input image data to a celestial sphere model and rotates each frame using the posture information after adjustment, the posture information after adjustment being the adjusted shake information corresponding to each frame, to perform the shake modification processing.

19. An image processing device comprising:
a memory configured to store program code, and
a processor configured to execute the program code to perform operations comprising:
generating adjusted shake information using shake information at the time of imaging associated with image data constituting a moving image and shake modification information capable of specifying a processing amount of shake modification processing; and
performing the shake modification processing for changing a state of shake of the image data using the adjusted shake information,
wherein the image data is image data not subjected to shake removal processing at the time of imaging or image data subjected to processing of cancelling the shake removal processing performed at the time of imaging.

20. An image processing device comprising:
a memory configured to store program code, and
a processor configured to execute the program code to perform operations comprising:
generating adjusted shake information using shake information at the time of imaging associated with image data constituting a moving image and shake modification information capable of specifying a processing amount of shake modification processing; and
performing the shake modification processing for changing a state of shake of the image data using the adjusted shake information,
wherein the image data is image data in which the shake has been removed using the shake modification information based on the shake information at the time of imaging.

21. An image processing method comprising:
performing, by an image processing device,
shake information adjustment processing for adjusting shake information at the time of imaging when input image data constituting a moving image is captured and generating adjusted shake information;
shake modification processing for changing a state of shake of the input image data using the adjusted shake information to obtain shake-modified image data; and
association processing for associating at least one of the input image data and the shake-modified image data, the shake information at the time of imaging, and shake modification information capable of specifying a processing amount of the shake modification processing with each other,
wherein performing the shake modification processing comprises cancelling shake removal processing performed at the time of imaging using metadata associated with the input image data with respect to the input image data and then performing the shake modification processing.

22. A non-transitory computer readable medium storing program code, the program code being executable by a processor to perform operations comprising:
shake information adjustment processing for adjusting shake information at the time of imaging when input image data constituting a moving image is captured and generating adjusted shake information;
shake modification processing for changing a state of shake of the input image data using the adjusted shake information to obtain shake-modified image data; and
association processing for associating at least one of the input image data and the shake-modified image data, the shake information at the time of imaging, and shake modification information capable of specifying a processing amount of the shake modification processing with each other,
wherein performing the shake modification processing comprises cancelling shake removal processing performed at the time of imaging using metadata associated with the input image data with respect to the input image data and then performing the shake modification processing.

* * * * *